US008446671B2

(12) United States Patent
Omata et al.

(10) Patent No.: US 8,446,671 B2
(45) Date of Patent: May 21, 2013

(54) DISPLAY PANEL AND APPARATUS PROVIDED WITH THE SAME

(75) Inventors: Teruyuki Omata, Uenohara (JP); Koichi Takano, Kofu (JP); Masaaki Watanabe, Minamitsuru-gun (JP); Nobuo Ito, Ota-ku (JP); Katsuyuki Yamaguchi, Itabashi-ku (JP); Shinichi Sakamaki, Sayama (JP)

(73) Assignee: Citizen Holdings Co., Ltd., Nishitokyo-shi (JP)

( * ) Notice: Subject to any disclaimer, the term of this patent is extended or adjusted under 35 U.S.C. 154(b) by 407 days.

(21) Appl. No.: 12/376,513

(22) PCT Filed: Aug. 9, 2007

(86) PCT No.: PCT/JP2007/065633

§ 371 (c)(1),
(2), (4) Date: Feb. 5, 2009

(87) PCT Pub. No.: WO2008/018551

PCT Pub. Date: Feb. 14, 2008

(65) Prior Publication Data

US 2010/0053752 A1 Mar. 4, 2010

(30) Foreign Application Priority Data

Aug. 9, 2006 (JP) ................................. 2006-217562
Aug. 29, 2006 (JP) ................................. 2006-231834

(51) Int. Cl.
*G02B 5/30* (2006.01)
*G04B 19/04* (2006.01)

(52) U.S. Cl.
USPC ........................................ 359/485.01; 368/80

(58) Field of Classification Search
None
See application file for complete search history.

(56) References Cited

U.S. PATENT DOCUMENTS 6,094,404 A 7/2000 Hidai et al.
6,204,903 B1 3/2001 Hayashi et al.
6,339,501 B1 1/2002 Kameyama et al.
6,466,522 B1 10/2002 Yoshioka et al.
6,643,224 B1 * 11/2003 Sekiguchi et al. ............ 368/242
6,937,301 B2 * 8/2005 Sekiguchi et al. .............. 349/96
7,242,641 B2 7/2007 Sato et al.
2005/0254226 A1 11/2005 Sawada et al.
2006/0028920 A1 2/2006 Kojima et al.
2006/0109188 A1 5/2006 Ikeda et al.
2008/0129931 A1 6/2008 Takahashi et al.

FOREIGN PATENT DOCUMENTS

EP 1331529 A1 7/2003
EP 1840603 A1 10/2007
JP 58151871 U 10/1983
JP 9269382 A 10/1997
JP 2001042125 A 2/2001
JP 2002131451 A 5/2002

(Continued)

*Primary Examiner* — Jade R Chwasz
(74) *Attorney, Agent, or Firm* — The Webb Law Firm

(57) ABSTRACT

A display panel is provided with a solar cell, a light transmitting substrate arranged on a side of the solar cell to be seen, and a reflective polarizing plate. An uneven pattern is arranged on at least one surface of the reflective polarizing plate. The pattern desirably has concave and convex shape formed on at least one surface of the reflective polarizing plate. The respective concave and convex patterns may be different from each other. The reflective polarizing plate is provided with a light reflection axis and a light transmission easy axis.

7 Claims, 51 Drawing Sheets

FOREIGN PATENT DOCUMENTS

| | | | |
|---|---|---|---|
| JP | 2003114285 | A | 4/2003 |
| JP | 2003215269 | A | 7/2003 |
| JP | 2004340700 | A | 12/2004 |
| JP | 2005189019 | A | 7/2005 |
| JP | 2005189201 | A | 7/2005 |
| JP | 2005324517 | A | 11/2005 |
| JP | 2006098937 | A | 4/2006 |
| WO | 2006006390 | A1 | 1/2006 |

* cited by examiner

Fig. 1
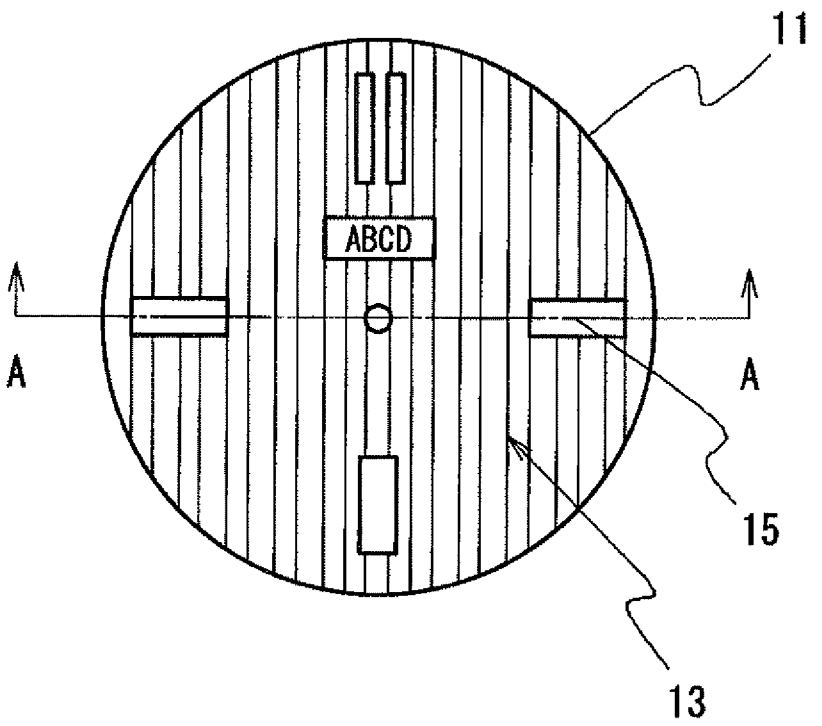
(a)
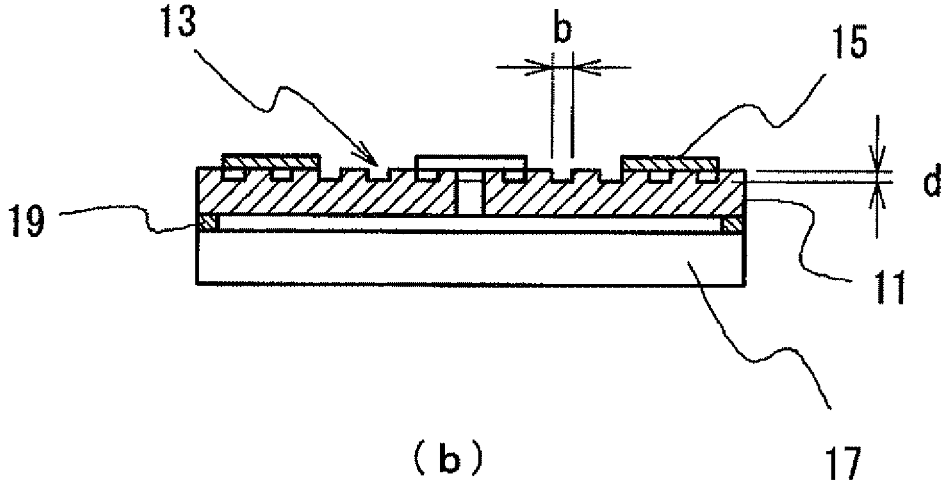
(b)

FIG. 15
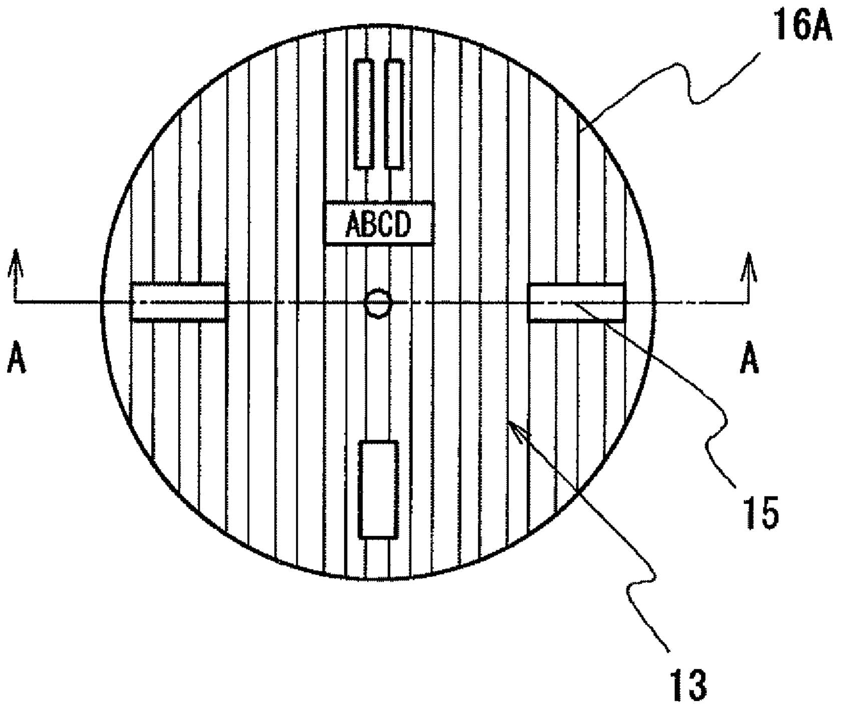
(a)
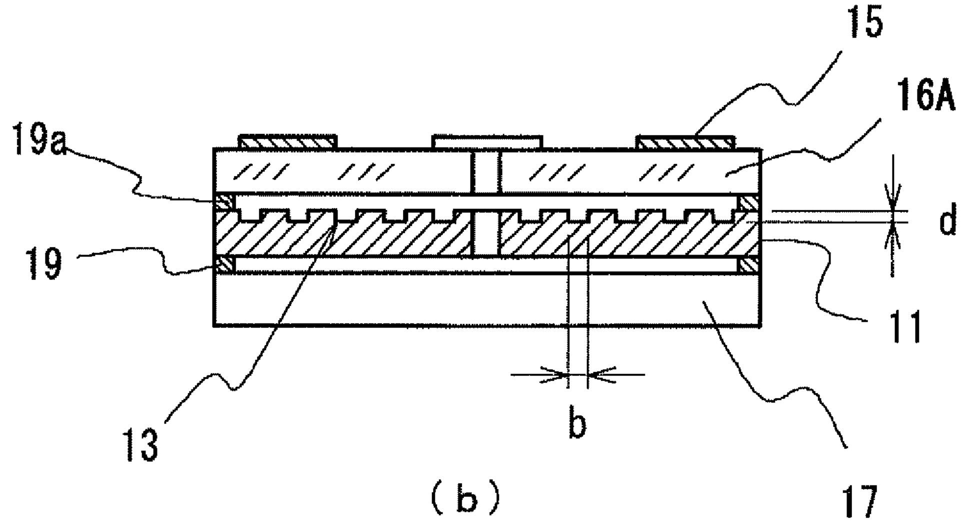
(b)

FIG. 27
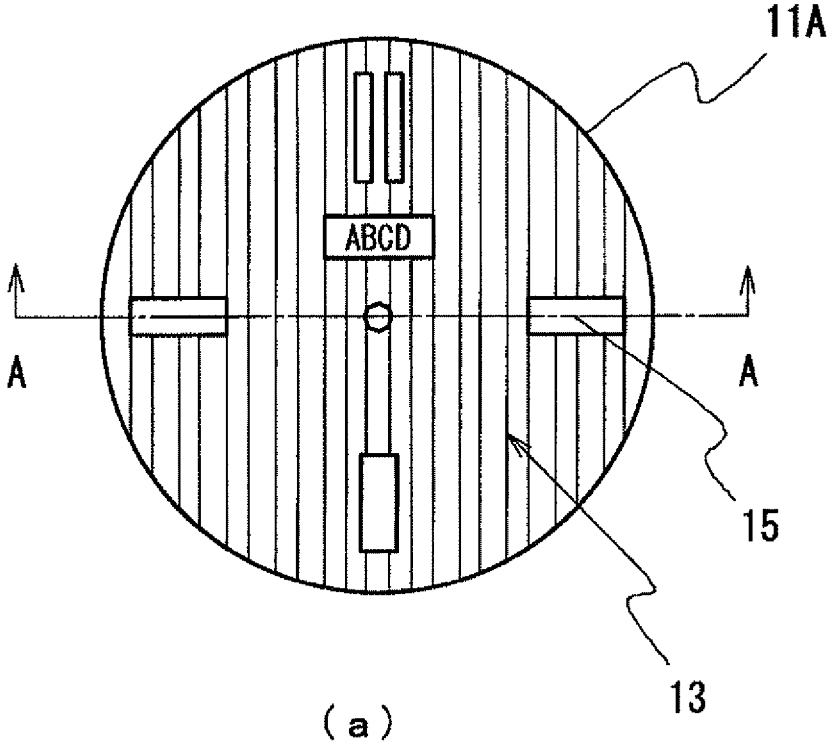
(a)
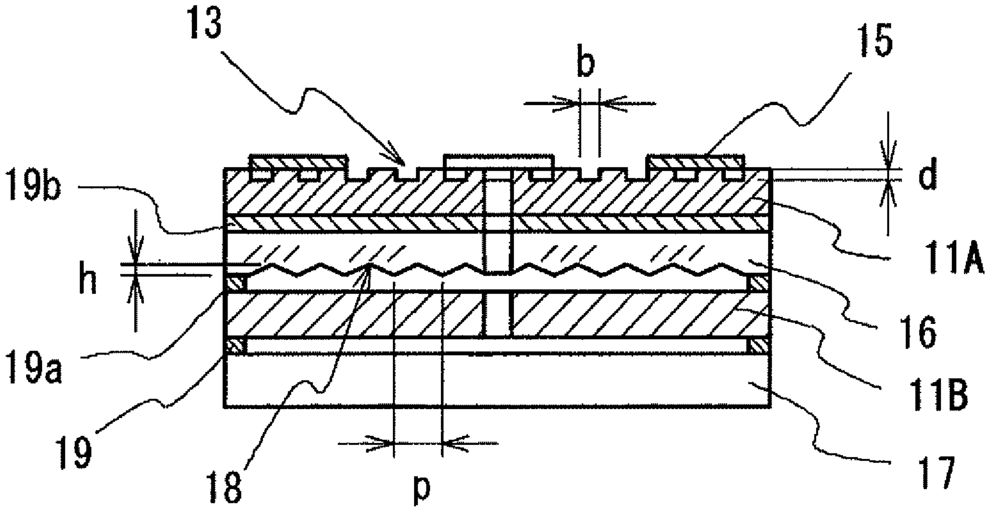
(b)

FIG. 34

(a)

| | Retardation of the retardation plate | | | |
|---|---|---|---|---|
| | 620 nm | | 380 nm | |
| | Example 1 | Example 2 | Example 3 | Example 4 |
| Angle (a) of the light transmission easy axis of the first reflective polarizing plate | 0 | 0 | 0 | 0 |
| Angle (b) of the optical axis of the retardation plate | 45 | 45 | 45 | 45 |
| Angle (c) of the light transmission easy axis of the second reflective polarizing plate | 0 | 90 | 0 | 90 |
| Display color | Blue | Yellow | Yellow | Blue |

FIG. 34

(b)

| | | | | | | |
|---|---|---|---|---|---|---|
| Retardation of the first retardation plate | 620 nm | | 380 nm | | 380 nm | |
| Retardation of the second retardation plate | 620 nm | | 380 nm | | 620 nm | |
| | Example 1 | Example 2 | Example 3 | Example 4 | Example 5 | Example 6 |
| Angle (a) of the light transmission easy axis of the first reflective polarizing plate | 0 | 0 | 0 | 0 | 0 | 0 |
| Angle (b) of the optical axis of the first retardation plate | 45 | 45 | 45 | 45 | 45 | 45 |
| Angle (b) of the optical axis of the second retardation plate | 45 | 45 | 45 | 45 | 45 | 45 |
| Angle (c) of the light transmission easy axis of the second reflective polarizing plate | 0 | 90 | 0 | 90 | 0 | 90 |
| Display color | Green | Red | Green | Red | Red | Green |

FIG. 36

| | Example 1 | Example 2 | Example 3 | Example 4 |
|---|---|---|---|---|
| Angle (a) of the light transmission easy axis of the first reflective polarizing plate | 0 | 0 | 0 | 0 |
| Angle (b) in a longitudinal direction of the pressure-sensitive adhesive double coated tapes (1) | 90 | 0 | 90 | 0 |
| Angle (b) in a longitudinal direction of the pressure-sensitive adhesive double coated tapes (2) | 90 | 0 | 90 | 0 |
| Angle (c) of the light transmission easy axis of the second reflective polarizing plate | 0 | 0 | 90 | 90 |
| Display color | Yellow | Yellow | Blue | Blue |

| | Example 5 | Example 6 | Example 7 | Example 8 |
|---|---|---|---|---|
| Angle (a) of the light transmission easy axis of the first reflective polarizing plate | 0 | 0 | 0 | 0 |
| Angle (b) in a longitudinal direction of the pressure-sensitive adhesive double coated tapes (1) | 45 | -45 | 45 | -45 |
| Angle (b) in a longitudinal direction of the pressure-sensitive adhesive double coated tapes (2) | 45 | -45 | 45 | -45 |
| Angle (c) of the light transmission easy axis of the second reflective polarizing plate | 45 | 45 | -45 | -45 |
| Display color | Yellow | Yellow | Blue | Blue |

FIG. 47
Comparison of a light transmittance
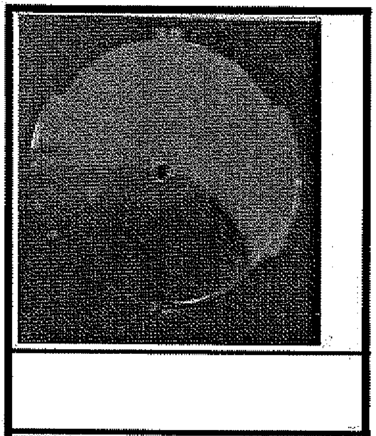
Reflective plate (no pattern)
48.8%
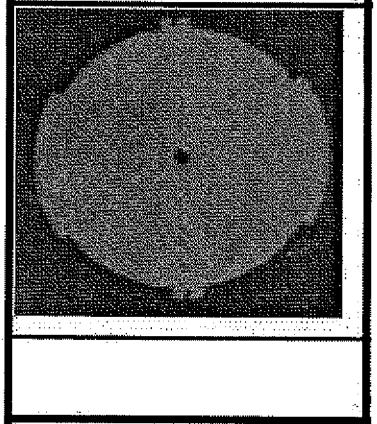
Reflective plate (thermal transfer)
48.8%
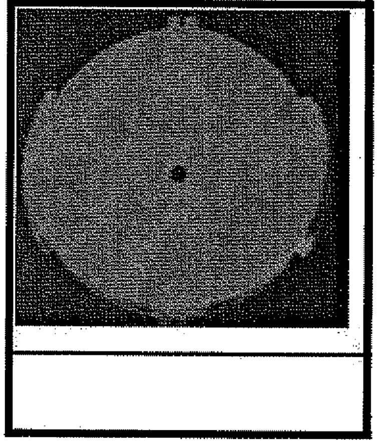
Reflective plate (machining)
64.6%

DISPLAY PANEL AND APPARATUS PROVIDED WITH THE SAME

TECHNICAL FIELD

The present invention relates to a display panel including a dial plate for a watch, a parting plate for a clock, and a dial plate for a measuring instrument. More specifically, the present invention relates to a display panel provided with a solar cell on the lower surface side thereof.

Moreover, the present invention relates to an apparatus in which the above display panel is used as a display panel for a clock, a measuring instrument panel of an electronic desk calculator, an automobile, and an airplane, and a display panel of an apparatus like a mobile apparatus such as a cellular phone.

BACKGROUND ART

A display panel provided with a solar cell (solar battery) requires an optical transparency so as to transmit a light that has been received and to enable the solar cell disposed on the lower surface side of the display panel to generate an electric power. Therefore, a translucent material such as plastic, ceramic, and glass is used for the display panel. In particular, plastic is used extensively at least since plastic is moderate in price and the shape forming and processing of plastic can be easily carried out.

FIG. 48 is a plan view showing a general solar cell.

As shown in FIG. 48, a general solar cell is formed in each of four faces (A1, A2, A3, and A4) that have been equally segmented and is disposed on the lower surface side of a display panel. A transmission light that has been transmitted to the display panel is uniformly irradiated to each of the four faces (A1, A2, A3, and A4), thereby resulting in the highest electric power generation efficiency. Consequently, it is necessary to design the display panel that is disposed on the upper surface side of the solar cell in such a manner that a uniform amount of lights are transmitted to each of sections corresponding to the four faces (A1, A2, A3, and A4) of the solar cell, that is, each of four faces that have been equally segmented by the 12-6 o'clock line and the 9-3 o'clock line.

However, the solar cell that is disposed on the lower surface side of a display panel has a generic dark purplish color, and a cross line for the segmentation into four equal divisions is extremely conspicuous due to a difference in materials. Consequently, the solar cell spoils the beauty thereof. To soften the dark purplish color or make the dark purplish color invisible, many ideas have been carried out for the display panel.

A conventional example of a display panel provided with a solar cell will be described below with reference to the drawings.

FIG. 49 is a partially enlarged cross-sectional view showing the structure of a dial plate for a watch provided with a solar cell as a display panel in a conventional art. FIG. 50 is a schematic perspective view showing a reflection polarizing substance in which a plurality of layers are laminated as a component part of a display panel in a conventional art.

As shown in FIG. 49, a dial plate 100 for a solar watch in a conventional art is composed of a substrate 101, a polarizing substance 103 formed on the side of a substrate 101 surface facing a solar battery 109, and a diffusing layer 102 disposed between the substrate 101 and the polarizing substance 103. In addition, a time character, a decorated character, and a mark or the like are arranged on the substrate 101.

The substrate 101 is made of a light transmitting material such as glass and plastic such as an acrylic resin and a polycarbonate resin, and is in a planar shape having a thickness in the range of 300 to 600 μm. To prevent the original color of the solar battery 109 from being seen through, a colored layer is formed on the substrate 101 by a method such as a coating method, a printing method, a wet plating method, and a dry plating method in some cases. It is disclosed that the colored layer is preferably white.

The diffusing layer 102 is made of a material containing a diffusing agent having a function for diffusing a light that has been irradiated. As a diffusing agent configuring the diffusing layer 102, a material such as silica, glass, and a resin having a shape in a granular state (powdered state), a scale-like state, or an acicular state is used, and a diffusing agent made of a material having a self-bonding property or an adhesion property is disclosed for instance.

The reflection polarizing substance 103 has a function for polarizing a light that has been irradiated. More specifically, the reflection polarizing substance 103 has a function for transmitting a first light vibrating in a predetermined direction and a function for reflecting a second light having a vibration direction perpendicular to the direction of vibration of the first light.

As shown in FIG. 50, the reflection polarizing substance 103 has a laminated body in which a plurality of layers is laminated. More specifically, the reflection polarizing substance 103 has a structure in which a plurality of polarizing film layers (A layers) 131 and polarizing film layers (B layers) 132 are laminated alternately.

As the A layer 131 of the reflection polarizing substance 103, a stretched film made of polyethylene naphthalate is used for instance. As the B layer 132, a material made of copolyester composed of naphthalenedicarboxylic acid and terephthalic acid is disclosed for instance.

As described above, a dial plate 100 for a solar watch as a display panel in a conventional art is composed of a light transmitting substrate 101, a diffusing layer 102, and a reflection polarizing substance 103, thereby having a sufficiently high optical transparency. In addition, it is also disclosed that the original color of the solar battery 109 can be prevented from being seen through, and a decorative effect can be displayed.

(See Patent Document 1 for Instance.)

Patent document 1: International Publication WO2006/006390 (pages 5 to 11, FIGS. 1 and 2)

However, for a display panel in a conventional art, a metal sense like a metal display panel and a brilliant color with whiteness and brightness cannot be obtained. Consequently, it is difficult to obtain a display panel having the appearance quality with sophistication. In particular, for a display panel in a conventional art, a metal sense that is peculiar to a metal cannot be obtained and a design variation is poor disadvantageously.

The present invention was made in consideration of such conditions, and an object of the present invention is to provide a display panel having an improved decorative effect in which lights of an amount sufficient for an electric power generation in a solar cell can be obtained, and a cross line and a dark purplish color of a solar cell can be prevented from being seen.

Another object of the present invention is to provide a display panel having the appearance quality with sophistication in which a metal sense like a metal display panel and a brilliant color with whiteness and brightness can be obtained and to achieve an improved design variation and a thin-shaped profile of a display panel.

Another object of the present invention is to provide an apparatus in which the above display panel is used as a display panel for a clock, a measuring instrument panel of an electronic desk calculator, an automobile, and an airplane, and a display panel of an apparatus like a mobile apparatus such as a cellular phone.

SUMMARY OF THE INVENTION

The present invention was made in order to solve the above problems of the conventional art and to achieve the objective. A display panel in accordance with the present invention is a display panel provided with a display panel substrate arranged on a visible side, and the display panel substrate comprises at least one reflective polarizing plate and a pattern in a concave and convex shape formed on at least one surface of the reflective polarizing plate.

As described above, a pattern in a concave and convex shape is formed on at least one surface of the reflective polarizing plate. Consequently, in the case in which the display panel is used for a wristwatch of a solar cell driving type for instance, lights of an amount sufficient for an electric power generation in the solar cell can be supplied, and a cross line and a dark purplish color of the solar cell can be prevented from being seen. In addition, an improved design variation and a thin-shaped profile of the display panel can be implemented.

Moreover, a sophisticated and expensive-looking display panel provided with a metal sense like a metal display panel, a vivid color with whiteness, and an improved decorative effect can be implemented.

A display panel in accordance with the present invention is characterized in that the reflective polarizing plate is provided with a light reflection axis and a light transmission easy axis, and has characteristic properties in which a light of a linearly polarized component provided with a vibration plane parallel to the light reflection axis is reflected and a light of a linearly polarized component provided with a vibration plane parallel to the light transmission easy axis is transmitted.

By such a configuration, a light of a linearly polarized component provided with a vibration plane parallel to the light reflection axis of the reflective polarizing plate is reflected, and a light of a linearly polarized component provided with a vibration plane parallel to the light transmission easy axis is transmitted. Therefore, lights that are reflected from the solar cell become less, and a scattering occurs due to the operation of the pattern in a concave and convex shape. Consequently, a cross line and a dark purplish color of the solar cell are completely extinguished and are prevented from being seen.

As a result, a cross line and a dark purplish color of the solar cell can be completely extinguished, a metal sense like a metal display panel can be obtained, and a vivid pattern can be seen, whereby a display panel having an improved decorative effect can be obtained.

The display panel in accordance with the present invention is characterized in that the reflective polarizing plate is provided with a pattern in a concave and convex shape on the both surfaces thereof, and the patterns in a concave and convex shape on the both surfaces are different from each other.

The display panel in accordance with the present invention is characterized in that the display panel substrate is provided with a plurality of reflective polarizing plates, and a pattern in a concave and convex shape is formed on at least one surface of a reflective polarizing plate disposed on the most visible side among the plurality of reflective polarizing plates.

The display panel in accordance with the present invention is characterized in that the plurality of reflective polarizing plates are disposed in such a manner that the directions of the light transmission easy axes thereof are different from each other.

As described above, the display panel is provided with a plurality of reflective polarizing plates, and the plurality of reflective polarizing plates are disposed in such a manner that the directions of the light transmission easy axes thereof are different from each other. Consequently, an amount of lights supplied to the solar cell can be adjusted simply and easily. As a result, an amount of lights supplied to the solar cell can be adjusted in such a manner that a metal color and a white tone color can appear more intensively on the display panel.

The display panel in accordance with the present invention is characterized in that the reflective polarizing plate disposed on the most visible side among the plurality of reflective polarizing plates is provided with a pattern in a concave and convex shape on the both surfaces thereof, and the patterns in a concave and convex shape on the both surfaces are different from each other.

A display panel in accordance with the present invention is a display panel provided with a display panel substrate arranged on a visible side, and the display panel substrate comprises a light transmitting substrate and a reflective polarizing plate and a pattern in a concave and convex shape formed on at least one surface of the reflective polarizing plate.

A display panel in accordance with the present invention is a display panel provided with a display panel substrate arranged on a visible side, and the display panel substrate comprises at least one light transmitting substrate and at least one reflective polarizing plate, and a pattern in a concave and convex shape formed on at least one surface of the reflective polarizing plate.

As described above, the display panel substrate comprises a light transmitting substrate and a reflective polarizing plate, and a pattern in a concave and convex shape is formed on at least one surface of the reflective polarizing plate. Consequently, in the case in which the display panel is used for a wristwatch of a solar cell driving type for instance, lights of an amount sufficient for an electric power generation in the solar cell can be supplied, and a cross line and a dark purplish color of the solar cell can be prevented from being seen.

In addition, a deep and stereoscopic pattern in a concave and convex shape can be displayed, and an improved design variation of the display panel can be implemented.

Moreover, a sophisticated and expensive-looking display panel provided with a metal sense like a metal display panel, a vivid color with whiteness, and an improved decorative effect can be implemented.

The display panel in accordance with the present invention is characterized in that the reflective polarizing plate is provided with a light reflection axis and a light transmission easy axis, and has characteristic properties in which a light of a linearly polarized component provided with a vibration plane parallel to the light reflection axis is reflected and a light of a linearly polarized component provided with a vibration plane parallel to the light transmission easy axis is transmitted.

By such a configuration, a light of a linearly polarized component provided with a vibration plane parallel to the light reflection axis of the reflective polarizing plate is reflected, and a light of a linearly polarized component provided with a vibration plane parallel to the light transmission easy axis is transmitted. Therefore, lights that are reflected from the solar cell become less, and a scattering occurs due to the operation of the pattern in a concave and convex shape.

Consequently, a cross line and a dark purplish color of the solar cell are completely extinguished and are prevented from being seen.

As a result, a cross line and a dark purplish color of the solar cell can be completely extinguished, a metal sense like a metal display panel can be obtained, and a vivid pattern can be seen, whereby a display panel having an improved decorative effect can be obtained.

The display panel in accordance with the present invention is characterized in that the reflective polarizing plate is provided with a pattern in a concave and convex shape on the both surfaces thereof, and the patterns in a concave and convex shape on the both surfaces are different from each other.

The display panel in accordance with the present invention is characterized in that the light transmitting substrate is provided with a pattern in a concave and convex shape formed on at least one surface thereof.

The display panel in accordance with the present invention is characterized in that the light transmitting substrate is provided with a light transmitting colored layer or a diffusing layer formed on at least one surface thereof.

As described above, the light transmitting substrate is provided with a light transmitting colored layer or a diffusing layer formed on at least one surface thereof. Consequently, a white color tone is increased by forming a diffusing layer on the light transmitting substrate, whereby a sophisticated and expensive-looking display panel can be obtained. Moreover, a display panel having a vivid color with brightness can be obtained by forming a light transmitting colored layer on the light transmitting substrate.

The display panel in accordance with the present invention is characterized in that the light transmitting substrate contains at least one of a coloring agent and a diffusing agent.

The display panel in accordance with the present invention is characterized in that the reflective polarizing plate is disposed on the side opposite to a visible side.

The display panel in accordance with the present invention is characterized in that the light transmitting substrate is disposed on the side opposite to a visible side.

The display panel in accordance with the present invention is characterized in that the light transmitting substrate is made of at least one light transmitting substrate selected from a transparent resin material plate, a semitransparent color material plate, a retardation plate, and a metal plate provided with a plurality of transmission holes.

The display panel in accordance with the present invention is characterized in that the pattern in a concave and convex shape is made of at least one pattern selected from a circle pattern, a spiral pattern, a stripe pattern, a radial pattern, a sand pattern, a satin pattern, a stone like pattern, and a geometric pattern.

The display panel in accordance with the present invention is characterized in that the reflective polarizing plate is provided with a light transmitting colored layer or a diffusing layer formed on at least one surface thereof.

As described above, the reflective polarizing plate is provided with a light transmitting colored layer or a diffusing layer formed on at least one surface thereof. Consequently, a white color tone is increased by forming a diffusing layer on the reflective polarizing plate, whereby a sophisticated and expensive-looking display panel can be obtained.

Moreover, a display panel having a vivid color with brightness can be obtained by forming a light transmitting colored layer on the reflective polarizing plate.

The display panel in accordance with the present invention is characterized in that a solar cell is disposed on the side opposite to a visible side of the display panel.

The display panel in accordance with the present invention is characterized in that at least peripheral parts of the substrates are fixed to each other by a fixing member.

For instance, the substrates can be fixed to each other by a fixing member made of a pressure sensitive adhesion or an adhesive agent on the peripheral part of each surface. Moreover, the reflective polarizing plate, the solar cell, and the light transmitting substrate can also be fixed by the fixing member on the entire surfaces of the substrates.

An apparatus in accordance with the present invention is characterized by comprising the display panel as defined in any one of the above descriptions.

The apparatus in accordance with the present invention is characterized in that a solar electric power generation apparatus is disposed on the lower surface side of the display panel.

The apparatus in accordance with the present invention is characterized in that an antenna is disposed on the lower surface side of the display panel.

The apparatus in accordance with the present invention is characterized in that the apparatus is a clock.

By such a configuration, in the case in which the display panel is used as a display panel for a clock, a measuring instrument panel of an electronic desk calculator, an automobile, and an airplane, and a display panel of an apparatus like a mobile apparatus such as a cellular phone, in particular, in the case in which the display panel is used for a wristwatch of a solar cell driving type for instance, lights of an amount sufficient for an electric power generation in the solar cell can be supplied, and a cross line and a dark purplish color of the solar cell can be prevented from being seen. In addition, a deep and stereoscopic pattern in a concave and convex shape can be displayed, and an improved design variation and a thin-shaped profile of the display panel can be implemented.

Moreover, an apparatus provided with a sophisticated and expensive-looking display panel having a metal sense like a metal display panel, a vivid color with whiteness, and an improved decorative effect can be proposed.

EFFECT OF THE INVENTION

For the display panel in accordance with the present invention, a pattern in a concave and convex shape is formed on the surface of the reflective polarizing plate. Consequently, in the case in which the display panel is used for a wristwatch of a solar cell driving type for instance, lights of an amount sufficient for an electric power generation in the solar cell can be supplied, and a cross line and a dark purplish color of the solar cell can be prevented from being seen. In addition, an improved design variation and a thin-shaped profile of the display panel can be implemented.

Moreover, a sophisticated and expensive-looking display panel provided with a metal sense like a metal display panel, a vivid color with whiteness, and an improved decorative effect can be implemented.

Moreover, a white color tone is increased by forming a diffusing layer on the reflective polarizing plate, whereby a sophisticated and expensive-looking display panel can be obtained.

Moreover, a display panel having a vivid color with brightness can be obtained by forming a light transmitting colored layer on the reflective polarizing plate.

Furthermore, the display panel is provided with a plurality of reflective polarizing plates, and the plurality of reflective polarizing plates are disposed in such a manner that the directions of the light transmission easy axes thereof are different from each other. Consequently, an amount of lights supplied to the solar cell can be adjusted simply and easily. As a result, an amount of lights supplied to the solar cell can be adjusted in such a manner that a metal color and a white tone color can appear more intensively on the display panel.

For the display panel in accordance with the present invention, the light transmitting substrate and the reflective polarizing plate are disposed on a visible side, and a pattern in a concave and convex shape is formed on the surface of the reflective polarizing plate. Consequently, in the case in which the display panel is used for a wristwatch of a solar cell driving type for instance, lights of an amount sufficient for an electric power generation in the solar cell can be supplied, and a cross line and a dark purplish color of the solar cell can be prevented from being seen. In addition, a deep and stereoscopic pattern in a concave and convex shape can be displayed, and an improved design variation of the display panel can be implemented.

Moreover, a sophisticated and expensive-looking display panel provided with a metal sense like a metal display panel, a vivid color with whiteness, and an improved decorative effect can be implemented. In addition, a white color tone is increased by forming a diffusing layer on the reflective polarizing plate or the light transmitting substrate, whereby a sophisticated and expensive-looking display panel can be obtained. Moreover, a display panel having a vivid color with brightness can be obtained by forming a light transmitting colored layer on the reflective polarizing plate or the light transmitting substrate.

By forming a pattern in a concave and convex shape on the surface of the light transmitting substrate, a display of a more intricate pattern can be achieved, and an improved design variation of the display panel can be implemented.

Moreover, a thickness of the display panel can be easily adjusted by varying a thickness of the light transmitting substrate.

Moreover, for the light transmitting substrate, there can be used for instance a semi-transparent color material, a retardation plate, and a metal plate provided with a plurality of transmission holes in addition to a transparent resin material. Furthermore, the light transmitting substrate can be combined with a reflective polarizing plate provided with a pattern in a concave and convex shape, whereby a display panel having a metal sense color and a vivid color with brightness can be obtained.

By the present invention, in the case in which the display panel in accordance with the present invention is used as a display panel for a clock, a measuring instrument panel of an electronic desk calculator, an automobile, and an airplane, and a display panel of an apparatus like a mobile apparatus such as a cellular phone, in particular, in the case in which the display panel is used for a wristwatch of a solar cell driving type for instance, lights of an amount sufficient for an electric power generation in the solar cell can be supplied, and a cross line and a dark purplish color of the solar cell can be prevented from being seen.

In addition, a deep and stereoscopic pattern in a concave and convex shape can be displayed, and an improved design variation and a thin-shaped profile of the display panel can be implemented.

Moreover, an apparatus provided with a sophisticated and expensive-looking display panel having a metal sense like a metal display panel, a vivid color with whiteness, and an improved decorative effect can be proposed.

BRIEF DESCRIPTION OF THE DRAWINGS

FIG. 1 shows a display panel in accordance with an embodiment 1 of the present invention. FIG. 1(*a*) is a plan view, and FIG. 1(*b*) is a cross-sectional view taken along the line A-A of FIG. 1(*a*).

FIG. 15 shows a display panel in accordance with an embodiment 8 of the present invention. FIG. 15(*a*) is a plan view, and FIG. 15(*b*) is a cross-sectional view taken along the line A-A of FIG. 15(*a*).

FIG. 27 shows a display panel in accordance with an embodiment 17 of the present invention. FIG. 27(*a*) is a plan view, and FIG. 27(*b*) is a cross-sectional view taken along the line A-A of FIG. 27(*a*).

FIG. 34 is a view showing a relationship between the arrangement of each optical axis of the first and second reflective polarizing plates and retardation plates in accordance with the embodiment 20 of the present invention and display colors.

FIG. 35(*a*) is a schematic cross-sectional view, FIG. 35(*b*) is a plan view showing a pressure sensitive adhesion containing a transparent substrate disposed between the first reflective polarizing plate and the second reflective polarizing plate, and FIG. 35(*c*) is a cross-sectional view showing the pressure sensitive adhesion containing a substrate.

FIG. 36 is a view showing a relationship among the arrangement of each optical axis of the first and second reflective polarizing plates in accordance with the embodiment 21 of the present invention, the arrangement in a longitudinal direction of a pressure-sensitive adhesive double coated tapes, and the display colors.

FIG. 47 is a photograph showing an experimental example in which a light transmittance was measured for a reflective polarizing plate without a pattern, a reflective polarizing plate in which a pattern was formed by a thermal transfer, and a reflective polarizing plate in which a pattern was formed by machining.

BEST MODE OF CARRYING OUT THE INVENTION

An embodiment (example) of the present invention will be described below in detail with reference to the drawings.

A display panel in accordance with the following embodiments 1 to 7 is provided with a solar cell and a reflective polarizing plate disposed on a visible side of the solar cell, and a pattern in a concave and convex shape is formed on the surface of the reflective polarizing plate. Consequently, lights of an amount sufficient for an electric power generation in the solar cell can be obtained, and a cross line and a dark purplish color of the solar cell can be prevented from being seen. In addition, a thin-shaped display panel having an improved decorative effect can be implemented. Moreover, a sophisticated and expensive-looking display panel having a metal sense like a metal display panel and a vivid color with whiteness and brightness can be implemented.

In the following embodiments, similar constructional elements are numerically numbered similarly and the detailed descriptions of the similar elements are omitted.

Embodiment 1

Figure 2:
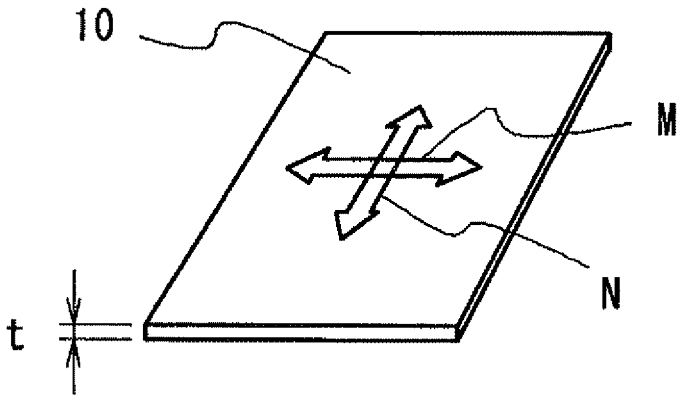
FIG. 2 is a perspective view showing a reflective polarizing plate substrate in accordance with the embodiment 1 of the present invention.
Figure 3:
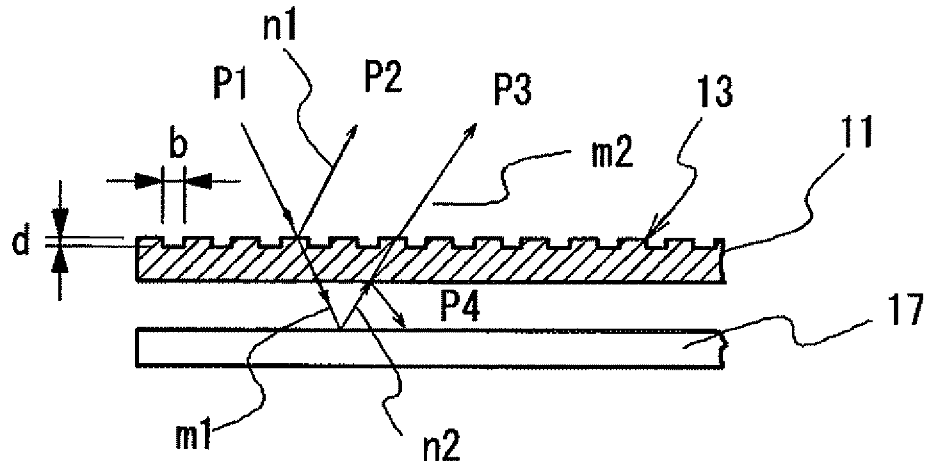
FIG. 3 is a ray diagram showing the path of light for the display panel in accordance with the embodiment 1 of the present invention.

FIG. 1 is a view showing a display panel in accordance with an embodiment 1 of the present invention. FIG. 1(*a*) is a plan view, and FIG. 1(*b*) is a cross-sectional view taken along the line A-A of FIG. 1(*a*). FIG. 2 is a perspective view showing a reflective polarizing plate substrate. FIG. 3 is a ray diagram showing the path of lights for the display panel.

As shown in FIG. 1, a display panel in accordance with the embodiment 1 is provided with a solar cell 17 and a reflective polarizing plate 11 disposed on a visible side of the solar cell 17.

In the embodiment shown in FIG. 1, an axis hole through which a hand spindle driving a minute hand and an hour hand (not shown) penetrates is formed in only the reflective polarizing plate 11. However, an axis hole through which the hand spindle of the movement disposed under the solar cell 17 penetrates is also formed in the solar cell 17 in practice. In the figure, an axis hole of the solar cell 17 is omitted for the sake of simplicity. (The configuration of an axis hole for the reflective polarizing plate, the light transmitting substrate, and the solar cell is also similarly adopted in the following embodiments.)

A stripe pattern 13 in a concave and convex shape is formed on the surface of a visible side of the reflective polarizing plate 11. In addition, a time character 15 and a mark or the like are also arranged on the surface.

The reflective polarizing plate 11 and the solar cell 17 are fixed to each other by a fixing member 19 made of a pressure sensitive adhesion or an adhesive agent on the peripheral parts of the surfaces thereof.

Without using the fixing member 19, the reflective polarizing plate 11 and the solar cell 17 can also be simply laminated and held by an inner frame or the like for the watch (this configuration is also similarly adopted in the following embodiments).

Moreover, the entire surfaces between the reflective polarizing plate 11 and the solar cell 17, and the entire surfaces between the light transmitting substrate described later and one of the above members can be fixed by the fixing member as a matter of course (this configuration is also similarly adopted in the following embodiments).

It is preferable that a reflective polarizing plate substrate as a material of the reflective polarizing plate 11 is a laminated body composed of a plurality of layers in which two kinds of films with different polarized natures are laminated alternately. The product DBEF-E (product name) manufactured by Sumitomo 3M Limited is used in this embodiment.

As shown in FIG. 2, a reflective polarizing plate substrate 10 composed of DBEF-E is provided with a light reflection axis N and a light transmission easy axis M. The reflective polarizing plate substrate 10 has characteristic properties in which a light of a linearly polarized component provided with a vibration plane parallel to the light reflection axis N is reflected and a light of a linearly polarized component provided with a vibration plane parallel to the light transmission easy axis M is transmitted. In addition, the reflective polarizing plate substrate 10 has characteristic properties in which lights of approximately 50% are transmitted and lights of another approximately 50% are reflected.

Many kinds of the reflective polarizing plate substrates 10 having a thickness t in the range of 130 to 400 μm are available in the market, and can be selected as needed.

By using the reflective polarizing plate substrate 10 having a surface in a concave and convex shape like an embossment, an interference fringe can be prevented in the case in which the solar cell 17 and the reflective polarizing plate 11 are disposed.

In this embodiment, the reflective polarizing plate substrate 10 having a thickness t of 160 μm is used. Moreover, in this embodiment, a stripe pattern 13 in a concave and convex shape is formed on the surface of the reflective polarizing plate substrate 10, and the reflective polarizing plate substrate 10 is then die-cut in the shape of a display panel to form the reflective polarizing plate 11 shown in FIG. 1.

The stripe pattern 13 in a concave and convex shape formed on the surface of the reflective polarizing plate 11 is engraved and formed by a machining process such as a cutting process. A depth and a width of a concave portion and a width of a convex portion for the stripe pattern 13 in a concave and convex shape are designed to be large enough in such a manner that the concave and convex are visible. Consequently, the pattern can be seen clearly from the upper side.

A value of a width b of the pattern 13 in a concave and convex shape formed by a cutting process is not restricted in particular. However, it is preferable that the width b is set in the range of 40 to 60 μm. Moreover, a value of a depth d of the pattern can be set properly. However, it is preferable that the depth d is set in the range of 10 to 20 μm.

The stripe pattern 13 in a concave and convex shape also has a function to refract and scatter a reflected light from the lower side. As a result, a stripe pattern and a metal sense are visible brightly and vividly by a reflected light of the reflective polarizing plate 11. In addition, a cross line and a dark purplish color of the solar cell are completely extinguished and prevented from being seen.

Although the pattern 13 in a concave and convex shape in accordance with this embodiment is formed in a stripe shape, another pattern in a concave and convex shape can also be formed. For instance, various patterns such as a circle pattern, a spiral pattern, a satin pattern, a lattice pattern, a generally pyramidal pattern, a geometric pattern, a stitch pattern, a stone like pattern, a sand pattern, a circular slit pattern, and a radial marking pattern can be selected depending on a required design.

The stripe pattern 13 in a concave and convex shape is formed by a machining process such as a cutting process in this embodiment. However, various processes such as a thermal transfer process, a press process, and a sand blasting process can also be used corresponding to a pattern to be selected. Moreover, a cross sectional shape of the pattern in a concave and convex shape can be selected as needed from a V shape, a U shape, a rectangular shape, and others.

The operation of the reflective polarizing plate 11 will be described in the following based on FIG. 3.

A light P1 irradiated to the reflective polarizing plate 11 is irradiated to the reflective polarizing plate 11 provided with a first pattern 13 in a concave and convex shape.

Of the lights irradiated to the reflective polarizing plate 11, a light n1 of a linearly polarized component provided with a vibration plane parallel to the light reflection axis of the reflective polarizing plate 11 is reflected from the reflective polarizing plate 11 and is radiated externally as a reflected light P2.

On the other hand, a light m1 of a linearly polarized component provided with a vibration plane parallel to the light transmission easy axis of the reflective polarizing plate 11 is transmitted in the reflective polarizing plate 11 and irradiated to a solar cell 17.

The lights irradiated to the solar cell 17 are classified into lights that are absorbed in the solar cell 17 and lights that are reflected from the solar cell 17. Of the lights reflected from the solar cell 17, a light m2 of a linearly polarized component provided with a vibration plane parallel to the light transmission easy axis of the reflective polarizing plate 11 is transmitted in the reflective polarizing plate 11 and is radiated externally as a reflected light P3.

On the other hand, a light n2 of a linearly polarized component provided with a vibration plane parallel to the light reflection axis of the reflective polarizing plate 11 is reflected by the reflective polarizing plate 11 and is returned to the solar cell 17 side as a reflected light P4. By the above configuration, an amount of the lights that are irradiated to the reflective polarizing plate 11 and that are reflected from the solar cell 17 and returned to the reflective polarizing plate 11 is extremely small.

As described above, the pattern 13 in a concave and convex shape is formed on the surface of the reflective polarizing plate 11. Consequently, the reflected light P2 over the surface of the reflective polarizing plate 11 and the reflected light P3 that is reflected on the solar cell 17 and that is transmitted in the reflective polarizing plate 11 do not become a reflected light in a uniform direction. The reflected light P2 and reflected light P3 become reflected lights that are dispersed and scattered in four ways and are radiated externally.

Therefore, lights that are reflected from the solar cell 17 become less, and a scattering occurs due to the operation of the pattern 13 in a concave and convex shape. Consequently, a cross line and a dark purplish color of the solar cell 17 are completely extinguished and are prevented from being seen.

As described above, for the display panel in accordance with this embodiment, a cross line and a dark purplish color of the solar cell 17 can be completely extinguished, a metal sense like a metal display panel can be obtained, and a vivid pattern can be seen, whereby a display panel having an improved decorative effect can be obtained. Moreover, in this embodiment, a value of a thickness of the reflective polarizing plate 11 is 160 μm, whereby a thin-shaped display panel with sophistication can be obtained.

Embodiment 2

Figure 4:
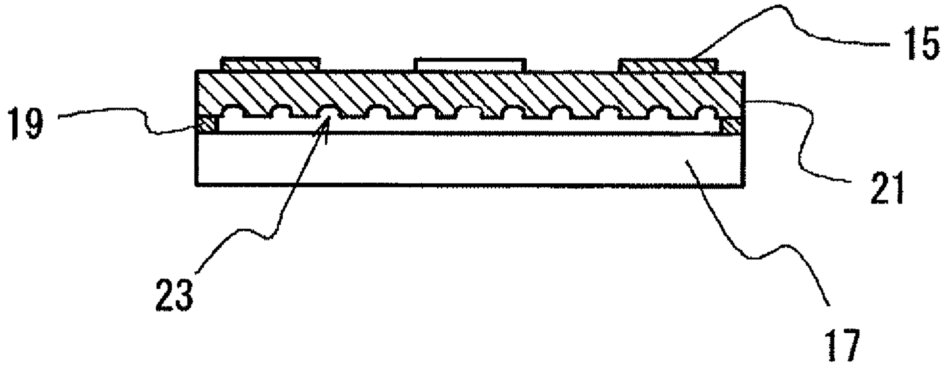
FIG. 4 is a cross-sectional view showing a display panel in accordance with an embodiment 2 of the present invention.

FIG. 4 is a cross-sectional view showing a display panel in accordance with an embodiment 2 of the present invention.

As shown in FIG. 4, for the display panel in accordance with the embodiment 2, unlike the embodiment 1, a satin pattern 23 in a concave and convex shape is formed on the surface of a reflective polarizing plate 21 on the side that faces to the solar cell 17 by a method of a transcription from a metal mold. However, other configurations are equivalent to those of the embodiment 1.

For the reflective polarizing plate 21 in accordance with this embodiment, the operations of a transmission and a reflection of a light are equivalent to those of the reflective polarizing plate 11 described in the embodiment 1.

For the satin pattern 23 in a concave and convex shape formed on the surface of the reflective polarizing plate 21, a metal color sense and a white color sense of the display panel can be adjusted by varying a size of a concave and a convex.

In the case in which a size of a concave and a convex is #180 or higher that is a number representing a roughness of a sandpaper, a color sense in which equal parts of a metal color sense and a white color sense are mixed can be obtained. In the case of #400, a metal color sense sparsely appears a little in a white color, thereby obtaining a beautiful white color sense.

As a size of a concave and a convex is smaller, an effect of a white color sense becomes more prominent. However, in the case of higher than #2000, the pattern is not transcribed and is seen in a state that a metal color sense is tarnished rather than a white color sense.

In the case of #120, a metal color sense appears more intensively than a white color sense.

Consequently, in the case in which a white color sense is obtained, it is preferable that a size of a concave and a convex is set to a roughness in the range of #180 to #2000.

In the case in which a metal color sense is highlighted, it is preferable that a size of a concave and a convex is set to a roughness of less than #120.

In the case in which a satin pattern is formed for a metal mold, a sand blasting method in which sand or the like is blasted at a high pressure is used in general. A roughness of the satin pattern can be selected by adjusting a particle diameter of sands to be used.

Figure 46:
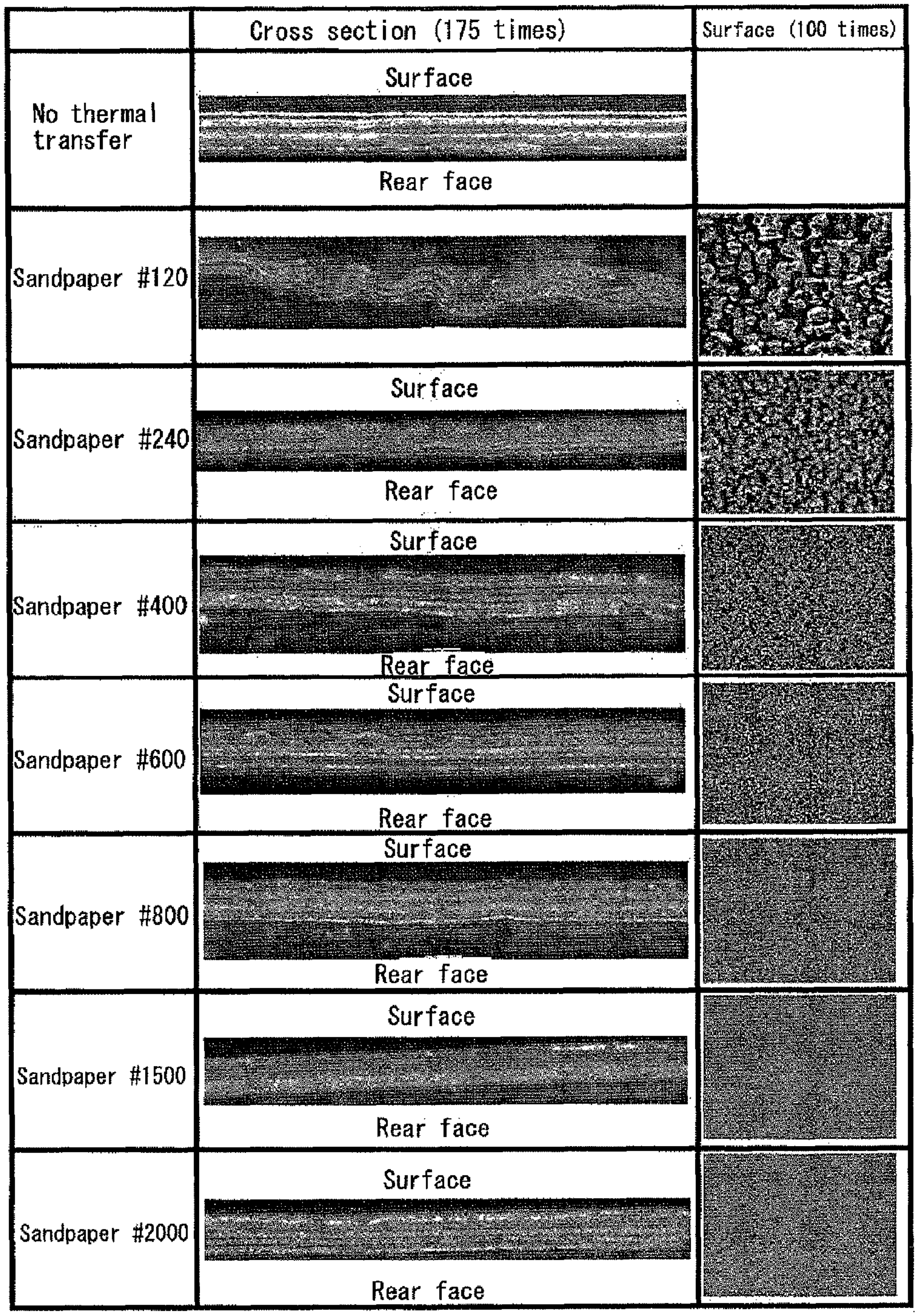
FIG. 46 is a microscope photograph showing an experimental example in which a thermal transfer state of a reflective polarizing plate was verified using an optical microscope photograph.
Figure 48:
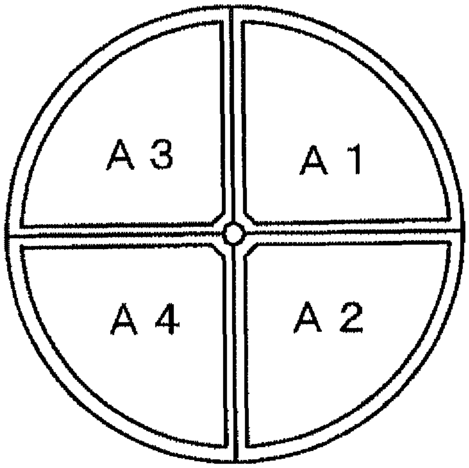
FIG. 48 Prior Art
FIG. 48 is a plan view showing a general solar cell.
Figure 49:
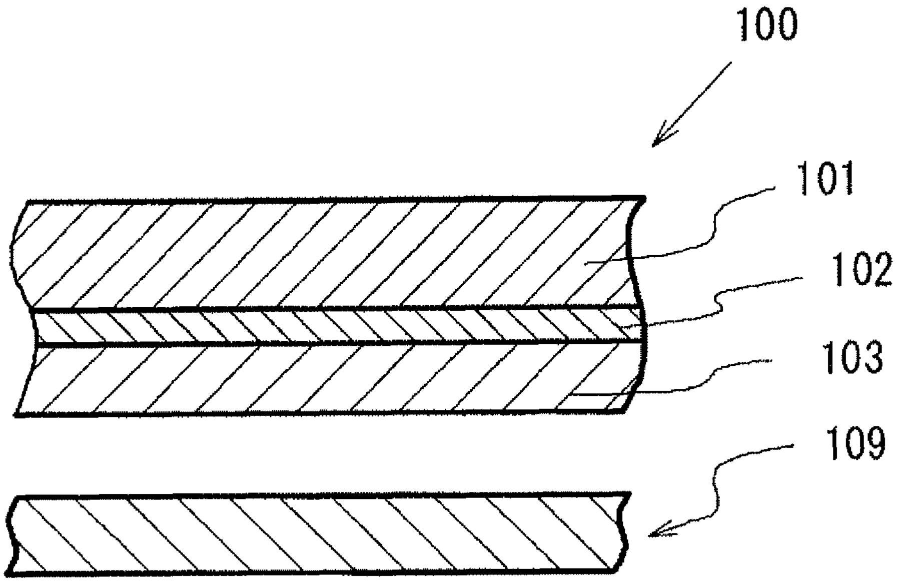
FIG. 49 Prior Art
FIG. 49 is a schematic cross-sectional view showing a display panel in a conventional art.
Figure 50:
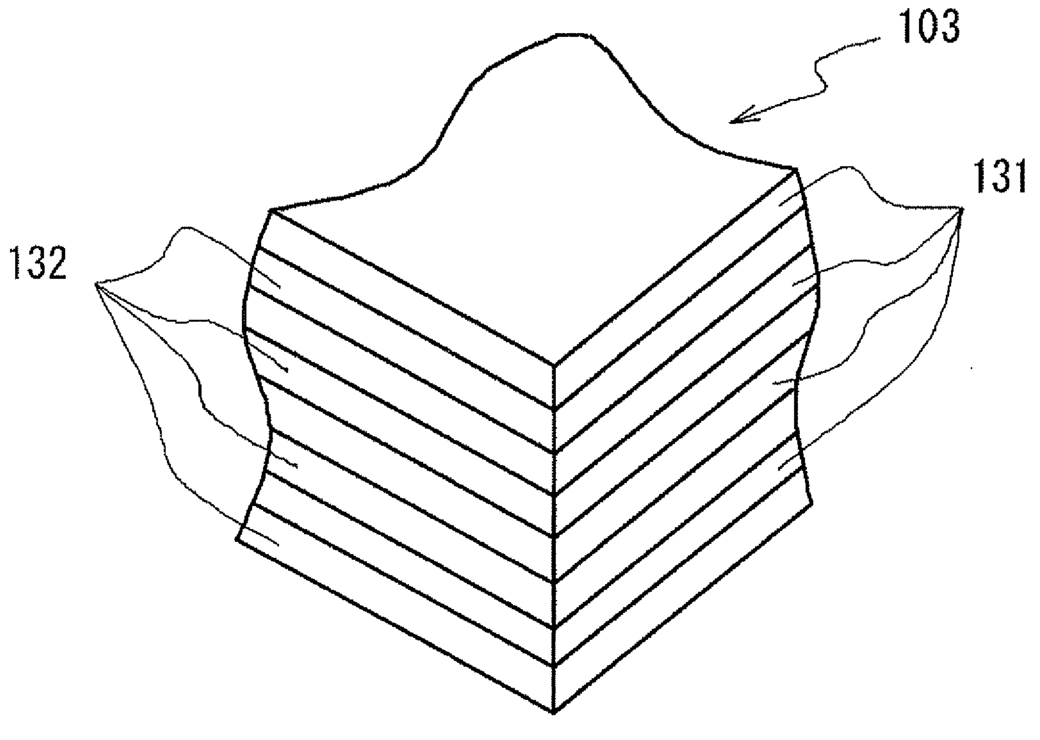
FIG. 50 Prior Art
FIG. 50 is a schematic perspective view showing a reflection polarizing substance in a conventional art.

FIG. 46 shows an experimental example in which the above state, that is, a thermal transfer state of a reflective polarizing plate was verified using an optical microscope photograph. A cross section (175 times) and a surface (100 times) were verified by using a microscope manufactured by KEYENCE CORPORATION.

FIG. 47 is a photograph showing an experimental example in which a light transmittance was measured for a reflective polarizing plate. As a result, a light transmittance was 48.8% for a reflective polarizing plate without a pattern. Like the embodiment 2, for a reflective polarizing plate (a longitudinal wave pattern) in which a thermal transfer was carried out, a light transmittance was 48.8% and was not reduced as compared with a reflective polarizing plate without a pattern.

Like the embodiment 1, for a reflective polarizing plate (a longitudinal wave pattern) in which a pattern was formed by machining, a light transmittance was 64.6% and was improved as compared with a light transmittance of a reflective polarizing plate without a pattern.

In this case, a light transmittance can be obtained by an amount of an electric power generation of a solar battery using a light transmitted in a dial plate for a solar battery watch in general. More specifically, a current value is A0 in the case in which a light is applied to a solar battery disposed at a certain distance from a light source in an apparatus in which an outside light is prevented from entering and a light energy is converted into an electrical energy, and a current value is A1 in the case in which a dial plate for a solar battery watch is disposed on the solar battery and the measurement equivalent to the above is carried out. As a result, a light transmittance can be expressed in a percentage of A1 to A0.

For the display panel in accordance with this embodiment, a satin pattern 23 in a concave and convex shape is formed on the surface of the reflective polarizing plate 21 on the side that faces to the solar cell 17. However, as described in the above embodiment 1, another pattern in a concave and convex shape can also be formed. Moreover, the satin pattern 23 in a concave and convex shape is formed by a transcription from a metal mold. However, various processes such as a cutting process, a press process, and a sand blasting process can also be used corresponding to a pattern to be selected.

As described above, a white color sense like a metal display panel can be obtained by the display panel in accordance with this embodiment. Moreover, an effect similar to that of the embodiment 1 can also be obtained in this embodiment. Furthermore, a translucent pattern can be visible by forming the pattern in a concave and convex shape on the surface of the reflective polarizing plate 21 on the side that faces to the solar cell 17, whereby a sophisticated and expensive-looking display panel can be obtained.

Embodiment 3

Figure 5:
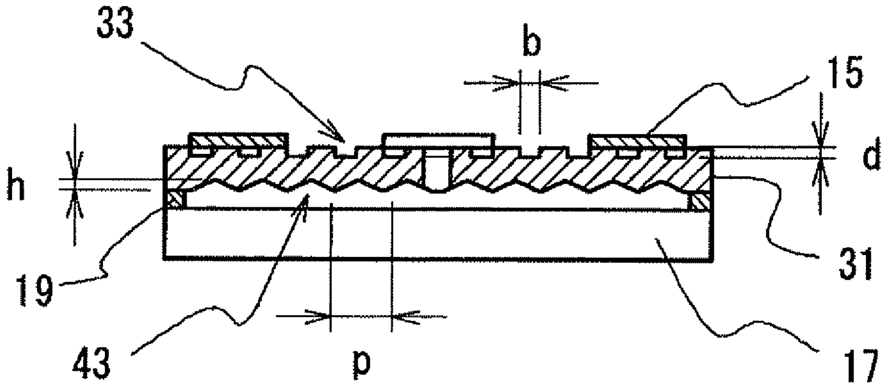
FIG. 5 is a cross-sectional view showing a display panel in accordance with an embodiment 3 of the present invention.
Figure 6:
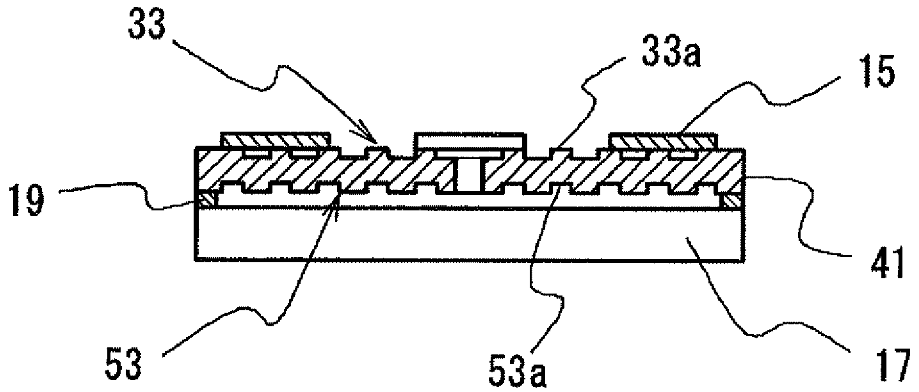
FIG. 6 is a cross-sectional view showing another embodiment of a display panel in accordance with the embodiment 3 of the present invention.

FIGS. 5 and 6 show a display panel in accordance with an embodiment 3 of the present invention, and an embodiment in which a pattern in a concave and convex shape is formed on the both surfaces of the reflective polarizing plate.

As shown in FIG. 5, for the display panel in accordance with this embodiment, a lattice pattern 33 in a concave and convex shape is formed on the surface of a visible side of the reflective polarizing plate 31, and a pattern 43 in a concave and convex shape in a circle shape or a spiral shape is formed on the surface on the side that faces to the solar cell 17. The both patterns in a concave and convex shape are formed by a transcription from a metal mold, and can be formed simultaneously on the both surfaces.

Other configurations are equivalent to those of the embodiment 1. For the reflective polarizing plate 31 in accordance with this embodiment, the operations of a transmission and a reflection of a light are equivalent to those of the reflective polarizing plate 11 described in the embodiment 1.

A depth and a width of a concave portion and a width of a convex portion for the lattice pattern 33 in a concave and convex shape formed on the surface of a visible side of the reflective polarizing plate 31 are designed to be large enough in such a manner that the concave and convex are visible. Consequently, the pattern can be seen clearly from the upper side.

A value of a width b of the pattern 33 in a concave and convex shape is not restricted in particular. However, it is preferable that the width b is set in the range of 40 to 60 μm. Moreover, a value of a depth d of the pattern can be set properly. However, it is preferable that the depth d is set in the range of 10 to 20 μm.

The pattern 43 in a concave and convex shape in a circle shape or a spiral shape formed on the surface of the reflective polarizing plate 31 on the side that faces to the solar cell 17 has a cross sectional shape of a triangle, and is formed in a circle pattern shape or a spiral pattern shape. An angle of a triangle is in the range of 75 to 100 degrees at a concave portion and a convex portion. Moreover, a height h of the triangle is in the range of 10 to 20 μm, and a pitch p thereof is approximately 100 μm. It is preferable that the height and pitch are in a size of a visible degree in such a manner that the processing of a metal mold is easy.

For the display panel in accordance with this embodiment, a lattice pattern in a concave and convex shape and a pattern in a concave and convex shape in a circle pattern shape or a spiral pattern shape are formed on the surfaces of the reflective polarizing plate 31, respectively. However, provided different patterns are formed on the both surfaces, respectively, other patterns in a concave and convex shape can also be formed.

Moreover, the patterns 33 and 43 in a concave and convex shape are formed by a transcription from a metal mold. However, various processes such as a cutting process, a press process, a sand blasting process, and a combination thereof can also be used corresponding to a pattern to be selected.

As described above, for the display panel in accordance with this embodiment, the different patterns 33 and 43 in a concave and convex shape are formed on the both surfaces of the reflective polarizing plate 31. Consequently, the patterns 33 and 43 in a concave and convex shape can be seen in such a manner that the patterns 33 and 43 are superimposed on each other. The patterns 33 and 43 in a concave and convex shape also have a function to refract and scatter a reflected light.

As a result, by a reflected light of the reflective polarizing plate 31, an intricate pattern in which two patterns are combined is displayed with a bright metal color sense, whereby a design variation of the display panel can be enlarged. In addition, a cross line and a dark purplish color of the solar cell are completely extinguished and are prevented from being seen.

FIG. 6 is a cross-sectional view showing another embodiment of a display panel in accordance with the embodiment 3 of the present invention.

As shown in FIG. 6, for the display panel in accordance with this embodiment, a lattice pattern 33 in a concave and convex shape is formed on the surface of a visible side of the reflective polarizing plate 41, and a lattice pattern 53 in a concave and convex shape is formed on the surface on the side that faces to the solar cell 17.

More specifically, the patterns 33 and 53 in a concave and convex shape are formed in such a manner that a concave portion 53*a* of the pattern 53 in a concave and convex shape is disposed at a position corresponding to a convex portion 33*a* of the pattern 33 in a concave and convex shape.

Other configurations are equivalent to those of the embodiment 3. For the display panel in accordance with this embodiment, a depth of a lattice pattern in a concave and convex shape is highlighted, and a pattern in a concave and convex shape with a stereoscopic sense can be seen, whereby a more sophisticated and expensive-looking display panel can be obtained.

Embodiment 4

Figure 7:
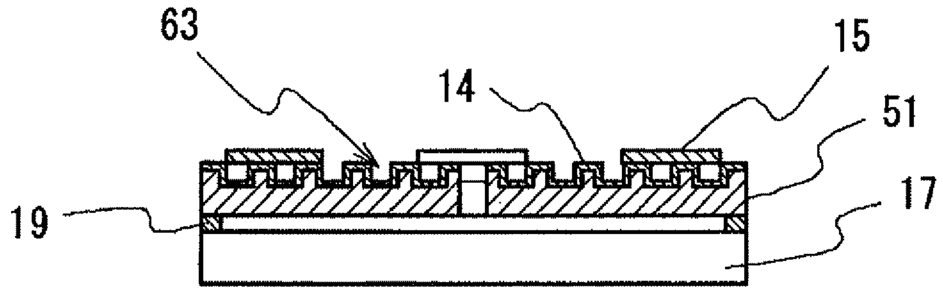
FIG. 7 is a cross-sectional view showing a display panel in accordance with an embodiment 4 of the present invention.
Figure 8:
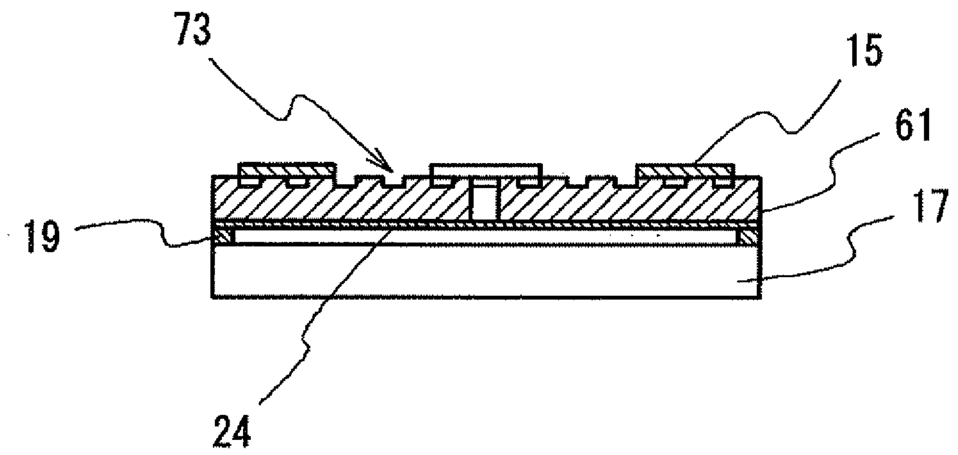
FIG. 8 is a cross-sectional view showing another embodiment of a display panel in accordance with the embodiment 4 of the present invention.
Figure 9:
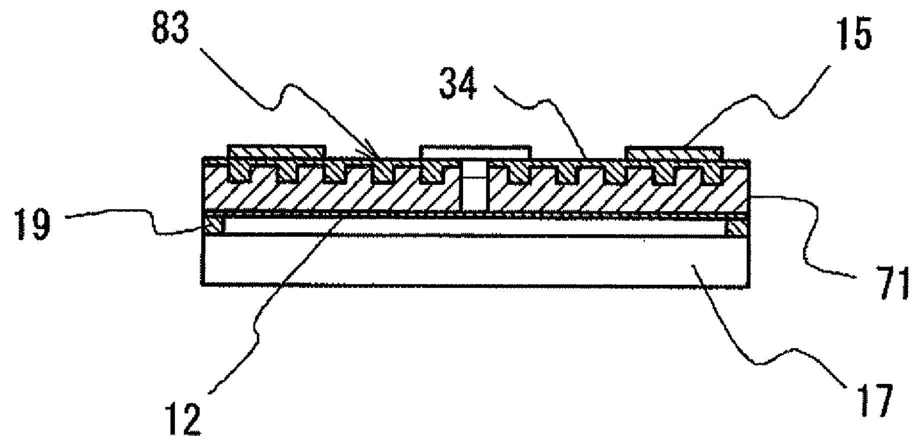
FIG. 9 is a cross-sectional view showing a display panel in accordance with the embodiment 4 of the present invention.

FIGS. 7 to 9 are views showing a display panel in accordance with an embodiment 4 of the present invention, and an embodiment in which a pattern in a concave and convex shape is formed on the surface of the reflective polarizing plate and a light transmitting colored layer or a diffusing layer is formed.

FIG. 7 is a view showing a display panel in which a pattern in a concave and convex shape is formed on the surface of a visible side of the reflective polarizing plate and a light transmitting colored layer is formed on the surface of a visible side.

As shown in FIG. 7, for the display panel in accordance with this embodiment, a pattern 63 in a concave and convex shape in a circle shape is formed on the surface of a visible side of the reflective polarizing plate 51, and a light transmitting colored layer 14 is formed on the surface of the pattern 63 in a concave and convex shape.

The pattern 63 in a concave and convex shape in a circle shape is formed by a transcription from a metal mold. The values of a width and a depth of the pattern 63 in a concave and convex shape are not restricted in particular. However, it is preferable that the width and depth are set in the range of 10 to 15 μm.

Other configurations are equivalent to those of the embodiment 1. For the reflective polarizing plate 51 in accordance with this embodiment, the operations of a transmission and a reflection of a light are equivalent to those of the reflective polarizing plate 11 described in the embodiment 1.

The light transmitting colored layer 14 is formed by a method for printing an ink in which the copper metal powder is mixed to a transparent urethane resin. The display board is finished in such a manner that a gold color tone appears as a whole by a color of a reflected light of the reflective polarizing plate 51 and a color of the light transmitting colored layer 14.

As described above, for the display panel in accordance with this embodiment, a pattern 63 in a concave and convex shape in a circle shape can be seen clearly from a visible side. The pattern 63 in a concave and convex shape in a circle shape also has a function to refract and scatter a reflected light from the lower side. As a result, the pattern 63 in a concave and convex shape in a circle shape and a gold color tone can be seen brightly and vividly by a strong reflected light of the reflective polarizing plate 51. Therefore, the display board having a noble metal sense and sophistication can be obtained. In addition, a color of the solar cell 17 is completely extinguished and prevented from being seen.

FIG. 8 is an embodiment in which a pattern in a concave and convex shape is formed on the surface of a visible side of the reflective polarizing plate, and the light transmitting colored layer is formed on the surface on the side that faces to the solar cell 17.

As shown in FIG. 8, for the display panel in accordance with this embodiments a radial pattern 73 in a concave and convex shape is formed on the surface of a visible side of a reflective polarizing plate 61 from a center hole, and a so-called radial marking pattern is formed. The pattern 73 in a concave and convex shape is formed using a radial marking pattern dedicated apparatus.

The values of a width and a depth of the pattern 73 in a concave and convex shape are not restricted in particular. However, it is preferable that the width and depth are set to approximately 5 μm. Moreover, a light transmitting colored layer 24 is formed on the surface of the reflective polarizing plate 61 on the side that faces to the solar cell 17.

The light transmitting colored layer 24 is formed by mixing a white pigment to a resin and by a printing method. It is to color the display board to be white that the white pigment is used. In the case in which the light transmitting colored film is thicker, the display board is colored to be white, but a light transmittance is degraded.

Consequently, the light transmitting colored film is thinned to be in the range of 7 to 10 μm, and a light transmittance thereof is decreased by approximately 10% due to the thickness. In the case in which the light transmitting colored film is toned to be another color, another pigment can be used. Moreover, an extremely thin metal film can be formed by a method such as evaporation. The material and method can be selected as needed corresponding to a desired color tone.

A diffusing layer can also be formed in place of the light transmitting colored layer 24 to obtain a similar white color sense. The diffusing layer is made of a substance in which a diffusing agent having a function for diffusing an irradiated light is mixed to a pressure sensitive adhesive or an adhesive agent. As a material of the diffusing agent, there can be used for instance a material such as silica, glass, and a resin having a shape in a granular state, a powdered state, a scale-like state, or an acicular state.

As described above, for the display panel in accordance with this embodiment, a color of the solar cell 17 can be completely extinguished, a white color tone is increased, a white color sense is highlighted, and a radial marking pattern can be seen vividly. As a result, a sophisticated and expensive-looking display panel can be obtained.

FIG. 9 is an embodiment in which a pattern in a concave and convex shape is formed on the surface of a visible side of the reflective polarizing plate, and the light transmitting colored layer is formed on the surface of a visible side and on the surface on the side that faces to the solar cell.

As shown in FIG. 9, for the display panel in accordance with this embodiment, a stone pattern 83 in a concave and convex shape is formed on the surface of a visible side of the reflective polarizing plate 71, and a light transmitting colored layer 34 is formed on the surface of the pattern 83 in a concave and convex shape. Moreover, a diffusing layer 12 is formed on the surface on the side that faces to the solar cell 17.

The stone pattern 83 in a concave and convex shape is formed by a transcription from a metal mold. The values of a width and a depth of the pattern 83 in a concave and convex shape are not restricted in particular. However, it is preferable that the width and depth are set in the range of 10 to 25 μm.

Other configurations are equivalent to those of the embodiment 1. For the reflective polarizing plate 71 in accordance with this embodiment, the operations of a transmission and a reflection of a light are equivalent to those of the reflective polarizing plate 11 described in the embodiment 1.

For a first light transmitting colored layer 34, the stone pattern 83 in a concave and convex shape is coated with a transparent blue coating compound in such a manner that a concave portion of the stone pattern 83 is completely filled to form a thick film layer, and the surface of the thick film layer is then polished to form a flat and smooth surface.

For the diffusing layer 12, a resin in a scale-like state is mixed to a pressure sensitive adhesive as a material of the diffusing agent.

By this configuration, a blue stone pattern appears brightly and vividly by a reflected light of the reflective polarizing plate 71, a blue color of the light transmitting colored layer 34, and a diffusing operation of the diffusing layer 12.

As described above, for the display panel in accordance with this embodiment, a blue stone pattern 83 in a concave and convex shape can be seen clearly from a visible side. Since the surface of the light transmitting colored layer 34 is polished to form a flat and smooth surface, a blue stone pattern becomes deep, and a sophisticated and expensive-looking display board can be obtained. In addition, a color of the solar cell 17 is completely extinguished and prevented from being seen.

Embodiment 5

Figure 10:
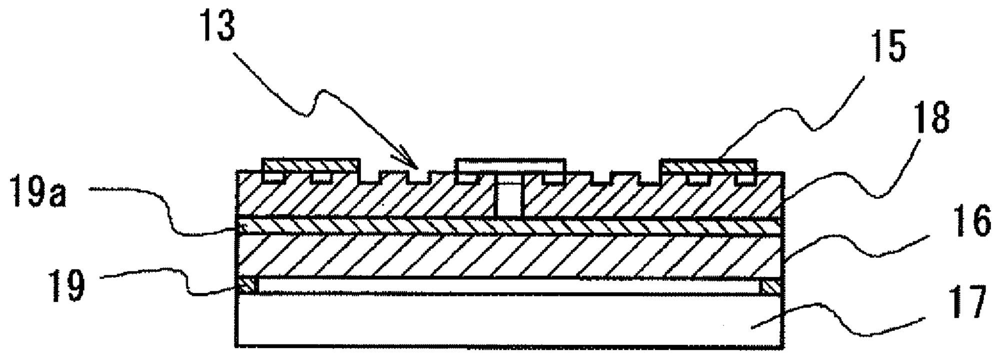
FIG. 10 is a cross-sectional view showing a display panel in accordance with an embodiment 5 of the present invention.
Figure 11:
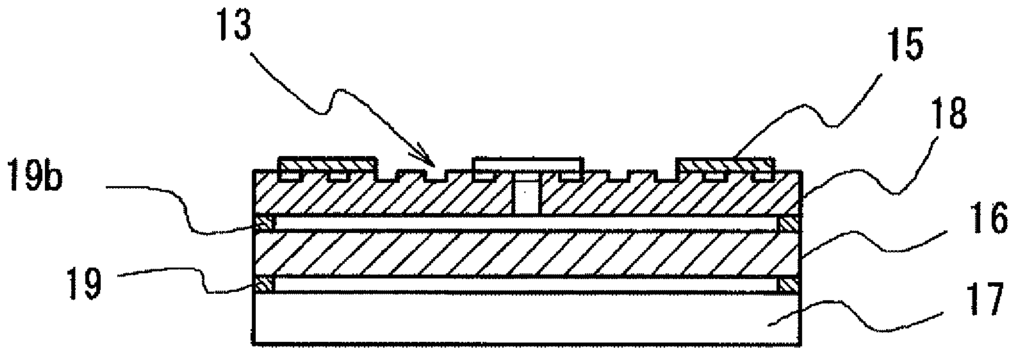
FIG. 11 is a cross-sectional view showing another embodiment of a display panel in accordance with the embodiment 5 of the present invention.

FIGS. 10 and 11 are views showing a display panel in accordance with an embodiment 5 of the present invention, and an embodiment in which two reflective polarizing plates are laminated and a pattern in a concave and convex shape is formed on the surface of the reflective polarizing plate disposed on a visible side.

As shown in FIG. 10, the display panel in accordance with the embodiment 5 is provided with the solar cell 17, a first reflective polarizing plate 18 formed on a visible side of the solar cell 17, and a second reflective polarizing plate 16 formed on the side on the side that faces to the solar cell 17.

A stripe pattern 13 in a concave and convex shape is formed on the surface of a visible side of the first reflective polarizing plate 18. In addition, a time character 15 and a mark or the like are also arranged on the surface. Moreover, the first reflective polarizing plate 18 and the second reflective polarizing plate 16 are fixed to each other by a fixing member 19*a* made of a transparent pressure sensitive adhesion or an adhesive agent on the entire surfaces thereof.

Moreover, the second reflective polarizing plate 16 and the solar cell 17 are fixed to each other by a fixing member 19 made of a pressure sensitive adhesion or an adhesive agent on the peripheral part of each other.

The first reflective polarizing plate 18 and the pattern 13 in a concave and convex shape are equivalent to the reflective polarizing plate 11 and the pattern 13 in a concave and convex shape in accordance with the embodiment 1, respectively, and the detailed descriptions of the elements are omitted.

Unlike the embodiment 1, a pattern in a concave and convex shape is not formed on the surface of the second reflective polarizing plate 16. However, for the second reflective polarizing plate 16, the operations of a transmission and a reflection of a light and other points are equivalent to those of the reflective polarizing plate 11 described in the embodiment 1.

Figure 14:
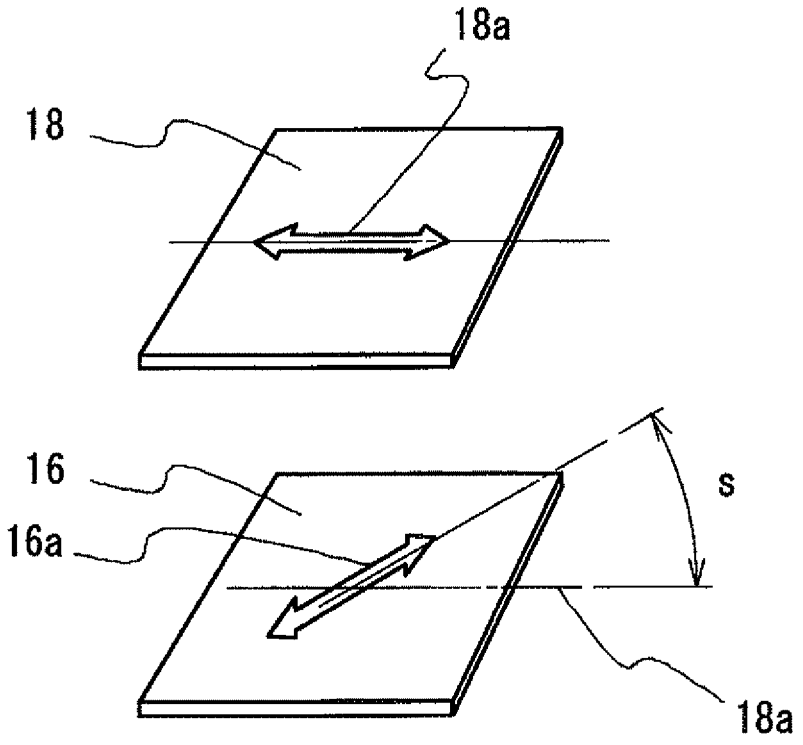
FIG. 14 is a perspective view showing the first and second reflective polarizing plates in accordance with the embodiment 5 of the present invention.

As described in the embodiment 1, the first reflective polarizing plate 18 and the second reflective polarizing plate 16 are both provided with a light reflection axis and a light transmission easy axis. In this embodiment, as shown in FIG. 14, the first reflective polarizing plate 18 and the second reflective polarizing plate 16 are laminated in such a manner that a direction of the light transmission easy axis 18*a* and a direction of the light transmission easy axis 16*a* are different from each other.

An amount of lights transmitted in two reflective polarizing plates of the first reflective polarizing plate 18 and the second reflective polarizing plate 16 can be adjusted by varying a value of a crossed axes angle s of the light transmission easy axis 18*a* and the light transmission easy axis 16*a*.

It is preferable that a value of a crossed axes angle s is set to an angle in the range of 5 to 45 degrees in order to ensure an amount of lights transmitted in the two reflective polarizing plates.

In this embodiment, a value of a crossed axes angle s is set to approximately 20 degrees. The first reflective polarizing plate 18 and the second reflective polarizing plate 16 are in a circular shape in practice. However, in FIG. 14, the first reflective polarizing plate 18 and the second reflective polarizing plate 16 are drawn in a rectangular shape in a simulated manner as a matter of practical convenience for an explanation.

Similarly to the embodiment 1, for the first reflective polarizing plate 18 in accordance with this embodiment, a stripe pattern 13 in a concave and convex shape is formed on the surface of the reflective polarizing plate substrate 10, and the reflective polarizing plate substrate 10 is then die-cut in the shape of a display panel to form the first reflective polarizing plate 18.

Similarly to the above, the second reflective polarizing plate 16 is formed by die-cutting the reflective polarizing plate substrate 10 in the shape of a display panel. The surface of the first reflective polarizing plate 18 on which a pattern in a concave and convex shape is not formed and the surface of the second reflective polarizing plate 16 are then superimposed, and the first reflective polarizing plate 18 and the second reflective polarizing plate 16 are fixed to and integrated with each other by a fixing member 19*a* made of a transparent pressure sensitive adhesion or an adhesive agent on the entire surfaces thereof.

As described above, for the display panel in accordance with this embodiment, an amount of lights transmitted in two reflective polarizing plates can be adjusted simply and easily by varying a value of a crossed axes angle s of the light transmission easy axis 18*a* and the light transmission easy axis 16*a* in two reflective polarizing plates of the first reflective polarizing plate 18 and the second reflective polarizing plate 16.

As a result, a manufacturing cost can be reduced. Moreover, similarly to the embodiment 1, a color of the solar cell 17 can be completely extinguished, and a stripe pattern can be seen vividly.

FIG. 11 is a view showing another embodiment of a display panel in accordance with this embodiment of the present invention. As shown in FIG. 11, the first reflective polarizing plate 18 and the second reflective polarizing plate 16 can be fixed by a fixing member 19*b* made of a pressure sensitive adhesion or an adhesive agent on the peripheral parts of the surfaces thereof.

Moreover, the first reflective polarizing plate 18 and the second reflective polarizing plate 16 can adhere or be bonded to each other at a position corresponding to the time character 15. Consequently, an amount of lights transmitted in the two reflective polarizing plates can be ensured even in the case in which an opaque fixing member 19*b* is used.

Embodiment 6

Figure 12:
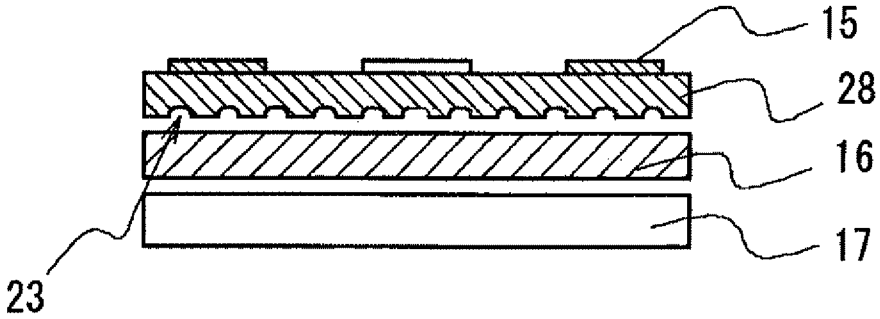
FIG. 12 is a cross-sectional view showing a display panel in accordance with an embodiment 6 of the present invention.

FIG. 12 is a view showing a display panel in accordance with an embodiment 6 of the present invention. In this embodiment, the display panel is provided with a first reflective polarizing plate 28 and the second reflective polarizing plate 16. A satin pattern 23 in a concave and convex shape is formed on the surface of the first reflective polarizing plate 28 on the side that faces to the second reflective polarizing plate 16. Without using a fixing member, the first reflective polarizing plate 28, the second reflective polarizing plate 16, and the solar cell 17 are simply laminated and held by an inner frame or the like for the watch.

In this embodiment, a value of a crossed axes angle s is set to approximately 15 degrees in order to ensure an amount of transmitted lights in consideration of the satin pattern 23 in a concave and convex shape. Other configurations are equivalent to those of the embodiment 5.

The first reflective polarizing plate 28 and the satin pattern 23 in a concave and convex shape are equivalent to the reflective polarizing plate 21 and the pattern 23 in a concave and convex shape in accordance with the embodiment 2, respectively, and the detailed descriptions of the elements are omitted.

By the above configuration, a color of the solar cell 17 can be completely extinguished, a white color tone is increased, and a white color sense can be seen. As a result, a sophisticated and expensive-looking display panel can be obtained. Moreover, an effect similar to that of the embodiment 5 can also be obtained in this embodiment.

Embodiment 7

Figure 13:
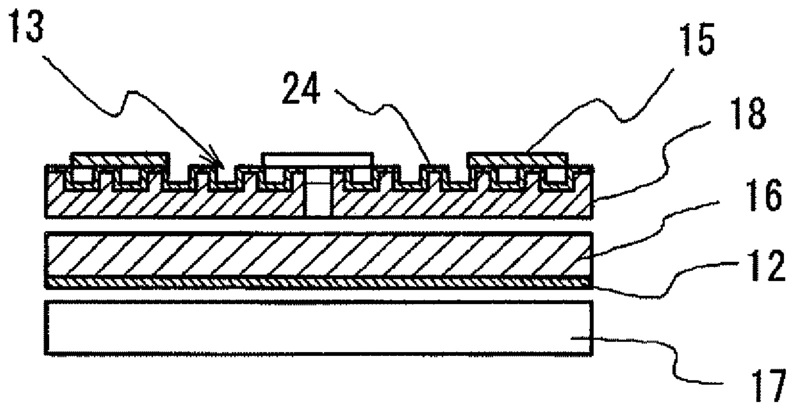
FIG. 13 is a cross-sectional view showing a display panel in accordance with an embodiment 7 of the present invention.

FIG. 13 is a view showing a display panel in accordance with an embodiment 7 of the present invention. In this embodiment, a pattern 13 in a concave and convex shape is formed on the surface of a visible side of the first reflective polarizing plate 18 of the embodiment 5 and a light transmitting colored layer 24 is formed on the surface of the visible side. Moreover, a diffusing layer 12 is formed on the surface of the second reflective polarizing plate 16 on the side that faces to the solar cell 17.

Without using a fixing member, the first reflective polarizing plate 18, the second reflective polarizing plate 16, and the solar cell 17 are simply laminated and held by an inner frame or the like for the watch. In this embodiment, a value of a crossed axes angle s is set to approximately 15 degrees. Other configurations are equivalent to those of the embodiment S.

Similarly to the embodiment shown in FIG. 8 of the embodiment 4, the light transmitting colored layer 24 is formed by mixing a white pigment to a resin and by a printing method. It is to color the display board to be white that the white pigment is used. A film thickness of the light transmitting colored layer 24 is thin to be in the range of 7 to 10 μm.

For the diffusing layer 12, a glass in a granular state is mixed to a pressure sensitive adhesive as a material of the diffusing agent.

By the above configuration, a stripe pattern in which a white color tone is increased and a white color sense is highlighted can be seen vividly by a reflected light of the first reflective polarizing plate 18 and the second reflective polarizing plate 16, a white color of the light transmitting colored layer 24, and a diffusing operation of the diffusing layer 12.

As a result, a sophisticated and expensive-looking display board can be obtained, and a color of the solar cell 17 can be completely extinguished. Moreover, an effect similar to that of the embodiment 5 can also be obtained in this embodiment.

In the embodiments 5 to 7, a pattern in a concave and convex shape is formed on the surface of a visible side of the first reflective polarizing plate or on the surface on the side that faces to the solar cell. However, the pattern in a concave and convex shape can also be formed on the both surfaces.

Moreover, two reflective polarizing plates of the same kind are used in the embodiments 5 to 7. However, the present invention is not restricted to the embodiments, and three or more reflective polarizing plates can also be used. Furthermore, a plurality of reflective polarizing plates of different kinds can also be combined to be used.

A display panel in accordance with the following embodiments 8 to 16 is provided with a solar cell, and a light transmitting substrate and a reflective polarizing plate that are disposed on a visible side of the solar cell. A pattern in a concave and convex shape is formed on the surface of the reflective polarizing plate. Consequently, lights of an amount sufficient for an electric power generation in the solar cell can be supplied, and a cross line and a dark purplish color of the solar cell can be prevented from being seen. In addition, a deep and stereoscopic pattern in a concave and convex shape can be displayed, and a display panel having an improved decorative effect can be implemented.

A reflective polarizing plate can be disposed above or below a light transmitting substrate. In the case in which a reflective polarizing plate is disposed below a light transmitting substrate, a pattern in a concave and convex shape of the reflective polarizing plate can be seen through the light transmitting substrate, whereby a deep and stereoscopic pattern can be displayed.

In this case, for a light transmitting substrate 16A, there can be used for instance a film made of a transparent resin material such as polycarbonate and acrylic, an inorganic material such as glass, sapphire, and ceramics, and a semi-transparent color material such as a resin. Consequently, a display panel having a vivid color can be implemented. In particular, in the case in which polycarbonate or acrylic is used for the substrate, a light resistance can be further improved. Moreover, it is more preferable that an ultraviolet light cut (absorption) layer is formed, and an ultraviolet light cut (absorption) agent is contained.

In the case in which a reflective polarizing plate is disposed above a light transmitting substrate, a retardation plate or a metal plate provided with a plurality of small holes capable of transmitting a light is used in addition to the above materials, and the plate is combined with a reflective polarizing plate provided with a pattern in a concave and convex shape, whereby a display panel having a metal sense color and a vivid color with brightness can be implemented.

Moreover, a sophisticated and expensive-looking display panel having a vivid color with whiteness can be obtained by forming a light transmitting colored layer or a diffusing layer on the surface of a light transmitting substrate or a reflective polarizing plate. The similar effect can be obtained by containing a coloring agent or a diffusing agent in a light transmitting substrate or a reflective polarizing plate.

Embodiment 8

Figure 16:
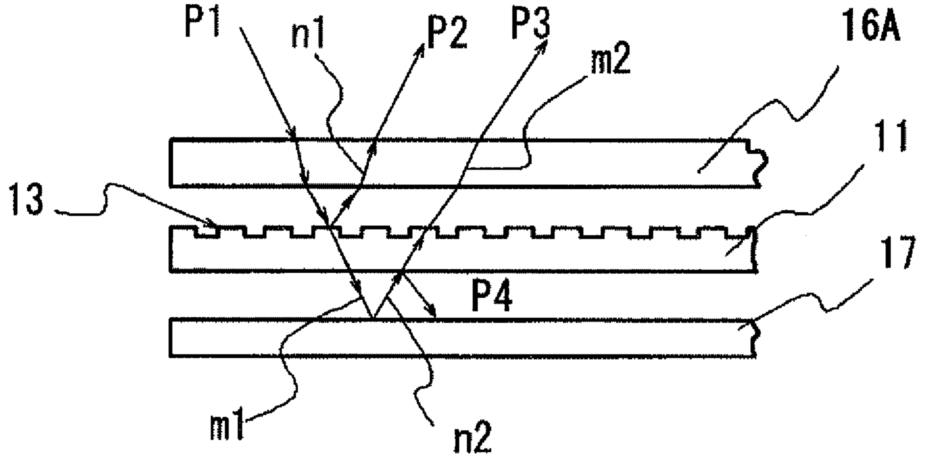
FIG. 16 is a ray diagram showing the path of light for the display panel in accordance with the embodiment 8 of the present invention.

FIG. 15 is a view showing a display panel in accordance with an embodiment 8 of the present invention. FIG. 15(*a*) is a plan view, and FIG. 15(*b*) is a cross-sectional view taken along the line A-A of FIG. 15(*a*). FIG. 16 is a ray diagram showing the path of lights for the display panel.

As shown in FIG. 15, the display panel in accordance with the embodiment 8 is provided with a solar cell 17, a light transmitting substrate 16A formed on a visible side of the solar cell 17, and a reflective polarizing plate 11 disposed between the solar cell 17 and the light transmitting substrate 16A.

A time character 15 and a mark or the like are arranged on the surface on a visible side of the light transmitting substrate 16A. A stripe pattern 13 in a concave and convex shape is formed on the surface of the reflective polarizing plate 11 on the side that faces to the light transmitting substrate 16A.

The light transmitting substrate 16A and the reflective polarizing plate 11 are fixed to each other by a fixing member 19*a* made of a pressure sensitive adhesion or an adhesive agent on the peripheral part of each other. Moreover, the reflective polarizing plate 11 and the solar cell 17 are fixed to each other by a fixing member 19 made of a pressure sensitive adhesion or an adhesive agent on the peripheral part of each other.

The light transmitting substrate 16A, the reflective polarizing plate 11, and the solar cell 17 can be bonded and fixed on the entire surfaces thereof. Without using the fixing members 19 and 19*a*, the light transmitting substrate 16A, the reflective polarizing plate 11, and the solar cell 17 can also be simply laminated and held by an inner frame or the like for the watch. Moreover, the light transmitting substrate 16A and the reflective polarizing plate 11 can be fixed to each other by a thermo compression bonding.

Using a transparent polycarbonate resin or an acrylic resin, the light transmitting substrate 16A is die-cut in the shape of a display panel to form the light transmitting substrate 16A shown in FIG. 15.

The surface of the light transmitting substrate 16A is finished to form a flat and smooth surface. It is preferable that a thickness of the light transmitting substrate 16A is in the range of 200 to 700 μm. In this embodiment, a thickness of the light transmitting substrate 16A is 500 μm.

Similarly to the embodiment 1, it is preferable that a reflective polarizing plate substrate as a material of the reflective polarizing plate 11 is a laminated body composed of a plurality of layers in which two kinds of films with different polarized natures are laminated alternately. The product DBEF-E (product name) manufactured by Sumitomo 3M Limited is used in this embodiment. Since the reflective polarizing plate substrate is equivalent to that of the embodiment 1, the detailed description of the element is omitted.

In this embodiment, a stripe pattern 13 in a concave and convex shape is formed on the surface of the reflective polarizing plate substrate 10, and the reflective polarizing plate substrate 10 is then die-cut in the shape of a display panel to form the reflective polarizing plate 11 shown in FIG. 15.

Similarly to the embodiment 1, the stripe pattern 13 in a concave and convex shape formed on the surface of the reflective polarizing plate 11 is engraved and formed by a machining process such as a cutting process. Since the configuration is equivalent to that of the embodiment 1, the detailed description thereof is omitted.

The light transmitting substrate 16A and the reflective polarizing plate 11 that have been processed as described above are fixed to each other by a fixing member 19*a* made of a pressure sensitive adhesion or an adhesive agent on the peripheral part of each other. At this time, the light transmitting substrate 16A and the reflective polarizing plate 11 are disposed and fixed in such a manner that the pattern 13 in a concave and convex shape of the reflective polarizing plate 11 faces to the surface of the light transmitting substrate 16A.

After that, the reflective polarizing plate 11 integrated with the light transmitting substrate 16A is fixed to the solar cell 17 by a fixing member 19 made of a pressure sensitive adhesion or an adhesive agent on the peripheral part of each other. The display panel in accordance with this embodiment is then formed as shown in FIG. 15.

The operation of the reflective polarizing plate 11 will be described in the following based on FIG. 16.

A light P1 irradiated to the light transmitting substrate 16A is refracted in the light transmitting substrate 16A, is transmitted in the light transmitting substrate 16A, and is irradiated to the reflective polarizing plate 11.

A light P1 irradiated to the reflective polarizing plate 11 is irradiated to the reflective polarizing plate 11 provided with a first pattern 13 in a concave and convex shape.

Of the lights irradiated to the reflective polarizing plate 11, a light n1 of a linearly polarized component provided with a vibration plane parallel to the light reflection axis of the reflective polarizing plate 11 is reflected from the reflective polarizing plate 11 and is radiated externally as a reflected light P2.

On the other hand, a light m1 of a linearly polarized component provided with a vibration plane parallel to the light transmission easy axis of the reflective polarizing plate 11 is transmitted in the reflective polarizing plate 11 and irradiated to a solar cell 17.

The lights irradiated to the solar cell 17 are classified into lights that are absorbed in the solar cell 17 and lights that are reflected from the solar cell 17. Of the lights reflected from the solar cell 17, a light m2 of a linearly polarized component provided with a vibration plane parallel to the light transmission easy axis of the reflective polarizing plate 11 is transmitted in the reflective polarizing plate 11 and is radiated to the light transmitting substrate 16A. The light m2 is then refracted in the light transmitting substrate 16A and is radiated externally as a reflected light P3.

On the other hand, a light n2 of a linearly polarized component provided with a vibration plane parallel to the light reflection axis of the reflective polarizing plate 11 is reflected by the reflective polarizing plate 11 and is returned to the solar cell 17 side as a reflected light P4. By the above configuration, an amount of the lights that are irradiated to the light transmitting substrate 16A and that are reflected from the solar cell 17 and returned to the light transmitting substrate 16A is extremely small.

As described above, the pattern 13 in a concave and convex shape is formed on the surface of the reflective polarizing plate 11. Consequently, the reflected light over the surface of the reflective polarizing plate 11 and the reflected light that is reflected on the solar cell 17 and that is transmitted in the reflective polarizing plate 11 do not become a reflected light in a uniform direction. The reflected lights become reflected lights that are dispersed and scattered in four ways and are radiated to the light transmitting substrate 16A. The reflected lights are then refracted and are radiated externally.

Therefore, lights that are reflected from the solar cell 17 become less, and a scattering occurs due to the operation of the pattern 13 in a concave and convex shape. Consequently, a cross line and a dark purplish color of the solar cell 17 are completely extinguished and are prevented from being seen.

As described above, for the display panel in accordance with this embodiment, the reflective polarizing plate 11 is disposed between the light transmitting substrate 16A and the solar cell 17. Consequently, a stripe pattern can be seen brightly and vividly as a pattern 13 in a concave and convex shape by the reflected light from the reflective polarizing plate 11 through the light transmitting substrate 16A, whereby a deep and stereoscopic pattern can be displayed.

Moreover, for the display panel in accordance with this embodiment, a cross line and a dark purplish color of the solar cell 17 can be completely extinguished, and a brilliant pattern provided with a metal sense like a metal display panel can be visible, whereby a display panel having an improved decorative effect can be obtained.

Embodiment 9

Figure 17:
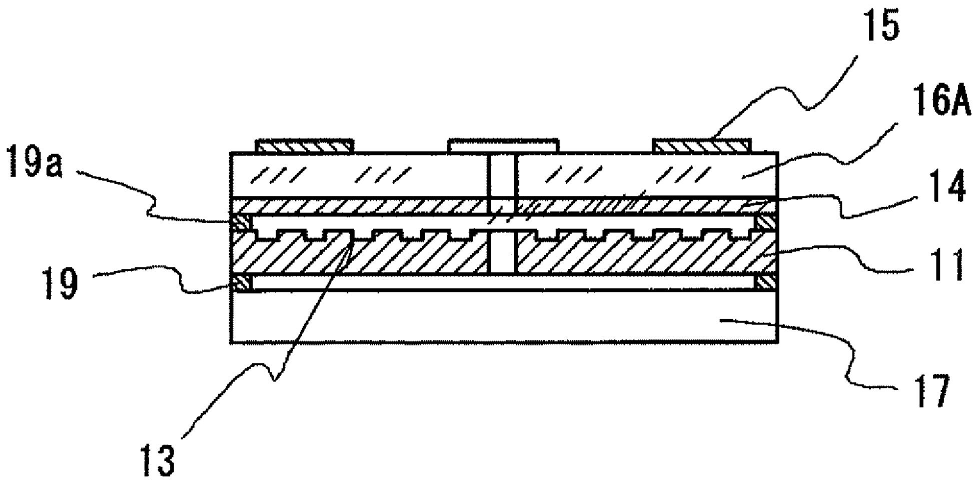
FIG. 17 is a cross-sectional view showing a display panel in accordance with an embodiment 9 of the present invention.

FIG. 17 is a schematic cross-sectional view showing a display panel in accordance with an embodiment 9 of the present invention.

For the display panel in accordance with this embodiment, unlike the embodiment 8, a light transmitting colored layer is formed on the surface of a light transmitting substrate on the side that faces to a reflective polarizing plate. However, other configurations are equivalent to those of the embodiment 8.

As shown in FIG. 17, the display panel in accordance with this embodiment is provided with a solar cell 17, a light transmitting substrate 16A formed on a visible side of the solar cell 17, and a reflective polarizing plate 11 disposed between the solar cell 17 and the light transmitting substrate 16A. In addition, a light transmitting colored layer 14 is formed on the surface of the light transmitting substrate 16A on the side that faces to the reflective polarizing plate 11.

The light transmitting colored layer 14 is formed by mixing a white pigment to a resin and by a printing method. It is to color the display board to be white that the white pigment is used. In the case in which the light transmitting colored film is thicker, the display board is colored to be white, but a light transmittance is degraded.

Consequently, the light transmitting colored film is thinned to be in the range of 7 to 10 μm, and a light transmittance thereof is decreased by approximately 10% due to the thickness. In the case in which the light transmitting colored film is toned to be another color, another pigment can be used. Moreover, an extremely thin metal film can be formed by a method such as evaporation. The material and method can be selected as needed corresponding to a desired color tone.

However, other constructional elements are equivalent to those of the embodiment 8, and the detailed descriptions of the elements are omitted. As described above, for the display panel in accordance with this embodiment, a color of the solar cell 17 can be completely extinguished, a white color tone is increased, a white color sense is highlighted, and a stripe pattern 13 in a concave and convex shape can be seen vividly.

A diffusing layer can also be formed in place of the light transmitting colored layer 14 to obtain a similar white color sense. The diffusing layer is made of a substance in which a diffusing agent having a function for diffusing an irradiated light is mixed to a pressure sensitive adhesive, an adhesive agent, or a resin (a transparent ink or a transparent coating compound). As a material of the diffusing agent, there can be used for instance a material such as silica, glass, and a resin having a shape in a granular state, a powdered state, a scale-like state, or an acicular state. As described above, for the display panel in accordance with this embodiment, a color of the solar cell 17 can be completely extinguished, a white color tone is increased, and a white color sense is highlighted, whereby a sophisticated and expensive-looking display panel can be obtained.

Embodiment 10

Figure 18:
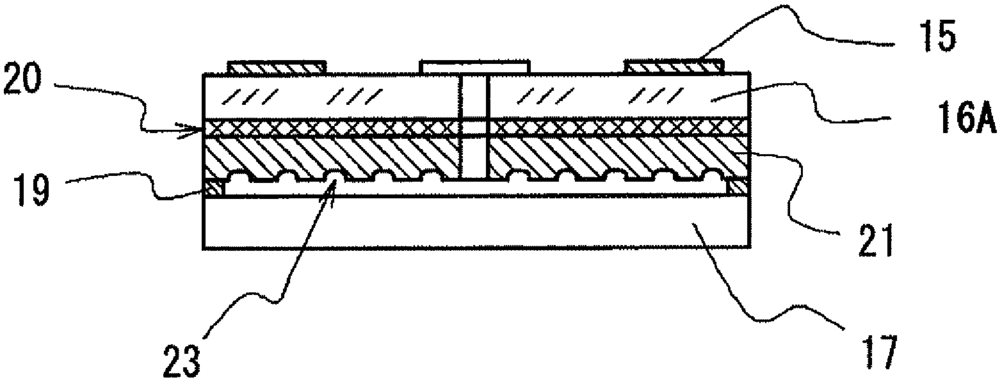
FIG. 18 is a cross-sectional view showing a display panel in accordance with an embodiment 10 of the present invention.

FIG. 18 is a cross-sectional view showing a display panel in accordance with an embodiment 10 of the present invention.

For the display panel in accordance with the embodiment 10, unlike the embodiment 8, a satin pattern 23 in a concave and convex shape is formed on the surface of a reflective polarizing plate on the side that faces to the solar cell. However, other configurations are equivalent to those of the embodiment 8.

As shown in FIG. 18, the display panel in accordance with this embodiment is provided with a solar cell 17, a light transmitting substrate 16A formed on a visible side of the solar cell 17, and a reflective polarizing plate 21 disposed between the solar cell 17 and the light transmitting substrate 16A. In addition, a satin pattern 23 in a concave and convex shape is formed on the surface of a reflective polarizing plate 21 on the side that faces to the solar cell 17.

For the reflective polarizing plate 21 in accordance with this embodiment, the operations of a transmission and a reflection of a light are equivalent to those of the reflective polarizing plate 11 described in the embodiment 8.

For a manufacturing method of the display panel in accordance with this embodiment, a light transmitting substrate blank material and a reflective polarizing plate blank material are pressure-bonded and fixed to each other by a thermo compression bonding. The both surfaces of each blank material are finished to form a flat and smooth surface.

Subsequently, a satin pattern 23 in a concave and convex shape is formed on the surface of the reflective polarizing plate blank material integrated with the light transmitting substrate blank material, and the reflective polarizing plate blank material is then die-cut in the shape of a display panel to form the light transmitting substrate 16A and the reflective polarizing plate 21 integrated with each other.

In FIG. 18, the crossed diagonal lines are drawn to enable a thermo compression bonded region 20 between the light transmitting substrate 16A and the reflective polarizing plate 21 to be easily found. As described above, the flat and smooth surfaces can be pressure-bonded and fixed to each other by a thermo compression bonding without using an adhesive agent or a pressure sensitive adhesion.

Moreover, the reflective polarizing plate 21 integrated with the light transmitting substrate 16A is fixed to the solar cell 17 by a fixing member 19 made of a pressure sensitive adhesion or an adhesive agent on the peripheral part of each other. The display panel in accordance with this embodiment is then formed as shown in FIG. 18.

Similarly to the embodiment 2, for the satin pattern 23 in a concave and convex shape formed on the surface of the reflective polarizing plate 21 in accordance with this embodiment, a metal color sense and a white color sense of the display panel can be adjusted by varying a size of a concave and a convex. Since the configuration is equivalent to that of the embodiment 2, the detailed description thereof is omitted.

As described above, for the display panel in accordance with this embodiment, a color of the solar cell 17 can be completely extinguished, and the satin pattern formed on the surface of the reflective polarizing plate 21 can be seen through a transparent layer of the light transmitting substrate 16A, whereby a deep white color sense can be obtained. Moreover, a translucent and deep pattern can be seen by forming a pattern in a concave and convex shape different from the satin pattern on the surface of the reflective polarizing plate 21 on the side that faces to the solar cell 17, whereby a sophisticated and expensive-looking display panel can be obtained.

Embodiment 11

Figure 19:
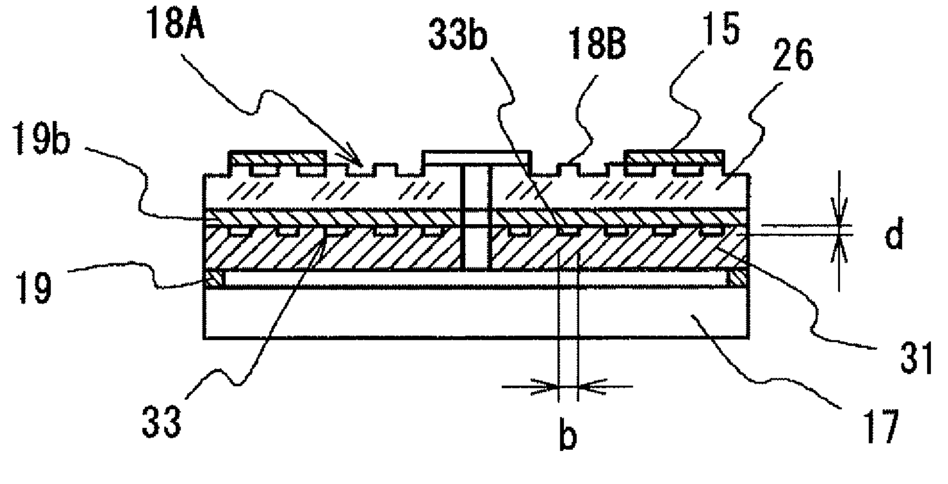
FIG. 19 is a cross-sectional view showing a display panel in accordance with an embodiment 11 of the present invention.

FIG. 19 is a view showing a display panel in accordance with an embodiment 11 of the present invention, and an embodiment in which a pattern in a concave and convex shape is formed on the surface of the light transmitting substrate and the surface of the reflective polarizing plate.

As shown in FIG. 19, for the display panel in accordance with this embodiment, a lattice pattern 18A in a concave and convex shape is formed on the surface of a visible side of the light transmitting substrate 26, and a lattice pattern 33 in a concave and convex shape is formed on the surface of the reflective polarizing plate 31 on the side that faces to the light transmitting substrate 26. The both patterns in a concave and convex shape are formed by a transcription from a metal mold.

Other configurations are equivalent to those of the embodiment 8. For the reflective polarizing plate 31 in accordance with this embodiment, the operations of a transmission and a reflection of a light are equivalent to those of the reflective polarizing plate 11 described in the embodiment 8.

Unlike the light transmitting substrate 16A of the embodiment 8, the pattern 18A in a concave and convex shape is formed on the surface of the light transmitting substrate 26. However, other configurations are equivalent to those of the embodiment 8.

A depth and a width of a concave portion and a width of a convex portion for the lattice pattern 18A in a concave and convex shape formed on the surface of the light transmitting substrate 26 are designed to be large enough in such a manner that the concave and convex are visible. Consequently, the pattern can be seen clearly from the upper side.

The lattice size of the lattice pattern 33 in a concave and convex shape formed on the surface of the reflective polarizing plate 31 is equivalent to that of the lattice pattern 18A in a concave and convex shape formed on the surface of the light transmitting substrate 26.

Moreover, the light transmitting substrate 26 and the reflective polarizing plate 31 are laminated in such a manner that a concave portion 33*b* of the pattern 33 in a concave and convex shape of the reflective polarizing plate 31 is disposed at a position corresponding to a convex portion 18B of the pattern 18A in a concave and convex shape of the light transmitting substrate 26.

A value of a width b of the lattice pattern 33 in a concave and convex shape of the reflective polarizing plate 31 is not restricted in particular. However, it is preferable that the width b is set in the range of 40 to 60 μm. Moreover, a value of a depth d of the pattern can be set properly. However, it is preferable that the depth d is set in the range of 10 to 20 μm.

The lattice pattern 11A in a concave and convex shape of the light transmitting substrate 26 is equivalent to the pattern 33 in a concave and convex shape of the reflective polarizing plate 31 described above, and the detailed descriptions of the elements are omitted. Unlike the light transmitting substrate 16A of the embodiment 8, the pattern 18A in a concave and convex shape is formed on the surface of the light transmitting substrate 26. However, other configurations are equivalent to those of the embodiment 8.

As described above, for the display panel in accordance with this embodiment, a depth of a lattice pattern in a concave and convex shape is highlighted, and a pattern in a concave and convex shape with a stereoscopic sense can be seen, whereby a more sophisticated and expensive-looking display panel can be obtained. In addition, a cross line and a dark purplish color of the solar cell are completely extinguished and are prevented from being seen.

For the display panel in accordance with this embodiment, the same lattice pattern in a concave and convex shape is formed on the surface of the light transmitting substrate 26 and the surface of the reflective polarizing plate 31. However, different patters can also be formed on the surface of the light transmitting substrate and the surface of the reflective polarizing plate.

In this case, different patters in a concave and convex shape can be seen in such a manner that the patterns are superimposed on each other. As a result, an intricate pattern in which two patterns are combined is displayed with a bright metal color sense, whereby a design variation of the display panel can be enlarged. In addition, a cross line and a dark purplish color of the solar cell are completely extinguished and prevented from being seen.

Figure 20:
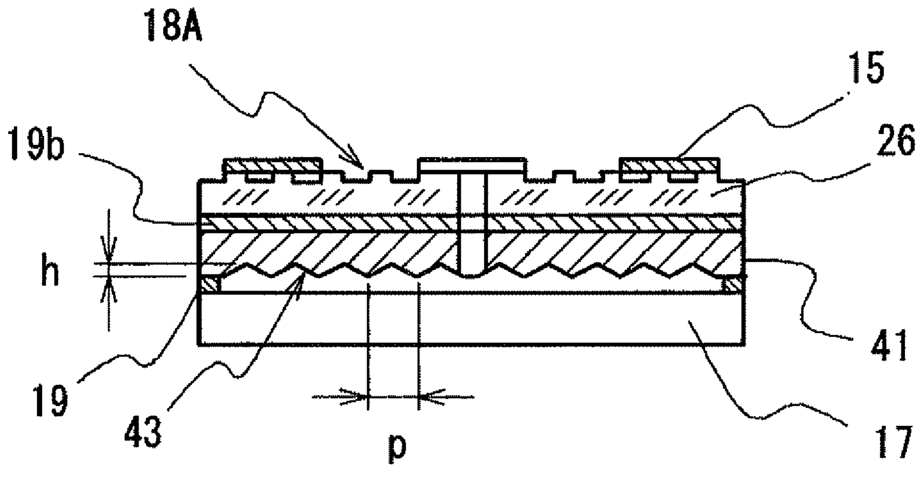
FIG. 20 is a cross-sectional view showing another embodiment of a display panel in accordance with the embodiment 11 of the present invention.

FIG. 20 is a view showing another embodiment of a display panel in accordance with the embodiment 11 of the present invention.

In this embodiment, a pattern in a concave and convex shape is formed on both the surface of the light transmitting substrate and the surface of the reflective polarizing plate. However, unlike the above, a pattern in a concave and convex shape is formed on the surface of a reflective polarizing plate on the side that faces to the solar cell 17.

As shown in FIG. 20, for the display panel in accordance with this embodiment, a lattice pattern 18A in a concave and convex shape is formed on the surface of a visible side of the light transmitting substrate 26, and a pattern 43 in a concave and convex shape in a circle shape or a spiral shape is formed on the surface of the reflective polarizing plate 41 on the side that faces to the solar cell 17 by a transcription from a metal mold.

In this embodiment, the entire surfaces of a light transmitting substrate blank material and a reflective polarizing plate blank material are bonded and fixed to each other by a fixing member 19*b* made of an adhesive agent. After that, the patterns 18A and 43 in a concave and convex shape are formed on the surfaces of the light transmitting substrate blank material and the reflective polarizing plate blank material that are integrated with each other, respectively. The light transmitting substrate blank material and the reflective polarizing plate blank material are then die-cut in the shape of a display panel to form the light transmitting substrate 26 and the reflective polarizing plate 41 that are integrated with each other.

Moreover, the reflective polarizing plate 41 integrated with the light transmitting substrate 26 is fixed to the solar cell 17 by a fixing member 19 made of a pressure sensitive adhesion or an adhesive agent on the peripheral part of each other. The display panel in accordance with this embodiment is then formed as shown in FIG. 20.

Other configurations are equivalent to those of the embodiment 11. For the reflective polarizing plate 41 in accordance with this embodiment, the operations of a transmission and a reflection of a light are equivalent to those of the reflective polarizing plate 11 described in the embodiment 8.

The pattern 43 in a concave and convex shape in a circle shape or a spiral shape formed on the surface of the reflective polarizing plate 41 on the side that faces to the solar cell 17 has a cross sectional shape of a triangle, and is formed in a circle pattern shape or a spiral pattern shape.

An angle of a triangle is in the range of 75 to 100 degrees at a concave portion and a convex portion. Moreover, a height h of the triangle is in the range of 10 to 20 μm, and a pitch p thereof is approximately 100 μm. It is preferable that the height and pitch are in a size of a visible degree in such a manner that the processing of a metal mold is easy. The light transmitting substrate 26 is equivalent to that of the embodiment 11, and the detailed descriptions of the element are omitted.

For the display panel in accordance with this embodiment, a lattice pattern 18A in a concave and convex shape is formed on the surface of the light transmitting substrate 26, and a pattern 43 in a concave and convex shape in a circle pattern shape or a spiral pattern shape is formed on the surface of the reflective polarizing plate 41. However, provided different patters are formed on the both surfaces, respectively, other patterns in a concave and convex shape can also be formed.

As described above, for the display panel in accordance with this embodiment, the different patterns 18A and 43 in a concave and convex shape are formed on the surface of the light transmitting substrate 26 and on the surface of the reflective polarizing plate 41. Consequently, the patterns 18A and 43 in a concave and convex shape can be seen in such a manner that the patterns 18A and 43 are superimposed on each other.

Moreover, the patterns 18A and 43 in a concave and convex shape also have a function to refract and scatter a reflected light. As a result, by a reflected light of the reflective polarizing plate 41, an intricate pattern in which two patterns are combined can be displayed with a bright metal color sense.

Furthermore, the pattern 43 in a concave and convex shape formed on the surface of the reflective polarizing plate 41 can be seen through a transparent layer of the light transmitting substrate 26, whereby a deep and stereoscopic pattern can be displayed like a paint application. In addition, a cross line and a dark purplish color of the solar cell are completely extinguished and are prevented from being seen.

Embodiment 12

Figure 21:
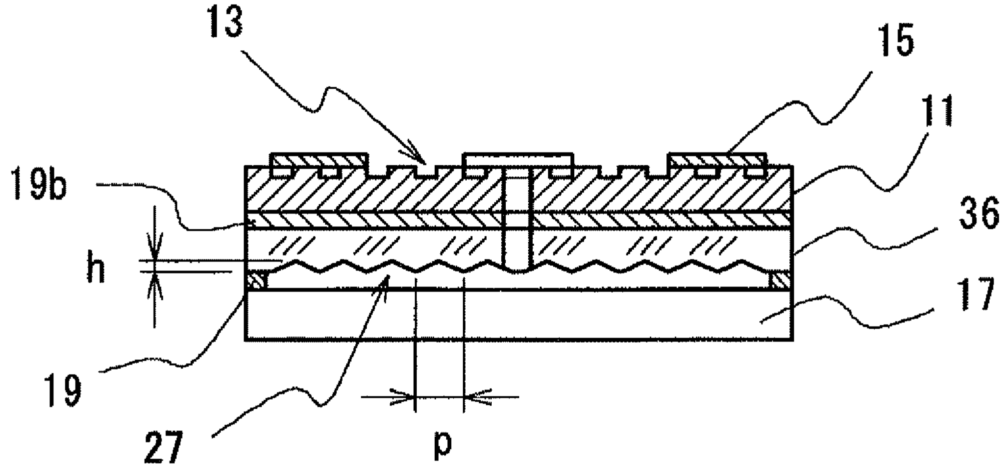
FIG. 21 is a cross-sectional view showing a display panel in accordance with an embodiment 12 of the present invention.

FIG. 21 is a cross-sectional view showing a display panel in accordance with an embodiment 12 of the present invention.

For the display panel in accordance with this embodiment, the order of a lamination of the light transmitting substrate and the reflective polarizing plate is different from that of the display panel in accordance with the above embodiments 8 to 11. However, other configurations are equivalent to those of the embodiments 8 to 11.

For the reflective polarizing plate 11 in accordance with this embodiment, the operations of a transmission and a reflection of a light are basically equivalent to those of the reflective polarizing plate 11 described in the embodiment 8. Consequently, the detailed descriptions of the operations are omitted.

As shown in FIG. 21, a display panel in accordance with this embodiment is provided with a solar cell 17, a reflective polarizing plate 11 disposed on a visible side of the solar cell 17, and a light transmitting substrate 36 disposed between the solar cell 17 and the reflective polarizing plate 11.

A stripe pattern 13 in a concave and convex shape is formed on the surface of a visible side of the reflective polarizing plate 11. In addition, a time character 15 and a mark or the like are also arranged on the surface.

A pattern 27 in a concave and convex shape in a circle shape or a spiral shape is formed on the surface of the light transmitting substrate 36 on the side that faces to the solar cell 17.

The patterns 13 and 28 in a concave and convex shape are both formed by a transcription from a metal mold. Moreover, the entire surfaces of the reflective polarizing plate 11 and the light transmitting substrate 36 are fixed to each other by a fixing member 19*b* made of a pressure sensitive adhesion or an adhesive agent.

Moreover, the light transmitting substrate 36 and the solar cell 17 are fixed to each other by a fixing member 19 made of a pressure sensitive adhesion or an adhesive agent on the peripheral part of each other.

In this embodiment, the entire surfaces of a light transmitting substrate blank material and a reflective polarizing plate blank material are bonded and fixed to each other by a fixing member 19*b* made of an adhesive agent. After that, the patterns 27 and 13 in a concave and convex shape are formed on the surfaces of the light transmitting substrate blank material and the reflective polarizing plate blank material that are integrated with each other, respectively. The light transmitting substrate blank material and the reflective polarizing plate blank material are then die-cut in the shape of a display panel to form the reflective polarizing plate 11 and the light transmitting substrate 36 that are integrated with each other.

Moreover, the light transmitting substrate 36 integrated with the reflective polarizing plate 11 is fixed to the solar cell 17 by a fixing member 19 made of a pressure sensitive adhesion or an adhesive agent on the peripheral part of each other. The display panel in accordance with this embodiment is then formed as shown in FIG. 21.

The pattern 27 in a concave and convex shape in a circle shape or a spiral shape formed on the surface of the light transmitting substrate 36 on the side that faces to the solar cell 17 has a cross sectional shape of a triangle, and is formed in a circle pattern shape or a spiral pattern shape.

An angle of a triangle is in the range of 75 to 100 degrees at a concave portion and a convex portion. Moreover, a height h of the triangle is in the range of 10 to 20 μm, and a pitch p thereof is approximately 100 μm.

It is preferable that the height and pitch are in a size of a visible degree in such a manner that the processing of a metal mold is easy. Unlike the light transmitting substrate 16A of the embodiment 8, the pattern 27 in a concave and convex shape is formed on the surface of the light transmitting substrate 36. However, other configurations are equivalent to those of the embodiment 8.

The reflective polarizing plate 11 is equivalent to that of the embodiment 8, and the detailed descriptions of the element are omitted.

For the display panel in accordance with this embodiment, a lattice pattern 27 in a concave and convex shape is formed on the surface of the reflective polarizing plate 11, and a pattern in a concave and convex shape in a circle pattern shape or a spiral pattern shape is formed on the surface of the light transmitting substrate 36. However, provided different patters are formed on the both surfaces, respectively, other patterns in a concave and convex shape can also be formed.

As described above, for the display panel in accordance with this embodiment, the different patterns 13 and 28 in a concave and convex shape are formed on the surface of the reflective polarizing plate 11 and on the surface of the light transmitting substrate 36. Consequently, the patterns 13 and 28 in a concave and convex shape can be seen in such a manner that the patterns 13 and 28 are superimposed on each other.

As a result, an intricate pattern in which two patterns are combined can be displayed with a bright metal color sense. In addition, a cross line and a dark purplish color of the solar cell are completely extinguished and prevented from being seen.

Embodiment 13

Figure 22:
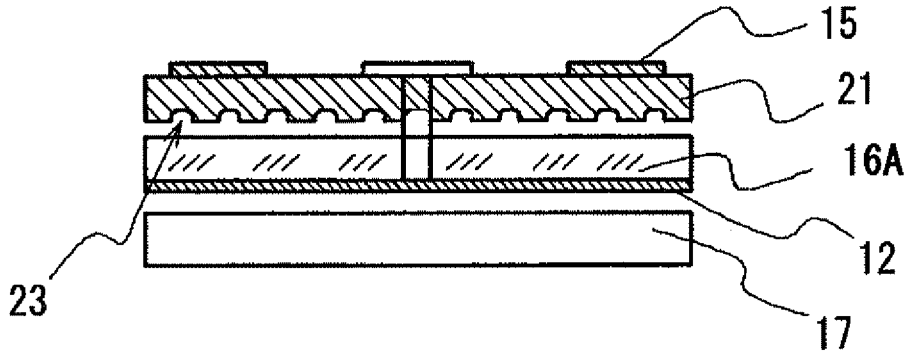
FIG. 22 is a cross-sectional view showing a display panel in accordance with an embodiment 13 of the present invention.

FIG. 22 is a cross-sectional view showing a display panel in accordance with an embodiment 13 of the present invention.

As shown in FIG. 22, a display panel in accordance with this embodiment is provided with a solar cell 17, a reflective polarizing plate 21 disposed on a visible side of the solar cell 17, and a light transmitting substrate 16A disposed between the solar cell 17 and the reflective polarizing plate 21. A satin pattern 23 in a concave and convex shape is formed on the surface of the reflective polarizing plate 21 on the side that faces to the light transmitting substrate 16A.

The light transmitting substrate 16A is equivalent to that of the embodiment 8 described above, and the detailed descriptions of the element are omitted. The light transmitting substrate 16A is made of a transparent resin material, and the both surfaces of the light transmitting substrate 16A are finished to form a flat and smooth surface.

Moreover, a diffusing layer 12 is formed on the surface of the light transmitting substrate 16A on the side that faces to the solar cell 17. Without using a fixing member, the light transmitting substrate 16A, the reflective polarizing plate 21, and the solar cell 17 are be laminated and held by an inner frame or the like for the watch.

For the satin pattern 23 in a concave and convex shape formed on the surface of the reflective polarizing plate 21, a metal color sense and a white color sense of the display panel can be adjusted by varying a size of a concave and a convex.

The reflective polarizing plate 21 is equivalent to that of the embodiment 10 described above, and the detailed descriptions of the element are omitted.

The diffusing layer 12 is made of a substance in which a diffusing agent having a function for diffusing an irradiated light is mixed to a pressure sensitive adhesive, an adhesive agent, or a resin (a transparent ink or a transparent coating compound). As a material of the diffusing agent, there can be used for instance a material such as silica, glass, and a resin having a shape in a granular state, a powdered state, a scale-like state, or an acicular state.

As described above, for the display panel in accordance with this embodiment, a color of the solar cell 17 can be completely extinguished, a white color tone is increased, a white color sense is highlighted, and a radial marking pattern can be seen vividly. As a result, a sophisticated and expensive-looking display panel can be obtained. In addition, a cross line and a dark purplish color of the solar cell are completely extinguished and prevented from being seen.

Embodiment 14

Figure 23:
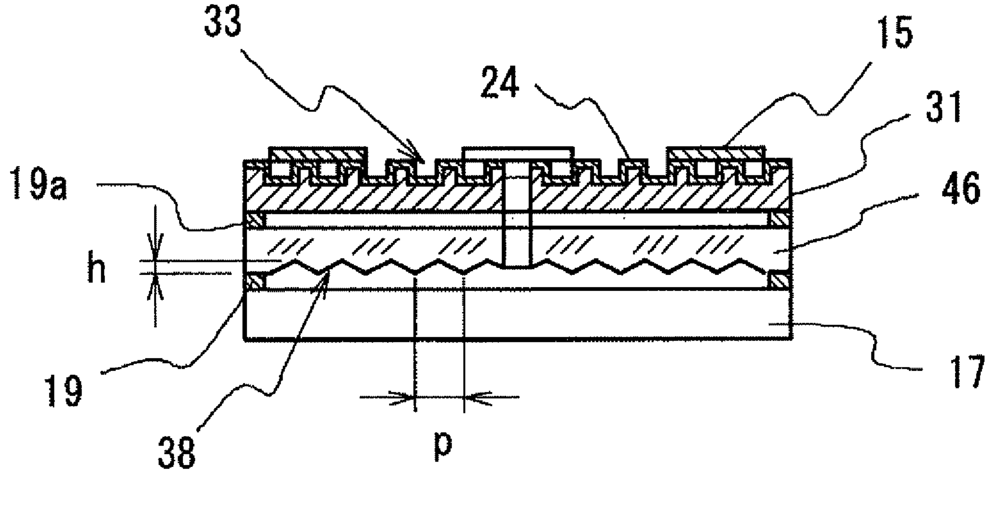
FIG. 23 is a cross-sectional view showing a display panel in accordance with an embodiment 14 of the present invention.

FIG. 23 is a view showing a display panel in accordance with an embodiment 14 of the present invention, and an embodiment in which a pattern in a concave and convex shape and the light transmitting colored layer are formed on the surface of the reflective polarizing plate.

As shown in FIG. 23, a display panel in accordance with this embodiment is provided with a solar cell 17, a reflective polarizing plate 31 disposed on a visible side of the solar cell 17, and a light transmitting substrate 46 disposed between the solar cell 17 and the reflective polarizing plate 31.

Moreover, a lattice pattern 33 in a concave and convex shape is formed on the surface of a visible side of the reflective polarizing plate 31, and a light transmitting colored layer 24 is formed on the pattern 33 in a concave and convex shape.

The reflective polarizing plate 31 and the lattice pattern 33 in a concave and convex shape are equivalent to those of the embodiment 11 described above, and the detailed descriptions of the elements are omitted. The reflective polarizing plate 31 and the light transmitting substrate 46 are fixed to each other by a fixing member 19*a* made of a pressure sensitive adhesion or an adhesive agent on the peripheral part of each other.

Moreover, the light transmitting substrate 46 and the solar cell 17 are fixed to each other by a fixing member 19 made of a pressure sensitive adhesion or an adhesive agent on the peripheral part of each other.

The light transmitting colored layer 24 is formed on the lattice pattern 33 in a concave and convex shape on the surface of the reflective polarizing plate 31 by a method for printing an ink in which the copper metal powder is mixed to a transparent urethane resin.

A pattern 38 in a concave and convex shape that is a prism reflecting surface is formed on the surface of the light transmitting substrate 46 on the side that faces to the solar cell 17. The light transmission substrate 46 is formed by an injection molding, and the pattern 38 in a concave and convex shape that is a prism reflecting surface is simultaneously formed by a transcription from a metal mold.

The pattern 38 in a concave and convex shape that is a prism reflecting surface is in a prism shape with a triangular cross section, and is formed in a circle pattern shape or a spiral pattern shape.

An angle of a triangle is in the range of 75 to 100 degrees at a concave portion and a convex portion. Moreover, a height h of the triangle is in the range of 15 to 100 μm, and a pitch p thereof is approximately 150 μm.

It is preferable that the height and pitch are in a size of a visible degree in such a manner that the processing of a metal mold is easy.

The prism reflecting surface is formed in a circle pattern shape or a spiral pattern shape. Consequently, the light that is reflected on the pattern 38 in a concave and convex shape that is a prism reflecting surface of the light transmission substrate 46 and the light that is reflected on the solar cell 17 and that is transmitted in the pattern 38 in a concave and convex shape that is a prism reflecting surface do not become a reflected light in a uniform direction. The reflected lights become reflected lights that are dispersed and scattered in four ways, and are transmitted in the reflective polarizing plate 31. The reflected lights are then radiated externally.

Unlike the light transmitting substrate 16A of the embodiment 8, the pattern 38 in a concave and convex shape that is a prism reflecting surface is formed on the surface of the light transmitting substrate 46. However, other configurations are equivalent to those of the embodiment 8.

As described above, the display panel in accordance with this embodiment is finished in such a manner that a gold color tone appears as a whole by a color of a reflected light of the reflective polarizing plate 31, a color of a reflected light of the pattern 38 in a concave and convex shape that is a prism reflecting surface of the light transmission substrate 46, and a color of the light transmitting colored layer 24.

Moreover, the lattice pattern 33 in a concave and convex shape formed on the surface of the reflective polarizing plate 31 can be seen clearly from a visible side. Furthermore, the lattice pattern 33 in a concave and convex shape also has a function to refract and scatter a reflected light from the lower side.

The lattice pattern 33 in a concave and convex shape and a gold color tone can be seen brightly and vividly by a reflected light of the pattern 38 in a concave and convex shape that is a prism reflecting surface of the light transmission substrate 46 and a reflected light of the reflective polarizing plate 31.

As a result, the display board having a noble metal sense and sophistication can be obtained. In addition, a color of the solar cell 17 is completely extinguished and prevented from being seen. Moreover, lights that are reflected from the solar cell 17 become less, and a scattering occurs due to the operation of the pattern 38 in a concave and convex shape that is a prism reflecting surface. Consequently, a cross line and a dark purplish color of the solar cell 17 are completely extinguished and are prevented from being seen.

Figure 24:
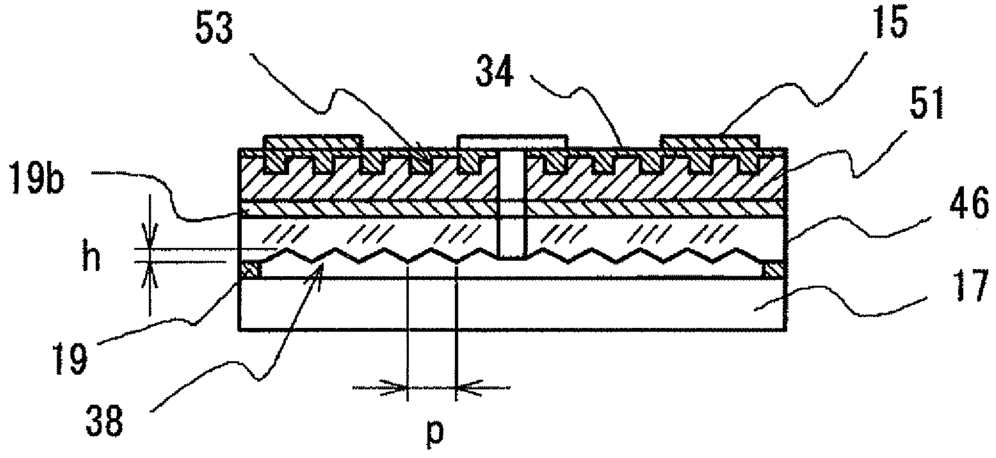
FIG. 24 is a cross-sectional view showing another embodiment of a display panel in accordance with the embodiment 14 of the present invention.

FIG. 24 is a cross-sectional view showing another embodiment of a display panel in accordance with the embodiment 14 of the present invention.

As shown in FIG. 24, for the display panel in accordance with this embodiment, a stone pattern 53 in a concave and convex shape is formed on the surface of a visible side of the reflective polarizing plate 51, and a light transmitting colored layer 34 is formed on the surface of the pattern 53 in a concave and convex shape. However, other configurations are equivalent to those of the above embodiment.

The stone pattern 53 in a concave and convex shape of the reflective polarizing plate 51 is formed by a transcription from a metal mold. The values of a width and a depth of the pattern 53 in a concave and convex shape are not restricted in particular. However, it is preferable that the width and depth are set in the range of 10 to 25 μm.

For the reflective polarizing plate 51 in accordance with this embodiment, the operations of a transmission and a reflection of a light are equivalent to those of the reflective polarizing plate 11 described in the embodiment 8. Moreover, for the light transmission substrate 46, the pattern 38 in a concave and convex shape that is a prism reflecting surface is formed on the surface on the side that faces to the solar cell 17. The light transmitting substrate 46 is equivalent to that of the embodiment 14, and the detailed descriptions of the element are omitted.

For the light transmitting colored layer 34, the stone pattern 53 in a concave and convex shape of the reflective polarizing plate 51 is coated with a transparent blue coating compound in such a manner that a concave portion of the stone pattern 53 is completely filled to form a thick film layer, and the surface of the thick film layer is then polished to form a flat and smooth surface.

By this configuration, a blue stone pattern appears brightly and vividly by a reflected light of the reflective polarizing plate 51, a blue color of the light transmitting colored layer 34, and a reflecting operation of the pattern 38 in a concave and convex shape that is a prism reflecting surface of the light transmission substrate 46.

As described above, for the display panel in accordance with this embodiment, a blue stone pattern 53 in a concave and convex shape can be seen clearly from a visible side.

Since the surface of the light transmitting colored layer 34 is polished to form a flat and smooth surface, a blue stone pattern becomes deep, and a sophisticated and expensive-looking display board can be obtained.

Moreover, a blue stone pattern appears brightly and vividly by a reflecting operation of the pattern 38 in a concave and convex shape that is a prism reflecting surface of the light transmission substrate 46. In addition, a cross line and a dark purplish color of the solar cell 17 are completely extinguished and are prevented from being seen.

Embodiment 15

Figure 25:
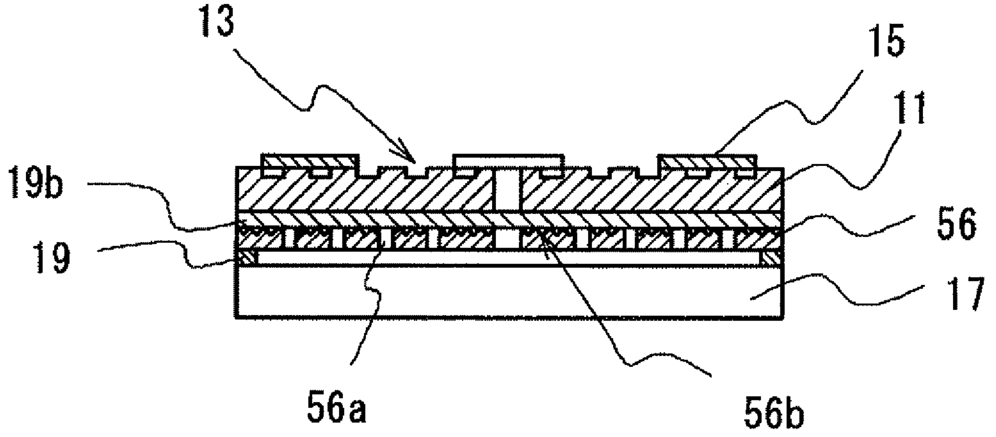
FIG. 25 is a cross-sectional view showing a display panel in accordance with an embodiment 15 of the present invention.

FIG. 25 is a cross-sectional view showing a display panel in accordance with an embodiment 15 of the present invention.

For the display panel in accordance with this embodiment, unlike the embodiment 12, a thin metal plate in which a lot of small holes are formed is disposed as a light transmission substrate. However, other configurations are equivalent to those of the embodiment 12.

As shown in FIG. 25, a display panel in accordance with this embodiment is provided with a solar cell 17, a reflective polarizing plate 11 disposed on a visible side of the solar cell 17, and a light transmitting substrate 56 disposed between the solar cell 17 and the reflective polarizing plate 11. The reflective polarizing plate 11 is equivalent to that of the embodiment 12, and the detailed descriptions of the element are omitted.

The light transmitting substrate 56 is made of a thin metal plate and provided with a lot of small holes 56*a* that penetrate the metal plate. A hole diameter of the small hole 56*a* is in the range of 5 to 30 μm. The small holes 56*a* are formed at a uniform density in such a manner that the small holes are invisible. The total area that the small holes 56*a* occupy is in the range of 20 to 50% of an area of a section (in break lines) of the display panel that can be seen from the outside.

The small hole 56*a* can be in a circular shape, in a rectangular shape, or in a long hole shape. The shape of the small hole 56*a* is not restricted in particular.

On the light transmitting substrate 56 made of a thin metal plate, a pattern 56*b* is formed on the surface on the side that faces to the reflective polarizing plate 11. The various patterns such as a radial pattern, a stripe pattern, an irradiation pattern, and a lattice pattern can be formed as the pattern 56*b*.

In this embodiment, the pattern 56*b* is an irradiation pattern from the center hole. A thickness of the light transmitting substrate 56 is not restricted in particular, provided the light transmitting substrate 56 has a thickness large enough for the pattern 56*b* to be formed.

A metal plate provided with the small hole 56*a* is made of a metal material such as nickel (Ni) and copper (Cu), and is fabricated by the electroforming method. After that, the pattern 56*b* is formed on the surface of the metal plate by a machining process to form the light transmitting substrate 56.

The entire surface of the light transmitting substrate 56 is fixed to the reflective polarizing plate 11 by a fixing member 19*b* made of a pressure sensitive adhesion or an adhesive agent. Moreover, the light transmitting substrate 56 and the solar cell 17 are fixed to each other by a fixing member 19 made of a pressure sensitive adhesion or an adhesive agent on the peripheral part of each other.

In the case in which a size of the small hole 56*a* formed in the light transmitting substrate 56 is in the range of 5 to 30 μm, the small hole 56*a* cannot be seen, and a light can be transmitted in the invisible small hole 56*a*, whereby an electric power generation in the solar cell can be carried out.

An amount of transmitted lights can be adjusted by varying a forming density of the small holes 56*a*. Moreover, a metal color that is peculiar to a metal appears by the metal plate, whereby the display board having a metal sense and sophistication can be obtained.

As described above, for the display panel in accordance with this embodiment, the different patterns 13 and 56*b* in a concave and convex shape are formed on the surface of the reflective polarizing plate 11 and on the surface of the light transmitting substrate 56. Consequently, the patterns 13 and 56*b* in a concave and convex shape can be seen in such a manner that the patterns 13 and 56*b* are superimposed on each other.

As a result, an intricate pattern in which two patterns are combined can be displayed with a bright metal color sense by a reflected light of the light transmitting substrate 56. In addition, a cross line and a dark purplish color of the solar cell are completely extinguished and prevented from being seen.

Embodiment 16

Figure 26:
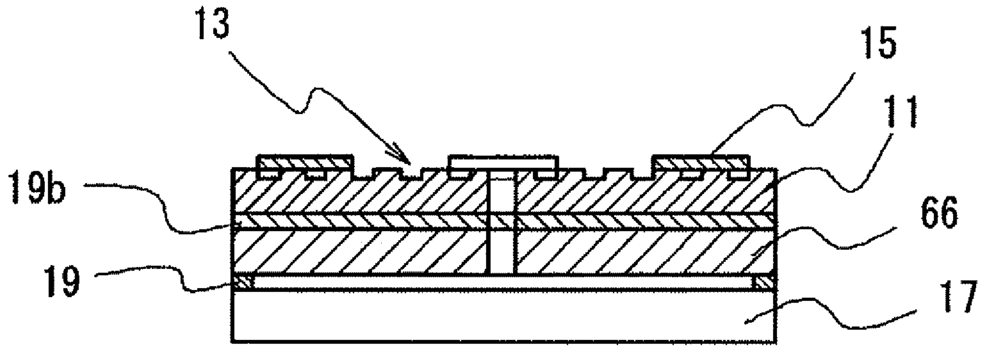
FIG. 26 is a cross-sectional view showing a display panel in accordance with an embodiment 16 of the present invention.

FIG. 26 is a cross-sectional view showing a display panel in accordance with an embodiment 16 of the present invention.

For the display panel in accordance with this embodiment, unlike the embodiment 12, a retardation plate is disposed as a light transmission substrate. However, other configurations are equivalent to those of the embodiment 8.

As shown in FIG. 26, a display panel in accordance with this embodiment is provided with a solar cell 17, a reflective polarizing plate 11 disposed on a visible side of the solar cell 17, and a light transmitting substrate 66 that is made of a retardation plate and that is disposed between the solar cell 17 and the reflective polarizing plate 11.

By laminating and disposing a reflective polarizing plate and a retardation plate in this order in a direction of an irradiation of a light, a light reflected on the surface of the solar cell is reflected, and a cross line and a dark purplish color of the solar cell are prevented from being seen. The reflective polarizing plate 11 is equivalent to that of the embodiment 12, and the detailed descriptions of the element are omitted.

The light transmission easy axis of the reflective polarizing plate 11 and a delay axis of a retardation plate as the light transmitting substrate 66 are disposed in such a manner that the axes are crossed at an angle of 45°. Consequently, the retardation plate functions as a ¼λ plate, and the reflective polarizing plate 11 and the light transmitting substrate 66 are combined to function as a circularly polarizing plate.

The operation of a circularly polarizing plate is well known. Consequently, the detailed description of the operation of a circularly polarizing plate is omitted. However, the operation of a circularly polarizing plate will be simply described below.

A linearly polarized light that has been transmitted in the reflective polarizing plate 11 is transmitted in the light transmitting substrate 66 (¼λ plate), and the linearly polarized light is converted into a circularly polarized light. The circularly polarized light is reflected on the surface of the solar cell 17, and an inverse rotation to a travelling direction is applied. The circularly polarized light is then irradiated to the light transmitting substrate 66 (¼λ plate).

At this time, the circularly polarized light is converted into a light having a vibration plane perpendicular to that of the going light that has been irradiated to the light transmitting substrate 66 (¼λ plate). Since the light is perpendicular to the light transmission easy axis of the reflective polarizing plate 11, the light is reflected on the reflective polarizing plate 11 and cannot be transmitted in the reflective polarizing plate 11. As a result, the reflected light is blocked.

As described above, for the display panel in accordance with this embodiment, the pattern 13 in a concave and convex shape of the reflective polarizing plate 11 can be seen with a bright metal color sense, whereby a design variation of the display panel can be enlarged. In addition, a sophisticated and expensive-looking display panel can be obtained as a product.

A light that has been reflected on the surface of the solar cell 17 is transmitted in the light transmitting substrate 66 (¼λ plate), and is reflected on the reflective polarizing plate 11 to be blocked. Consequently, a cross line and a dark purplish color of the solar cell are prevented from being seen.

In the embodiments 8 to 14, a pattern in a concave and convex shape is formed on one surface of the light transmitting substrate. However, the pattern in a concave and convex shape can also be formed on the both surfaces of the light transmitting substrate.

In the embodiments, a light transmitting colored layer or a diffusing layer is formed on one surface of the reflective polarizing plate or on one surface of the light transmitting substrate. However, a light transmitting colored layer or a diffusing layer can also be formed on the both surfaces of the reflective polarizing plate or on the both surfaces of the light transmitting substrate.

Moreover, at least one of a coloring agent and a diffusing agent can be contained in the light transmitting substrate. Needless to say, this configuration can have the same effect as that of the embodiment in which a light transmitting colored layer or a diffusing layer is formed.

A display panel in accordance with the following embodiments 17 to 27 is provided with a solar cell, and a light transmitting substrate and a plurality of reflective polarizing plates that are disposed on a visible side of the solar cell. A pattern in a concave and convex shape is formed on the surface of at least one reflective polarizing plate of the plurality of reflective polarizing plates. Consequently, lights of an amount sufficient for an electric power generation in the solar cell can be supplied, and a cross line and a dark purplish color of the solar cell can be prevented from being seen. In addition, a deep and stereoscopic pattern in a concave and convex shape can be displayed, and a display panel having an improved decorative effect can be implemented.

Moreover, for the light transmitting substrate, there can be used for instance a film made of a transparent resin material, an inorganic material such as glass, sapphire, and ceramics, and a semi-transparent color material. Consequently, a display panel having a vivid color can be implemented.

Moreover, a sophisticated and expensive-looking display panel having a vivid color with whiteness can be obtained by forming a light transmitting colored layer or a diffusing layer on the surface of a light transmitting substrate or a reflective polarizing plate.

The similar effect can be obtained by containing a coloring agent or a diffusing agent in a light transmitting substrate. Furthermore, the plurality of reflective polarizing plates can be disposed in such a manner that the directions of the light transmission easy axes of the plurality of reflective polarizing plates are different from each other. As a result, an amount of lights supplied to a solar cell can be adjusted simply and easily.

A light transmitting substrate can be disposed above or below the plurality of reflective polarizing plates. In addition, a light transmitting substrate can also be disposed between two reflective polarizing plates that face to each other.

In the embodiments 17 to 20, a light transmitting substrate is disposed between two reflective polarizing plates that face to each other.

In those embodiments, a prism pattern in a concave and convex shape is formed on the surface of the light transmitting substrate. By a light reflected on the light transmitting substrate, a display panel having a metal sense color and a vivid color with brightness can be implemented. In particular, a retardation plate is used as a light transmission substrate, whereby a display panel having a desired color can be implemented.

In the embodiments 21 to 23, a light transmitting substrate is disposed below the plurality of reflective polarizing plates. That is, a light transmitting substrate is disposed between the plurality of reflective polarizing plates and the solar cell.

In those embodiments, a prism pattern in a concave and convex shape is formed on the surface of the light transmitting substrate. By a light reflected on the light transmitting substrate, a display panel having a metal sense color and a vivid color with brightness can be implemented.

A pressure sensitive adhesive containing a substrate can be used as a fixing member for fixing reflective polarizing plates to each other. Consequently, a display panel having a vivid color can be implemented.

In the embodiments 24 to 27, a light transmitting substrate is disposed above the plurality of reflective polarizing plates. That is, a light transmitting substrate is disposed on the most visible side.

In those embodiments, a pattern in a concave and convex shape of the reflective polarizing plate can be seen through the light transmitting substrate, whereby a deep and stereoscopic pattern can be displayed. Moreover, a pressure sensitive adhesive containing a substrate can be used as a fixing member for fixing reflective polarizing plates to each other in those embodiments. Consequently, a display panel having a vivid color can be implemented.

In those embodiments, a prism pattern in a concave and convex shape is formed on the surface of the light transmitting substrate. By a light reflected on the light transmitting substrate, a display panel having a metal sense color and a vivid color with brightness can be implemented.

Embodiment 17

Figure 28:
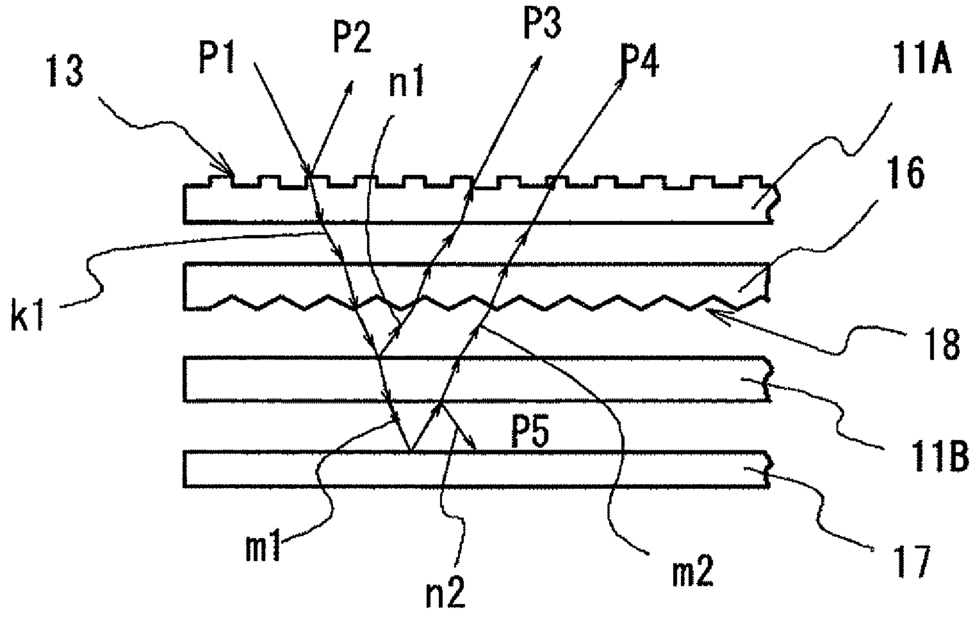
FIG. 28 is a ray diagram showing the path of light for the display panel in accordance with the embodiment 17 of the present invention.
Figure 29:
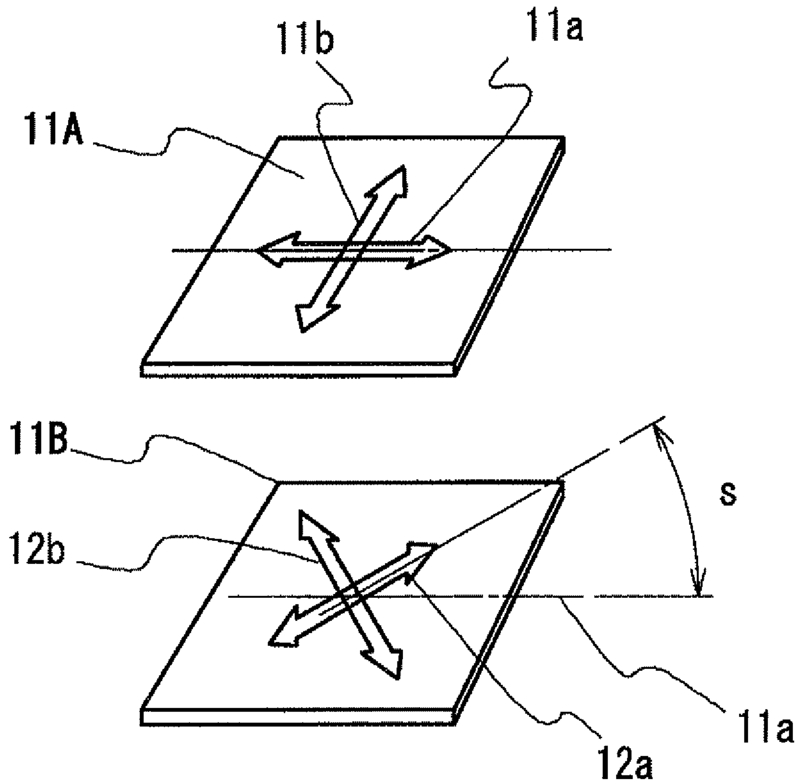
FIG. 29 is a perspective view showing the first and second reflective polarizing plates in accordance with the embodiment 17 of the present invention.

FIG. 27 is a view showing a display panel in accordance with an embodiment 17 of the present invention. FIG. 27(*a*) is a plan view, and FIG. 27(*b*) is a cross-sectional view taken along the line A-A of FIG. 27(*a*). FIG. 28 is a ray diagram showing the path of lights for the display panel. FIG. 29 is a perspective view showing the first and second reflective polarizing plates in accordance with the embodiment 17 of the present invention.

As shown in FIG. 27, a display panel in accordance with the embodiment 17 is provided with a solar cell 17, the first and second reflective polarizing plates 11A and 11B disposed on a visible side of the solar cell 17, and a light transmitting substrate 16 disposed between the first reflective polarizing plate 11A and the second reflective polarizing plate 11B.

The first reflective polarizing plate 11A is disposed on the most visible side, and the second reflective polarizing plate 11B is disposed on the side that faces to the solar cell 17.

A stripe pattern 13 in a concave and convex shape is formed on the surface of a visible side of the first reflective polarizing plate 11A. In addition, a time character 15 and a mark or the like are also arranged on the surface.

A pattern is not formed on the surface of the second reflective polarizing plate 11B, and the both surfaces of the second reflective polarizing plate 11B are finished to form a flat and smooth surface. A prism pattern 18 in a circle shape or a spiral shape is formed on the surface of the light transmitting substrate 16 on the side that faces to the second reflective polarizing plate.

Moreover, the reflective polarizing plate 11 and the light transmitting substrate 16 are fixed to each other by a fixing member 19*b* made of a transparent pressure sensitive adhesion or an adhesive agent on the entire surfaces thereof. The light transmitting substrate 16 and the second reflective polarizing plate 11B are fixed to each other by a fixing member 19*a* made of a pressure sensitive adhesion or an adhesive agent on the peripheral part of each other.

Moreover, the second reflective polarizing plate 11B and the solar cell 17 are fixed to each other by a fixing member 19 made of a pressure sensitive adhesion or an adhesive agent on the peripheral part of each other.

Without using the fixing member 19, 19*a*, or 19*b*, the first and second reflective polarizing plates 11A and 11B, the light transmitting substrate 16, and the solar cell 17 can also be simply laminated and held by an inner frame or the like for the watch.

Moreover, the first and second reflective polarizing plates 11A and 11B and the light transmitting substrate 16 can be fixed to each other by a thermo compression bonding.

The light transmitting substrate 16 is made of a transparent polycarbonate resin or an acrylic resin. The surface of the light transmitting substrate 16 on the side that faces to the first reflective polarizing plate 11A is finished to form a flat and smooth surface. A prism pattern 18 in a circle shape or a spiral shape is formed on the surface of the light transmitting substrate 16 on the side that faces to the second reflective polarizing plate 11B.

It is preferable that a thickness of the light transmitting substrate 16 is in the range of 200 to 700 μm. In this embodiment, a thickness of the light transmitting substrate 16 is 500 μm.

The light transmission substrate 16 is formed by an injection molding, and the pattern 18 in a concave and convex shape that is a prism reflecting surface is simultaneously formed by a transcription from a metal mold. The pattern 18 in a concave and convex shape that is a prism reflecting surface is in a prism shape with a triangular cross section, and is formed in a circle pattern shape or a spiral pattern shape.

An angle of a triangle is in the range of 75 to 100 degrees at a concave portion and a convex portion. Moreover, a height h of the triangle is in the range of 15 to 100 μm, and a pitch p thereof is approximately 150 μm.

It is preferable that the height and pitch are in a size of a visible degree in such a manner that the processing of a metal mold is easy.

The prism reflecting surface is formed in a circle pattern shape or a spiral pattern shape. Consequently, the light that is reflected on the pattern 18 in a concave and convex shape that is a prism reflecting surface of the light transmission substrate 16 and the light that is reflected on the second reflective polarizing plate 11B and the solar cell 17 and that is transmitted in the pattern 18 in a concave and convex shape that is a prism reflecting surface do not become a reflected light in a uniform direction. The reflected lights become reflected lights that are dispersed and scattered in four ways, and are transmitted in the first reflective polarizing plate 11A. The reflected lights are then radiated externally.

Similarly to the embodiment 1, it is preferable that a reflective polarizing plate substrate as a material of the first and second reflective polarizing plates 11A and 11B is a laminated body composed of a plurality of layers in which two kinds of films with different polarized natures are laminated alternately. The product DBEF-E (product name) manufactured by Sumitomo 3M Limited is used in this embodiment. Since the reflective polarizing plate substrate is equivalent to that of the embodiment 1, the detailed description of the element is omitted.

In this embodiment, a stripe pattern 13 in a concave and convex shape is formed on the surface of the reflective polarizing plate substrate 10, and the reflective polarizing plate substrate 10 is then die-cut in the shape of a display panel to form the first reflective polarizing plate 11A shown in FIG. 27. For the second reflective polarizing plate 11B, other configurations are equivalent to those of the first reflective polarizing plate 11A except that a pattern is not formed.

The first reflective polarizing plate 11A and the second reflective polarizing plate 11B are both provided with a light reflection axis and a light transmission easy axis. In this embodiment, as shown in FIG. 29, the first reflective polarizing plate 11A and the second reflective polarizing plate 11B are disposed in such a manner that a direction of the light transmission easy axis 11*a* and a direction of the light transmission easy axis 12*a* are different from each other and a direction of the light reflection axis 11*b* and a direction of the light reflection axis 12*b* are different from each other.

An amount of lights transmitted in two reflective polarizing plates of the first reflective polarizing plate 11A and the second reflective polarizing plate 11B can be adjusted by varying a value of a crossed axes angle s of the light transmission easy axis 11*a* and the light transmission easy axis 12*a*.

It is preferable that a value of a crossed axes angle s is set to an angle in the range of 5 to 45 degrees in order to ensure an amount of lights transmitted in the two reflective polarizing plates.

In this embodiment, a value of a crossed axes angle s is set to approximately 20 degrees. The first reflective polarizing plate 11A and the second reflective polarizing plate 11B in this embodiment are in a circular shape in practice. However, in FIG. 29, the first reflective polarizing plate 11A and the second reflective polarizing plate 11B are drawn in a rectangular shape in a simulated manner as a matter of practical convenience for an explanation.

The stripe pattern 13 in a concave and convex shape formed on the surface of the first reflective polarizing plate 11A is engraved and formed by a machining process such as a cutting process. A depth and a width of a concave portion and a width of a convex portion for the stripe pattern 13 in a concave and convex shape are designed to be large enough in such a manner that the concave and convex are visible. Consequently, the pattern can be seen clearly from the upper side.

A value of a width b of the pattern 13 in a concave and convex shape formed by a cutting process is not restricted in particular. However, it is preferable that the width b is set in the range of 40 to 60 μm. Moreover, a value of a depth d of the pattern can be set properly. However, it is preferable that the depth d is set in the range of 10 to 20 μm.

Although the pattern 13 in a concave and convex shape in accordance with this embodiment is formed in a stripe shape, another pattern in a concave and convex shape can also be formed. For instance, various patterns such as a circle pattern, a spiral pattern, a satin pattern, a lattice pattern, a generally pyramidal pattern, a geometric pattern, a stitch pattern, a stone like pattern, a sand pattern, a circular slit pattern, and a radial marking pattern can be selected depending on a required design.

The stripe pattern 13 in a concave and convex shape is formed by a machining process such as a cutting process in this embodiment. However, various processes such as a thermal transfer process, a press process, and a sand blasting process can also be used corresponding to a pattern to be selected. Moreover, a cross sectional shape of the pattern in a concave and convex shape can be selected as needed from a V shape, a U shape, a rectangular shape, and others.

The first reflective polarizing plate 11A and the light transmitting substrate 16 processed as described above are fixed to each other by a fixing member 19*b* made of a transparent pressure sensitive adhesion or an adhesive agent on the entire surfaces thereof.

At this time, the first reflective polarizing plate 11A and the light transmitting substrate 16 are disposed and fixed in such a manner that the flat and smooth surface of the first reflective polarizing plate 11A faces to the flat and smooth surface of the light transmitting substrate 16. After that, the light transmitting substrate 16 and the second reflective polarizing plate 11B are disposed and fixed by a fixing member 19*a* made of a pressure sensitive adhesion or an adhesive agent on the peripheral part of each other in such a manner that a prism pattern 18 of the light transmitting substrate 16 faces to the second reflective polarizing plate 11B.

After that, the first and second reflective polarizing plates 11A and 11B integrated with the light transmitting substrate 16 is fixed to the solar cell 17 by a fixing member 19 made of a pressure sensitive adhesion or an adhesive agent on the peripheral part of each other. The display panel in accordance with this embodiment is then formed as shown in FIG. 27.

The operation of the first and second reflective polarizing plates 11A and 11B will be described in the following based on FIGS. 28 and 29.

Of the lights irradiated to the first reflective polarizing plate 11A, a light of a linearly polarized component provided with a vibration plane parallel to the light reflection axis 11*b* of the first reflective polarizing plate 11A is reflected from the first reflective polarizing plate 11A and is radiated externally as a reflected light P2.

On the other hand, a light k1 of a linearly polarized component provided with a vibration plane parallel to the light transmission easy axis 11*a* of the first reflective polarizing plate 11A is transmitted in the first reflective polarizing plate 11A and irradiated to the light transmitting substrate 16.

A light k1 irradiated to the light transmitting substrate 16 is refracted in the light transmitting substrate 16, is transmitted in the light transmitting substrate 16, and is irradiated to the second reflective polarizing plate 11B.

Of the lights k1 irradiated to the second reflective polarizing plate 11B, a light n1 of a linearly polarized component provided with a vibration plane parallel to the light reflection axis 12*b* of the second reflective polarizing plate 11B is reflected from the second reflective polarizing plate 11B, is transmitted in the light transmitting substrate 16 and the first reflective polarizing plate 11A, and is radiated externally as a reflected light P3.

On the other hand, a light m1 of a linearly polarized component provided with a vibration plane parallel to the light transmission easy axis 12*a* of the second reflective polarizing plate 11B is transmitted in the second reflective polarizing plate 11B and irradiated to the solar cell 17.

As described above, the first reflective polarizing plate 11A and the second reflective polarizing plate 11B are disposed in such a manner that a direction of the light transmission easy axis 11*a* of the first reflective polarizing plate 11A and a direction of the light transmission easy axis 12*a* of the second reflective polarizing plate 11B are different from each other. The light transmission easy axis 11*a* and the light transmission easy axis 12*a* are adjusted in such a manner that a desired amount of lights is transmitted in the solar cell 17.

The lights irradiated to the solar cell 17 are classified into lights that are absorbed in the solar cell 17 and lights that are reflected from the solar cell 17. Of the lights reflected from the solar cell 17, a light m2 of a linearly polarized component provided with a vibration plane parallel to the light transmission easy axis 12*a* of the second reflective polarizing plate 11B is transmitted and refracted in the second reflective polarizing plate 11B, the light transmitting substrate 16, and the first reflective polarizing plate 11A, and is radiated externally as a reflected light P4.

On the other hand, a light n2 of a linearly polarized component provided with a vibration plane parallel to the light reflection axis 12*b* of the second reflective polarizing plate 11B is reflected by the second reflective polarizing plate 11B and is returned to the solar cell 17 side as a reflected light P5.

By the above configuration, an amount of the lights that are irradiated to the first reflective polarizing plate 11A and that are reflected from the solar cell 17 and returned to the first reflective polarizing plate 11A is extremely small.

As described above, the pattern 13 in a concave and convex shape is formed on the surface of the first reflective polarizing plate 11A. Consequently, the reflected light over the surface of the first reflective polarizing plate 11A does not become a reflected light in a uniform direction. The reflected light becomes a reflected light that is dispersed and scattered in four ways and is radiated externally.

As described above, the pattern 18 in a concave and convex shape that is a prism reflecting surface is formed on the light transmitting substrate 16. Consequently, the reflected light that is reflected on the solar cell 17 and that is transmitted in the second reflective polarizing plate 11B and the light transmitting substrate 16 does not become a reflected light in a uniform direction. The reflected light becomes a reflected light that is dispersed and scattered in four ways and is radiated to the first reflective polarizing plate 11A. The reflected light is then refracted and is radiated externally.

Therefore, lights that are reflected from the solar cell 17 become less, and a scattering occurs due to the operation of the pattern 13 in a concave and convex shape of the first reflective polarizing plate 11A and the operation of the pattern 18 in a concave and convex shape of the light transmitting substrate 16. Consequently, a cross line and a dark purplish color of the solar cell 17 are completely extinguished and are prevented from being seen.

As described above, for the display panel in accordance with this embodiment, the first and second reflective polarizing plates 11A and 11B are disposed on a visible side of the solar cell 17, and a light transmitting substrate 16 is disposed between the first reflective polarizing plate 11A and the second reflective polarizing plate 11B. In addition, the stripe pattern 13 in a concave and convex shape is formed on the surface of the first reflective polarizing plate 11A, and the pattern 18 in a concave and convex shape that is a prism reflecting surface is formed on the light transmitting substrate 16. As a result, a stripe pattern and a metal color sense of the first reflective polarizing plate 11A can be seen brightly and vividly by the reflected light from the pattern is in a concave and convex shape that is a prism reflecting surface.

Furthermore, the first reflective polarizing plate 11A and the second reflective polarizing plate 11B can be disposed in such a manner that the directions of the light transmission easy axes 11*a* and 12*a* are different from each other. Consequently, an amount of lights supplied to the solar cell 17 can be adjusted simply and easily. As a result, a manufacturing cost can be reduced.

Furthermore, an amount of lights supplied to the solar cell 17 can be adjusted in such a manner that a metal color and a white color can appear more intensively on the display panel. In addition, a cross line and a dark purplish color of the solar cell 17 can be completely extinguished.

Embodiment 18

Figure 30:
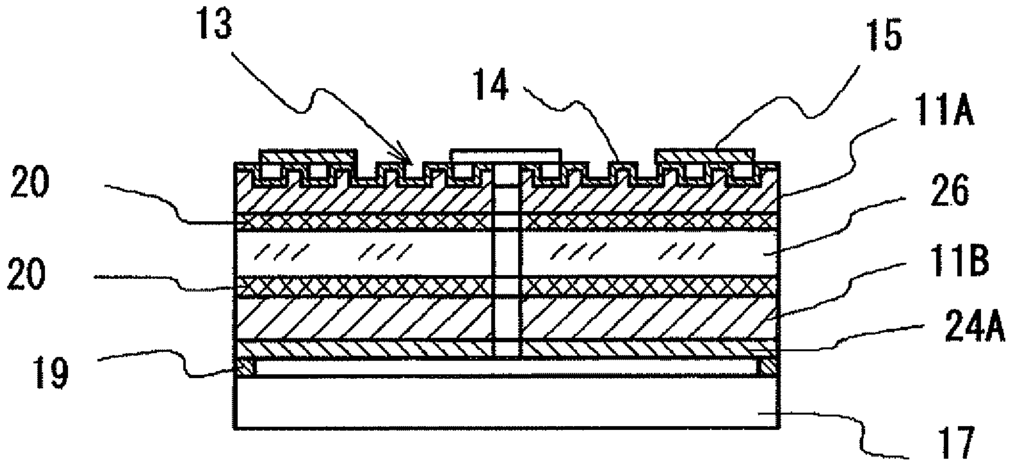
FIG. 30 is a cross-sectional view showing a display panel in accordance with an embodiment 18 of the present invention.

FIG. 30 is a schematic cross-sectional view showing a display panel in accordance with an embodiment 18 of the present invention.

As shown in FIG. 30, a display panel in accordance with this embodiment is provided with a solar cell 17, the first and second reflective polarizing plates 11A and 11B disposed on a visible side of the solar cell 17, and a light transmitting substrate 26 disposed between the first reflective polarizing plate 11A and the second reflective polarizing plate 11B.

In addition, a stripe pattern 13 in a concave and convex shape is formed on the surface of the first reflective polarizing plate 11A, and a light transmitting colored layer 14 is formed on a visible side of the first reflective polarizing plate 11A. Moreover, a diffusing layer 24A is formed on the surface of the second reflective polarizing plate 11B on the side that faces to the solar cell 17.

The both surfaces of the light transmitting substrate 26 are finished to form a flat and smooth surface. Moreover, the first and second reflective polarizing plates 11A and 11B and the light transmitting substrate 26 are fixed to each other on the entire surfaces thereof by a thermo compression bonding. However, other configurations are equivalent to those of the embodiment 17.

For a manufacturing method of the display panel in accordance with this embodiment, a light transmitting substrate blank material is laminated and disposed between two reflective polarizing plate substrates, and the light transmitting substrate blank material and the two reflective polarizing plate substrates are pressure-bonded and fixed to each other by a thermo compression bonding and are integrated with each other.

The both surfaces of the light transmitting substrate blank material and the both surfaces of the reflective polarizing plate substrates are finished to form a flat and smooth surface.

Subsequently, a stripe pattern 13 in a concave and convex shape is formed on the surface of the integrated first reflective polarizing plate, and the reflective polarizing plate is then die-cut in the shape of a display panel to form the first and second reflective polarizing plates 11A and 11B and the light transmitting substrate 26 integrated with each other.

In FIG. 30, the crossed diagonal lines are drawn to enable a thermo compression bonded region 20 between the first reflective polarizing plate 11A and the light transmitting substrate 26, and between the second reflective polarizing plate 11B and the light transmitting substrate 26 to be easily found.

As described above, the flat and smooth surfaces can be pressure-bonded and fixed to each other by a thermo compression bonding without using an adhesive agent or a pressure sensitive adhesion. Moreover, the second reflective polarizing plate 11B integrated with the light transmitting substrate 26 is fixed to the solar cell 17 by a fixing member 19 made of a pressure sensitive adhesion or an adhesive agent on the peripheral part of each other. The display panel in accordance with this embodiment is then formed as shown in FIG. 30.

The light transmitting colored layer 24 that is disposed on the surface of the pattern 13 in a concave and convex shape of the first reflective polarizing plate 11A is formed by mixing a white pigment to a resin and by a printing method. It is to color the display board to be white that the white pigment is used. In the case in which the light transmitting colored film is thicker, the display board is colored to be white, but a light transmittance is degraded.

Consequently, the light transmitting colored film is thinned to be in the range of 7 to 10 μm, and a light transmittance thereof is decreased by approximately 10% due to the thickness.

In the case in which the light transmitting colored film is toned to be another color, another pigment can be used. Moreover, an extremely thin metal film can be formed by a method such as evaporation. The material and method can be selected as needed corresponding to a desired color tone.

The diffusing layer 24A formed on the surface of the second reflective polarizing plate 11B is made of a substance in which a diffusing agent having a function for diffusing an irradiated light is mixed to a pressure sensitive adhesive, an adhesive agent, or a resin (a transparent ink or a transparent coating compound). As a material of the diffusing agent, there can be used for instance a material such as silica, glass, and a resin having a shape in a granular state, a powdered state, a scale-like state, or an acicular state.

In this embodiment, a value of a crossed axes angle s of the light transmission easy axis 11*a* and the light transmission easy axis 12*a* on the first reflective polarizing plate 11A and the second reflective polarizing plate 11B is set to approximately 15 degrees. However, other constructional elements are equivalent to those of the embodiment 17, and the detailed descriptions of the elements are omitted.

As described above, for the display panel in accordance with this embodiment, by forming the light transmitting colored layer 14 and the diffusing layer 24A, a color of the solar cell 17 can be completely extinguished, a white color tone is increased, a white color sense is highlighted, and a stripe pattern 13 in a concave and convex shape can be seen vividly.

As a result, a sophisticated and expensive-looking display panel can be obtained. In addition, a cross line and a dark purplish color of the solar cell are completely extinguished and prevented from being seen.

In this embodiment, similarly to the embodiment 17, an amount of lights supplied to the solar cell 17 can be adjusted simply and easily. As a result, a manufacturing cost can be reduced. Furthermore, an amount of lights supplied to the solar cell 17 can be adjusted in such a manner that a metal color and a white color can appear more intensively on the display panel.

Embodiment 19

Figure 31:
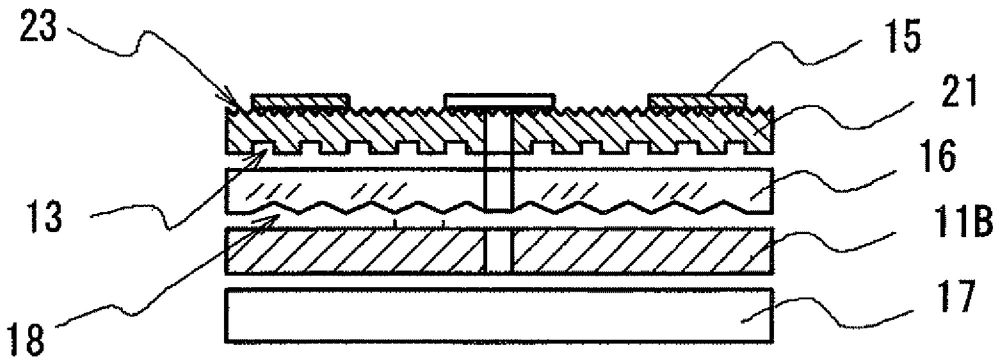
FIG. 31 is a cross-sectional view showing a display panel in accordance with an embodiment 19 of the present invention.

FIG. 31 is a cross-sectional view showing a display panel in accordance with an embodiment 19 of the present invention.

As shown in FIG. 31, a display panel in accordance with this embodiment is provided with a solar cell 17, the first and second reflective polarizing plates 21 and 11B disposed on a visible side of the solar cell 17, and a light transmitting substrate 16 disposed between the first reflective polarizing plate 21 and the second reflective polarizing plate 11B.

A satin pattern 23 in a concave and convex shape is formed on the surface of a visible side of the first reflective polarizing plate 21, and a stripe pattern 13 in a concave and convex shape is formed on the surface on the side that faces to the light transmitting substrate.

Without using a fixing member, the first and second reflective polarizing plates 21 and 11B, the light transmitting substrate 16, and the solar cell 17 are be laminated and held by an inner frame or the like for the watch.

For the first and second reflective polarizing plates 21 and 11B in accordance with this embodiment, the operations of a transmission and a reflection of a light are equivalent to those of the first and second reflective polarizing plates 11A and 11B described in the embodiment 17.

Moreover, for the light transmission substrate 16, the pattern 18 in a concave and convex shape that is a prism reflecting surface is formed on the surface on the side that faces to the second reflective polarizing plate 11B. The light transmitting substrate 16 is equivalent to that of the embodiment 1, and the detailed descriptions of the element are omitted. Other configurations are equivalent to those of the embodiment 17, and the detailed descriptions are omitted.

Similarly to the reflective polarizing plate 11 of the embodiment 2, for the satin pattern 23 in a concave and convex shape formed on the surface of the reflective polarizing plate 21 in accordance with this embodiment, a metal color sense and a white color sense of the display panel can be adjusted by varying a size of a concave and a convex. Since the configuration is equivalent to that of the reflective polarizing plate 11 of the embodiment 2, the detailed description thereof is omitted.

In this embodiment, a size of a concave and a convex is set to a roughness in the range of #600 to obtain a white color sense. Similarly to the reflective polarizing plate 11 of the embodiment 2, a sand blasting method in which sand or the like is blasted at a high pressure is used in general. A roughness of the satin pattern can be selected by adjusting a particle diameter of sands to be used.

As described above, for the display panel in accordance with this embodiment, a stripe pattern 13 in a concave and convex shape formed on the surface of the first reflective polarizing plate 21 on the side that faces to the light transmission substrate can be seen brightly and vividly by the reflected light from the pattern 18 in a concave and convex shape that is a prism reflecting surface of the light transmission substrate 16.

Moreover, a display panel provided with a white color sense in which a white color tone is more increased can be obtained by forming a satin pattern 23 in a concave and convex shape on the surface of a visible side of the first reflective polarizing plate 21.

In this embodiment, in consideration of the satin pattern 23 in a concave and convex shape formed on the surface of a visible side of the first reflective polarizing plate 21, a value of a crossed axes angle of the light transmission easy axes of the first and second reflective polarizing plates 21 and 12 is set to approximately 15 degrees in order to ensure an amount of transmitted lights.

By the above configuration, a color of the solar cell 17 can be completely extinguished, a white color tone is increased, and a white color sense can be seen. As a result, a sophisticated and expensive-looking display panel can be obtained. Moreover, an effect similar to that of the embodiment 17 can also be obtained in this embodiment.

Embodiment 20

A display panel in accordance with an embodiment 20 is an embodiment in which a retardation plate is disposed as a light transmission substrate.

Figure 32:
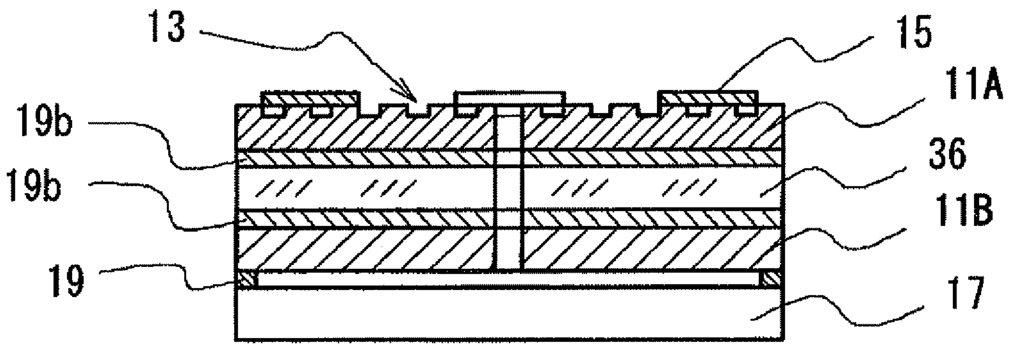
FIG. 32 is a cross-sectional view showing another embodiment of a display panel in accordance with the embodiment 20 of the present invention.

FIG. 32 is a cross-sectional view showing a display panel in accordance with the embodiment 20 of the present invention.

Figure 33:
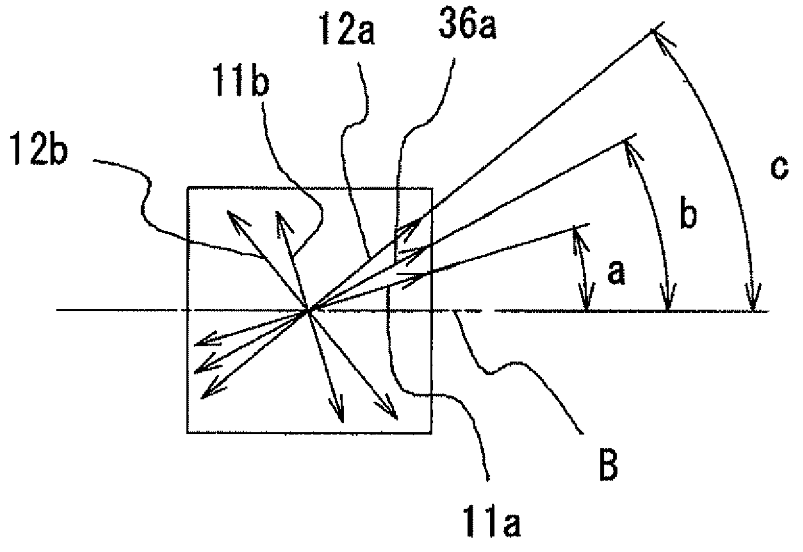
FIG. 33 is a plan view showing the arrangement of each optical axis of the first and second reflective polarizing plates and retardation plates in accordance with the embodiment 20 of the present invention.

FIG. 33 is a plan view showing the arrangement of each optical axis of the first and second reflective polarizing plates and retardation plates in accordance with the embodiment 20 of the present invention. FIG. 34 is a view showing a relationship between the arrangement of the first and second reflective polarizing plates and retardation plates in accordance with the embodiment 20 of the present invention and display colors.

As shown in FIG. 32, a display panel in accordance with this embodiment is provided with a solar cell 17, the first and second reflective polarizing plates 11A and 11B disposed on a visible side of the solar cell 17, and a retardation plate as a light transmitting substrate 36 disposed between the first reflective polarizing plate 11A and the second reflective polarizing plate 11B.

Moreover, the reflective polarizing plate 11 and the light transmitting substrate (the retardation plate) 36 are fixed to each other by a fixing member 19*b* made of a transparent pressure sensitive adhesion or an adhesive agent on the entire surfaces thereof. The light transmitting substrate (the retardation plate) 36 and the second reflective polarizing plate 11B are fixed to each other by a fixing member 19*b* made of a pressure sensitive adhesion or an adhesive agent on the entire surfaces thereof.

Moreover, the second reflective polarizing plate 11B and the solar cell 17 are fixed to each other by a fixing member 19 made of a pressure sensitive adhesion or an adhesive agent on the peripheral part of each other.

The first reflective polarizing plate 11A and the second reflective polarizing plate 11B are equivalent to those of the embodiment 17, and the detailed descriptions of the elements are omitted. The first reflective polarizing plate 11A and the second reflective polarizing plate 11B are disposed in such a manner that an optical axis (a light transmission easy axis or a light reflection axis) thereof is shifted obliquely at a predetermined angle to an optical axis (a phase advance axis or a phase delay axis) of the light transmitting substrate (the retardation plate) 36.

FIG. 33 is a plan view schematically showing the arrangement of the light transmission easy axes 11*a* and 12*a* and the light reflection axes 11*b* and 12*b* of the first and second reflective polarizing plates 11A and 11B, and a phase delay axis 36*a* of the light transmitting substrate (the retardation plate) 36 for the display panel.

In FIG. 33, a straight line shown by an alternate long and short dash line is a reference line B in a horizontal direction of the display surface, and is disposed for an explanation.

In FIG. 33, the phase delay axis 36*a* of the light transmitting substrate (the retardation plate) 36 is obliquely crossed to the reference line B at a predetermined slope angle b. In addition, the light transmission easy axes 11*a* and 12*a* of the first and second reflective polarizing plates 11A and 11B are obliquely crossed to the reference line B at predetermined slope angles a and c, respectively.

The slope angles of the light reflection axes 11*b* and 12*b* to the reference line B are (a+90°) and (c+90°), respectively.

In this embodiment, the light transmission easy axes 11*a* and 12*a* of the first and second reflective polarizing plates 11A and 11B are arranged almost parallel to each other or perpendicularly to each other. In addition, the light transmission easy axes 11*a* and 12*a* of the first and second reflective polarizing plates 11A and 11B are obliquely shifted by 45° to the phase delay axis 36*a* of the light transmitting substrate (the retardation plate) 36.

For the display panel in accordance with this embodiment, a colored display color can be obtained by a polarizing operation of the light transmitting substrate (the retardation plate) 36.

The coloring by a polarizing operation of the light transmitting substrate (the retardation plate) 36 will be briefly described in the following.

In the case in which a light from the outside (a natural light or a light from an illuminating light source) is irradiated to the first reflective polarizing plate 11A, a light of a linearly polarized component provided with a vibration plane parallel to the light transmission easy axis 11*a* is transmitted in the first reflective polarizing plate 11A, and a light of a linearly polarized component provided with a vibration plane parallel to the light transmission easy axis 11*b* is reflected from the first reflective polarizing plate 11A.

A light that has been linearly polarized by the first reflective polarizing plate 11A and transmitted in the first reflective polarizing plate 11A is irradiated to the light transmitting substrate (the retardation plate) 36 in which the phase delay axis 40*a* is shifted by approximately 45° to the light transmission easy axis 11*a*. A polarizing operation is then applied to the light corresponding to a retardation Re of the light transmitting substrate (the retardation plate) 36 in the process of passing through the light transmitting substrate (the retardation plate) 36, and the light becomes an elliptically polarized light.

In the case in which the elliptically polarized light that has exited from the light transmitting substrate (the retardation plate) 36 is irradiated to the second reflective polarizing plate 11B, a wavelength light of a linearly polarized component provided with a vibration plane parallel to the light transmission easy axis 12*a* of the second reflective polarizing plate 11B is transmitted in the second reflective polarizing plate 11B. Subsequently, a light (linearly polarized light) that has passed through the second reflective polarizing plate 11B becomes a colored light.

A wavelength light of a linearly polarized component provided with a vibration plane parallel to a light reflection axis of the second reflective polarizing plate 11B is reflected from the second reflective polarizing plate 113. The reflected light also becomes a colored light.

The colored light reflected from the second reflective polarizing plate 11B exits to the upper surface side of the display panel on the route reverse to the light route described above. Consequently, a display caused by a color of the colored exit light can be obtained, and the display color can be seen.

Moreover, the colored light that has been transmitted in the second reflective polarizing plate 113 is irradiated to the solar cell 17. A part of the colored light is reflected from the solar cell 17 and goes to the upper surface side of the display panel on the route reverse to the light route described above. However, since an amount of the light is extremely small, the colored light cannot be seen.

A retardation Re of the light transmitting substrate (the retardation plate) 36 is determined by Δn·d (product of a refractive index anisotropy Δn and a plate thickness d of the retardation plate) of the light transmitting substrate (the retardation plate) 36.

FIG. 34 is a view showing an example of a display color for the display panel in accordance with this embodiment.

FIG. 34(*a*) is a view showing an example in the case in which one of a retardation plate having a retardation Re of 620 nm and a retardation plate having a retardation Re of 380 nm is disposed as the light transmitting substrate (the retardation plate) 36.

FIG. 34(*b*) is a view showing an example in the case in which a retardation plate having a retardation Re of 620 nm and a retardation plate having a retardation Re of 380 nm are both disposed.

The values shown in FIGS. 34(*a*) and 34(*b*) represent an arrangement angle of each optical axis of the first and second reflective polarizing plates and retardation plates to the reference line B of FIG. 33. A desired display color can be obtained by varying an arrangement angle and the retardation Re. The specific example of a display color will be described in the following based on FIGS. 33 and 34.

For an example 1 of FIG. 34(*a*), an arrangement angle a of the light transmission easy axis 11*a* of the first reflective polarizing plate 11A is set to 0° to the reference line B, a retardation plate having a retardation Re of 620 nm is used as the light transmitting substrate (the retardation plate) 36, and an arrangement angle b of the phase delay axis 36*a* thereof is set to 45° to the reference line B. In addition, an arrangement angle c of the light transmission easy axis 12*a* of the second reflective polarizing plate 11B is set to 0° to the reference line B. As a result, a display color of the display panel is blue.

For an example 2 of FIG. 34(*a*), an arrangement angle c of the light transmission easy axis 12*a* of the second reflective polarizing plate 11B is set to 90° to the reference line B. As a result, a display color of the display panel is yellow.

For the examples 3 and 4 of FIG. 34(*a*), a retardation plate having a retardation Re of 380 nm is used as the light transmitting substrate (the retardation plate) 36. A display color of the display panel is changed to yellow or blue corresponding to a value of an arrangement angle c (0° or 90°) of the light transmission easy axis 12*a* of the second reflective polarizing plate 11B.

For the examples 1 and 2 of FIG. 34(*b*), two retardation plates having a retardation Re of 620 nm are used as the light transmitting substrate (the retardation plate) 36. A display color of the display panel is changed to green or red corresponding to a value of an arrangement angle c (0° or 90°) of the light transmission easy axis 12*a* of the second reflective polarizing plate 11B.

For the examples 3 and 4 of FIG. 34(*b*), two retardation plates having a retardation Re of 380 nm are used as the light transmitting substrate (the retardation plate) 36. A display color of the display panel is changed to green or red corresponding to a value of an arrangement angle c (0° or 90°) of the light transmission easy axis 12*a* of the second reflective polarizing plate 11B.

For the examples 5 and 6 of FIG. 34(*b*), a retardation plate having a retardation Re of 620 nm and a retardation plate having a retardation Re of 380 nm are used as the light transmitting substrate (the retardation plate) 36. A display color of the display panel is changed to red or green corresponding to a value of an arrangement angle c (0° or 90°) of the light transmission easy axis 12*a* of the second reflective polarizing plate 11B.

As described above, a display panel having a desired display color can be obtained by setting a value of a retardation Re as the light transmitting substrate (the retardation plate) 36 and an arrangement angle of the optical axis of the first and second reflective polarizing plates or the light transmitting substrate (the retardation plate) 36 to a prescribed value.

As described above, for the display panel in accordance with this embodiment, the first reflective polarizing plate 11A, the light transmitting substrate (the retardation plate) 36, and the second reflective polarizing plate 11B are laminated and disposed in this order in a direction of an irradiation of a light, and the light transmission easy axes 11*a* and 12*a* of the first and second reflective polarizing plates 11A and 11B and a phase delay axis 36*a* of the light transmitting substrate (the retardation plate) 36 are arranged at predetermined angles.

By the above configuration, a light that has been transmitted in the first reflective polarizing plate 11A and the light transmitting substrate (the retardation plate) 36 and that has been irradiated to the second reflective polarizing plate 11B is reflected from the second reflective polarizing plate 11B, and the reflected light exits to the upper surface side of the first reflective polarizing plate 11A on the route reverse to the light route described above. A display color having a wavelength indicating a peak for a spectral intensity of this outgoing light can be obtained.

As a result, a stripe pattern 13 in a concave and convex shape colored to be a desired color can be seen vividly, whereby a sophisticated and expensive-looking display panel can be obtained. In addition, a cross line and a dark purplish color of the solar cell are completely extinguished and are prevented from being seen.

The number of the light transmitting substrates (the retardation plates) can be determined arbitrarily as needed. The arrangement of the optical axis of the first and second reflective polarizing plates and the optical axis of the light transmitting substrate (the retardation plate) is not restricted to the examples shown in FIG. 34, and can be set arbitrarily as needed.

Embodiment 21

A display panel in accordance with an embodiment 21 is an embodiment in which a pressure sensitive adhesion containing a substrate having a predetermined thickness is disposed between the first and second reflective polarizing plates that face to each other, whereby a display panel having a desired display color can be obtained.

Figure 35:
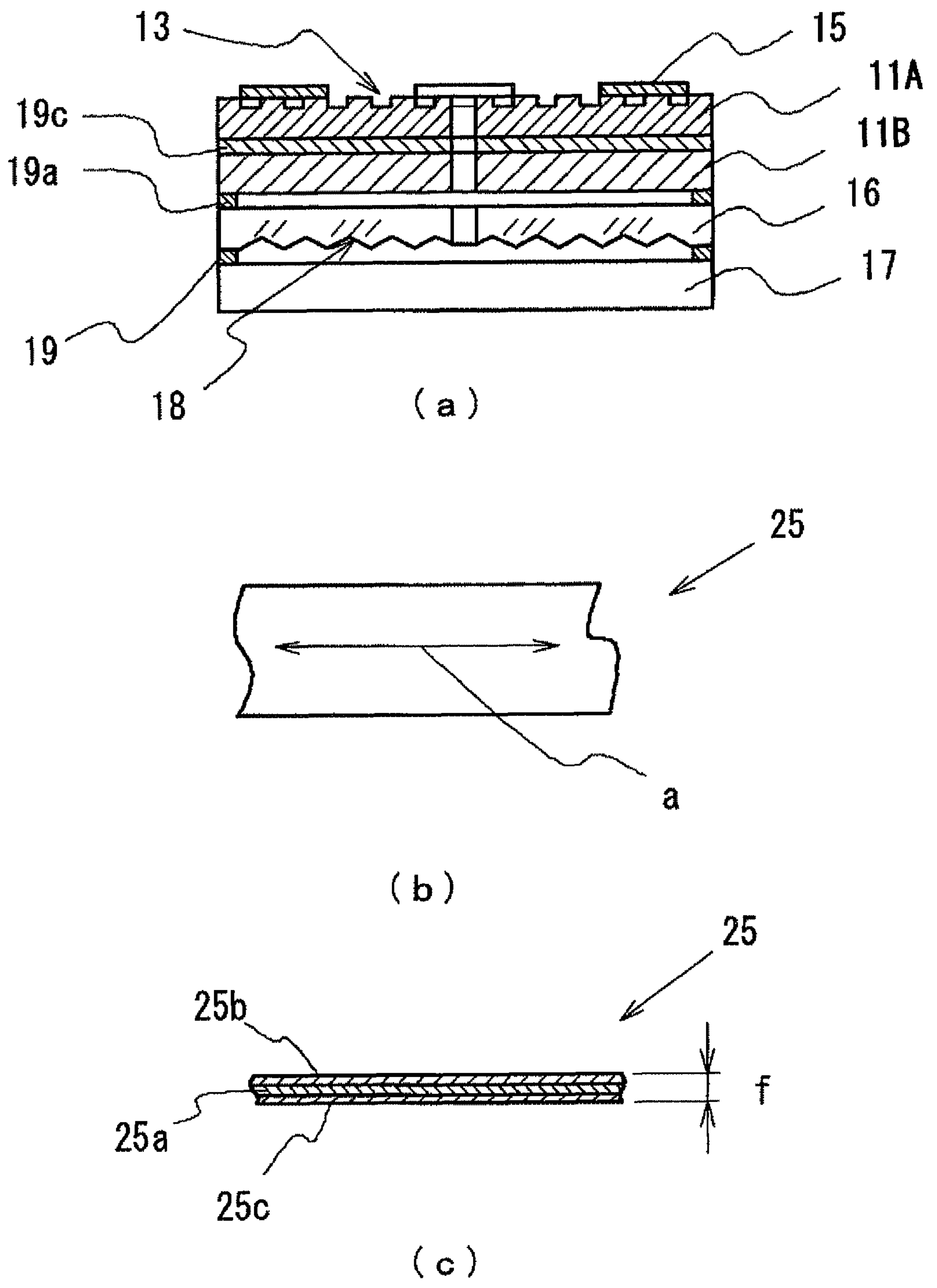
FIG. 35 shows a display panel in accordance with an embodiment 21 of the present invention.

FIG. 35 shows a display panel in accordance with an embodiment 21 of the present invention. FIG. 35(*a*) is a schematic cross-sectional view, FIG. 15(*b*) is a plan view showing a pressure sensitive adhesion containing a transparent substrate disposed between the first reflective polarizing plate and the second reflective polarizing plate, and FIG. 15(*c*) is a cross-sectional view showing the pressure sensitive adhesion containing a substrate.

FIG. 36 is a view showing a relationship between the arrangement of the first and second reflective polarizing plates and the pressure sensitive adhesion containing a substrate in accordance with the embodiment 21 of the present invention and the display colors.

As shown in FIG. 35, a display panel in accordance with this embodiment is provided with a solar cell 17, the first and second reflective polarizing plates 11A and 11B disposed on a visible side of the solar cell 17, and a light transmitting substrate 16 disposed between the second reflective polarizing plate 11B and the solar cell 17.

The first reflective polarizing plate 11A is disposed on the most visible side, and a pressure sensitive adhesion containing a transparent substrate is disposed between the first reflective polarizing plate 11A and the second reflective polarizing plate 11B. In addition, the first reflective polarizing plate 11A and the second reflective polarizing plate 11B are fixed to each other by a fixing member 19*c* made of the pressure sensitive adhesion containing a substrate on the entire surfaces thereof.

The second reflective polarizing plate 11B and the light transmitting substrate 16 are fixed to each other by a fixing member 19*a* made of a pressure sensitive adhesion or an adhesive agent on the peripheral part of each other.

Moreover, the light transmitting substrate 16 and the solar cell 17 are fixed to each other by a fixing member 19 made of a pressure sensitive adhesion or an adhesive agent on the peripheral part of each other.

In this embodiment, a value of a crossed axes angle s of the light transmission easy axis 11*a* and the light transmission easy axis 12*a* on the first reflective polarizing plate 11A and the second reflective polarizing plate 11B is set to approximately 20 degrees.

The first reflective polarizing plate 11A provided with a stripe pattern 13 in a concave and convex shape, the second reflective polarizing plate, and the light transmitting substrate 16 provided with a prism pattern 18 are equivalent to those of the embodiment 1, and the detailed descriptions of the elements are omitted.

As a fixing member 19*c* made of the pressure sensitive adhesion containing a substrate, two pressure-sensitive adhesive double coated tapes (#5603) 25 manufactured by Nitto Denko Corporation are laminated and disposed. For the pressure-sensitive adhesive double coated tapes (#5603) 25, a substrate 25*a* is made of a transparent polyester film, and transparent acrylic pressure sensitive adhesions 25*b* and 25*c* are formed on the both surfaces of the substrate 25*a*. A thickness f of the pressure-sensitive adhesive double coated tapes (#5603) 25 is 30 μm.

FIG. 36 is a view showing an example of a display color for the display panel in accordance with this embodiment. The values shown in FIG. 36 represent an arrangement angle a of an optical axis of the first reflective polarizing plate and an arrangement angle c of an optical axis of the second reflective polarizing plate to the reference line B of FIG. 33, and an arrangement angle e to the reference line B in a longitudinal direction shown by an arrow a in the pressure-sensitive adhesive double coated tapes (#5603) 25 of FIG. 35(*b*) (not shown in FIG. 33). The specific example of a display color of the display panel will be described in the following based on FIG. 36.

For the examples 1 and 2 of FIG. 36, the arrangement angles a and c of the light transmission easy axes 11*a* and 12*a* of the first and second reflective polarizing plates 11A and 11B are set to 0° to the reference line B, and an arrangement angle e in a longitudinal direction of the pressure-sensitive adhesive double coated tapes (#5603) 25 is set to 90° or 0° to the reference line B. As a result, a display color of the display panel is yellow in any of the examples.

For the examples 3 and 4 of FIG. 36, the arrangement angle c of the light transmission easy axis 12*a* of the second reflective polarizing plate 11B is set to 90° to the reference line B to the examples 1 and 2. As a result, a display color of the display panel is blue in any of the examples 3 and 4.

For the examples 5 and 6 of FIG. 36, the arrangement angles a and c of the light transmission easy axes 11*a* and 12*a* of the first and second reflective polarizing plates 11A and 11B are set to 0° and 45°, respectively, to the reference line B, and an arrangement angle e in a longitudinal direction of the pressure-sensitive adhesive double coated tapes (#5603) 25 is set to 45° or −45° to the reference line B. As a result, a display color of the display panel is yellow in any of the examples.

For the examples 7 and 8 of FIG. 36, the arrangement angle c of the light transmission easy axis 12*a* of the second reflective polarizing plate 11B is set to −45° to the reference line B to the examples 5 and 6. As a result, a display color of the display panel is blue in any of the examples 7 and B.

As described above, a display panel having a desired display color can be obtained by setting a value of an arrangement angle e in a longitudinal direction of the pressure-sensitive adhesive double coated tapes (#5603) 25 and the arrangement angles a and c of the optical axes of the first and second reflective polarizing plates 11A and 11B to a prescribed value.

As described above, for the display panel in accordance with this embodiment, two pressure-sensitive adhesive double coated tapes (#5603) 25 are laminated and used as a fixing member 19*c*, and are disposed between the first reflective polarizing plate 11A and the second reflective polarizing plate 11B. As a result, the intricate retraction and reflection are repeated at a boundary of the first reflective polarizing plate 11A and the second reflective polarizing plate 11B, and a display panel that is colored by a variety of colors can be obtained.

The display color can be seen vividly by a reflected light from the prism pattern 18 of the light transmitting substrate 16.

As a result, a colored stripe pattern 13 in a concave and convex shape can be seen vividly, whereby a sophisticated and expensive-looking display panel can be obtained by a simple method. In addition, a cross line and a dark purplish color of the solar cell are completely extinguished and are prevented from being seen. In this embodiment, an example in which two pressure-sensitive adhesive double coated tapes (#5603) 25 are used is described. However, the number of the pressure-sensitive adhesive double coated tapes is not restricted to two, and can be selected arbitrarily as needed. Moreover, other transparent films can also be used as a substrate.

Embodiment 22

Figure 37:
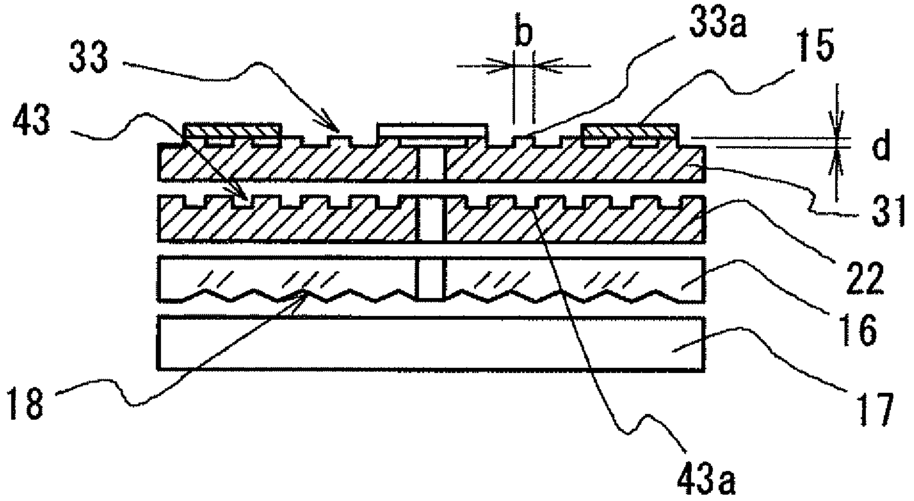
FIG. 37 is a cross-sectional view showing a display panel in accordance with an embodiment 22 of the present invention.

FIG. 37 is a cross-sectional view showing a display panel in accordance with an embodiment 22 of the present invention.

In this embodiment, a pattern in a concave and convex shape is formed on the surface of the first reflective polarizing plate and the surface of the second reflective polarizing plate.

As shown in FIG. 37, a display panel in accordance with this embodiment is provided with a solar cell 17, the first and second reflective polarizing plates 31 and 22 disposed on a visible side of the solar cell 17, and a light transmitting substrate 16 disposed between the second reflective polarizing plate 22 and the solar cell 17.

Without using a fixing member, the first and second reflective polarizing plates 31 and 22, the light transmitting substrate 16, and the solar cell 17 are be laminated and held by an inner frame or the like for the watch. Moreover, a value of a crossed axes angle s of the light transmission easy axes on the first and second reflective polarizing plates 31 and 22 is set to approximately 20 degrees.

The first reflective polarizing plate 31 is disposed on the most visible side. A lattice pattern 33 in a concave and convex shape is formed on the surface of a visible side of the reflective polarizing plate 31. In addition, a time character 15 and a mark or the like are also arranged on the surface.

A lattice pattern 43 in a concave and convex shape is also formed on the surface of the second reflective polarizing plate 22 on the side that faces to the first reflective polarizing plate 31. The both patterns in a concave and convex shape are formed by a transcription from a metal mold.

For the first and second reflective polarizing plates 31 and 22 in accordance with this embodiment, the operations of a transmission and a reflection of a light are basically equivalent to those of the first and second reflective polarizing plates 11A and 11B described in the embodiment 17. Moreover, the pattern 18 in a concave and convex shape is formed on the surface of the light transmission substrate 16 on the side that faces to the solar cell 17. The configuration is equivalent to that of the embodiment 17, and the detailed descriptions of the element are omitted.

A depth and a width of a concave portion and a width of a convex portion for the lattice pattern 33 in a concave and convex shape formed on the surface of the first reflective polarizing plate 31 are designed to be large enough in such a manner that the concave and convex are visible. Consequently, the pattern can be seen clearly from the upper side.

A size of the lattice of the lattice pattern 43 in a concave and convex shape formed on the surface of the second reflective polarizing plate 22 is equivalent to that of the lattice pattern 33 in a concave and convex shape formed on the surface of the first reflective polarizing plate 31.

Moreover, the first reflective polarizing plate 31 and the second reflective polarizing plate 22 are laminated in such a manner that a concave portion 43*b* of the pattern 43 in a concave and convex shape of the second reflective polarizing plate 22 is disposed at a position corresponding to a convex portion 33*a* of the pattern 33 in a concave and convex shape of the first reflective polarizing plate 31.

A value of a width b of the lattice pattern 33 in a concave and convex shape of the first reflective polarizing plate 31 is not restricted in particular. However, it is preferable that the width b is set in the range of 40 to 60 μm. Moreover, a value of a depth d of the pattern can be set properly. However, it is preferable that the depth d is set in the range of 10 to 20 μm.

The lattice pattern 43 in a concave and convex shape formed on the surface of the second reflective polarizing plate 22 is equivalent to the lattice pattern 33 in a concave and convex shape formed on the surface of the first reflective polarizing plate 31 described above, and the detailed descriptions of the element are omitted.

As described above, for the display panel in accordance with this embodiment, a depth of a lattice pattern in a concave and convex shape is highlighted, and a pattern in a concave and convex shape with a stereoscopic sense can be seen, whereby a more sophisticated and expensive-looking display panel can be obtained.

Moreover, the display panel in accordance with this embodiment is finished in such a manner that a metal color sense appears as a whole by a reflected light of the second reflective polarizing plate 22 and a reflected light of the pattern 18 in a concave and convex shape that is a prism reflecting surface of the light transmission substrate 16.

Therefore, lights that are reflected from the solar cell 17 become less, and a scattering occurs due to the operation of the pattern 18 in a concave and convex shape that is a prism reflecting surface. Consequently, a cross line and a dark purplish color of the solar cell 17 are completely extinguished and are prevented from being seen.

For the display panel in accordance with this embodiment, the same lattice pattern in a concave and convex shape is formed on the surface of the first reflective polarizing plate 31 and the surface of the second reflective polarizing plate 22. However, different patters can also be formed on the surface of the first reflective polarizing plate and the surface of the second reflective polarizing plate.

In this case, different patters in a concave and convex shape can be seen in such a manner that the patterns are superimposed on each other. As a result, an intricate pattern in which two patterns are combined is displayed with a bright metal color sense, whereby a design variation of the display panel can be enlarged. In addition, a cross line and a dark purplish color of the solar cell are completely extinguished and prevented from being seen.

Embodiment 23

Figure 38:
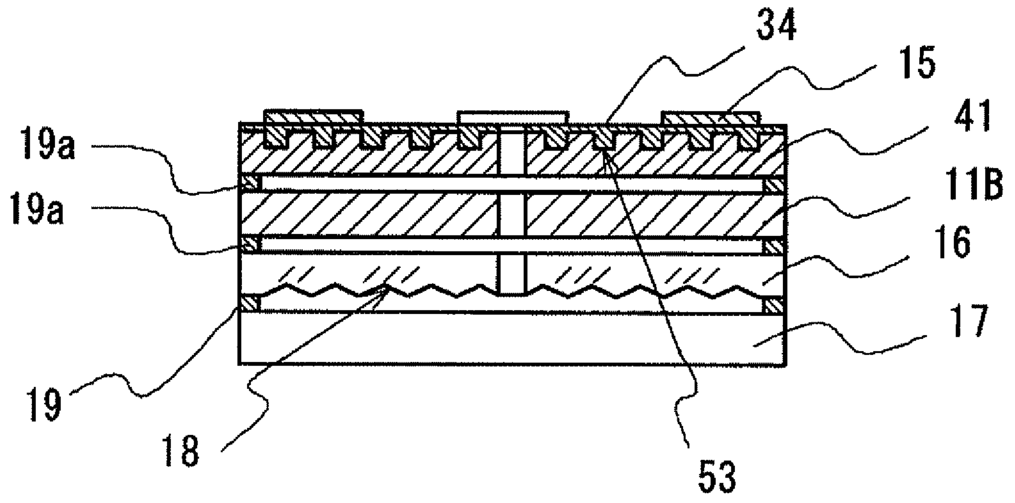
FIG. 38 is a cross-sectional view showing a display panel in accordance with an embodiment 23 of the present invention.

FIG. 38 is a cross-sectional view showing a display panel in accordance with an embodiment 23 of the present invention.

As shown in FIG. 38, a display panel in accordance with this embodiment is provided with a solar cell 17, the first and second reflective polarizing plates 41 and 12 disposed on a visible side of the solar cell 17, and a light transmitting substrate 16 disposed between the second reflective polarizing plate 11B and the solar cell 17. In addition, a light transmitting colored layer 34 is formed on the surface of a visible side of the first reflective polarizing plate 41.

The first reflective polarizing plate 41, the second reflective polarizing plate 11B, and the light transmitting substrate 16 are fixed to each other by a fixing member 19*a* made of a pressure sensitive adhesion or an adhesive agent on the peripheral part of each other.

The light transmitting substrate 16 and the solar cell 17 are fixed to each other by a fixing member 19 made of a pressure sensitive adhesion or an adhesive agent on the peripheral part of each other. Moreover, a value of a crossed axes angle s of the light transmission easy axes on the first and second reflective polarizing plates 41 and 12 is set to approximately 15 degrees.

A stone pattern 53 in a concave and convex shape is formed on the surface of a visible side of the first reflective polarizing plate 41, and the light transmitting colored layer 34 is formed on the surface of the pattern 53 in a concave and convex shape.

A time character 15 and a mark or the like are formed on the surface of a visible side of the first reflective polarizing plate 41 via the light transmitting colored layer 34.

The stone pattern 53 in a concave and convex shape of the first reflective polarizing plate 41 is formed by a transcription from a metal mold. The values of a width and a depth of the pattern 53 in a concave and convex shape are not restricted in particular. However, it is preferable that the width and depth are set in the range of 10 to 25 μm.

For the first reflective polarizing plate 41 in accordance with this embodiment, the operations of a transmission and a reflection of a light are equivalent to those of the reflective polarizing plate 11 described in the embodiment 17.

The second reflective polarizing plate 11B is in a flat plate shape similarly to the embodiment 17. Moreover, for the light transmission substrate 16, the pattern 18 in a concave and convex shape that is a prism reflecting surface is formed on the surface on the side that faces to the solar cell 17. The light transmitting substrate 16 is equivalent to that of the embodiment 17, and the detailed descriptions of the element are omitted.

For the light transmitting colored layer 34, the stone pattern 53 in a concave and convex shape of the first reflective polarizing plate 41 is coated with a transparent blue coating compound in such a manner that a concave portion of the stone pattern 53 is completely filled to form a thick film layer, and the surface of the thick film layer is then polished to form a flat and smooth surface.

By this configuration, a blue stone pattern appears brightly and vividly by a reflected light of the first reflective polarizing plate 41, a blue color of the light transmitting colored layer 34, and a reflecting operation of the pattern 18 in a concave and convex shape that is a prism reflecting surface of the light transmission substrate 16.

As described above, for the display panel in accordance with this embodiment, a blue stone pattern 53 in a concave and convex shape can be seen clearly from a visible side. Since the surface of the light transmitting colored layer 34 is polished to form a flat and smooth surface, a blue stone pattern becomes deep, and a sophisticated and expensive-looking display board can be obtained.

Moreover, a blue stone pattern appears brightly and vividly by a reflecting operation of the pattern 19 in a concave and convex shape that is a prism reflecting surface of the light transmission substrate 16.

Moreover, a value of a crossed axes angle s of the light transmission easy axes on the first and second reflective polarizing plates 41 and 12 is set to approximately 15 degrees. Consequently, lights of an amount sufficient for an electric power generation in the solar cell 17 can be supplied, and a cross line and a dark purplish color of the solar cell 17 are completely extinguished and are prevented from being seen.

Embodiment 24

Figure 39:
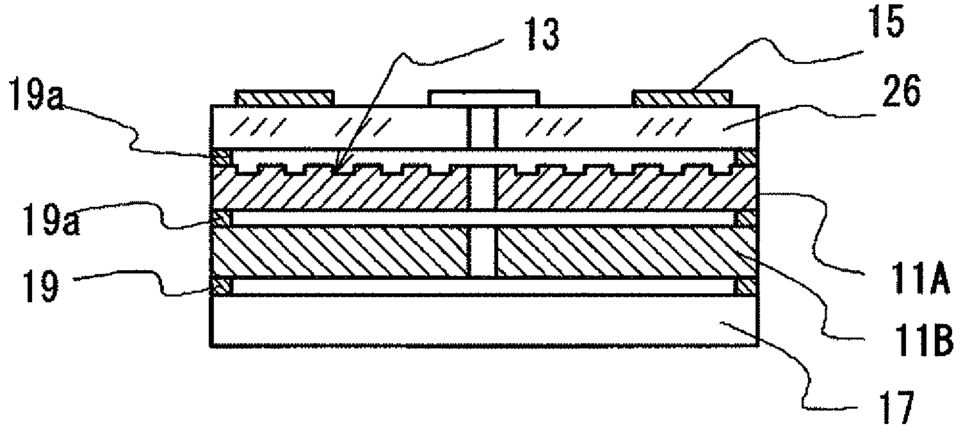
FIG. 39 is a cross-sectional view showing a display panel in accordance with an embodiment 24 of the present invention.

FIG. 39 is a cross-sectional view showing a display panel in accordance with an embodiment 24 of the present invention.

As shown in FIG. 39, the display panel in accordance with the embodiment 24 is provided with a solar cell 17, a light transmitting substrate 26 formed on a visible side of the solar cell 17, and the first and second reflective polarizing plates 11A and 11B disposed between the solar cell 17 and the light transmitting substrate 26.

A time character 15 and a mark or the like are arranged on the surface on a visible side of the light transmitting substrate 26. The first reflective polarizing plate 11A is disposed on the side that faces to the light transmitting substrate 26, and the second reflective polarizing plate 11B is disposed on the side that faces to the solar cell 17.

A stripe pattern 13 in a concave and convex shape is formed on the surface of the first reflective polarizing plate 11A on the side that faces to the light transmitting substrate 26. Moreover, the light transmitting substrate 26 and the first and second reflective polarizing plates 11A and 11B are fixed to each other by a fixing member 19*a* made of a pressure sensitive adhesion or an adhesive agent on the peripheral part of each other.

Moreover, the second reflective polarizing plate 11B and the solar cell 17 are fixed to each other by a fixing member 19 made of a pressure sensitive adhesion or an adhesive agent on the peripheral part of each other. The first reflective polarizing plate 11A and the second reflective polarizing plate 11B are equivalent to those of the embodiment 17, and the detailed descriptions of the elements are omitted.

The light transmitting substrate 26 is equivalent to that of the embodiment 18 described above, and the detailed descriptions of the element are omitted. The light transmitting substrate 26 is made of a transparent resin material, and the both surfaces of the light transmitting substrate 26 are finished to form a flat and smooth surface. Moreover, a value of a crossed axes angle s of the light transmission easy axes on the first and second reflective polarizing plates 11A and 11B is set to approximately 25 degrees.

As described above, for the display panel in accordance with this embodiment, the first and second reflective polarizing plates 11A and 11B are disposed between the light transmitting substrate 26 and the solar cell 17. Consequently, a stripe pattern can be seen brightly and vividly as a pattern 13 in a concave and convex shape of the first reflective polarizing plate 11A through the light transmitting substrate 26, whereby a deep and stereoscopic pattern can be displayed.

Moreover, for the display panel in accordance with this embodiment, a cross line and a dark purplish color of the solar cell 17 can be completely extinguished, and a brilliant pattern provided with a metal sense like a metal display panel can be visible, whereby a display panel having an improved decorative effect can be obtained.

Embodiment 25

Figure 40:
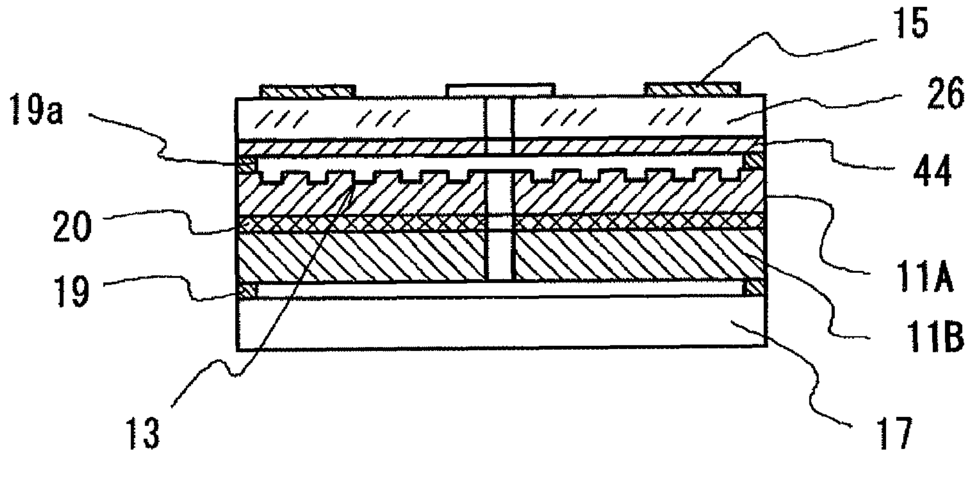
FIG. 40 is a cross-sectional view showing a display panel in accordance with an embodiment 25 of the present invention.

FIG. 40 is a cross-sectional view showing a display panel in accordance with an embodiment 25 of the present invention.

For the display panel in accordance with this embodiment, unlike the embodiment 24, a light transmitting colored layer is formed on the surface of a light transmitting substrate on the side that faces to a first reflective polarizing plate. However, other configurations are equivalent to those of the embodiment 24.

As shown in FIG. 40, the display panel in accordance with this embodiment is provided with a solar cell 17, a light transmitting substrate 26 formed on a visible side of the solar cell 17, and the first and second reflective polarizing plates 11A and 11B disposed between the solar cell 17 and the light transmitting substrate 26. In addition, a light transmitting colored layer 44 is formed on the surface of the light transmitting substrate 26 on the side that faces to the first reflective polarizing plate 11A.

The first reflective polarizing plate 11A and the second reflective polarizing plate 11B are fixed to each other by a thermo compression bonding. The crossed diagonal lines are drawn to enable a thermo compression bonded region 20 to be easily found.

A method of a thermo compression bonding is equivalent to that of the embodiment 18, and the detailed descriptions of the method are omitted. The light transmitting substrate 26 and the first reflective polarizing plate 11A are fixed to each other by a fixing member 19*a* made of a pressure sensitive adhesion or an adhesive agent on the peripheral part of each other.

Moreover, the reflective polarizing plate 12 and the solar cell 17 are fixed to each other by a fixing member 19 made of a pressure sensitive adhesion or an adhesive agent on the peripheral part of each other. Furthermore, a value of a crossed axes angle of the light transmission easy axes on the first and second reflective polarizing plates 11A and 11B is set to approximately 15 degrees.

The light transmitting colored layer 44 is formed by mixing a white pigment to a resin and by a printing method. The light transmitting colored layer 44 is equivalent to the light transmitting colored layer 14 of the embodiment 18 described above, and the detailed descriptions of the element are omitted.

However, other constructional elements are equivalent to those of the embodiment 24, and the detailed descriptions of the elements are omitted. As described above, for the display panel in accordance with this embodiment, a color of the solar cell 17 can be completely extinguished, a white color tone is increased, a white color sense is highlighted, and a stripe pattern 13 in a concave and convex shape can be seen vividly. Moreover, similarly to the embodiment 24, a deep and stereoscopic display can be enabled on the stripe pattern 13 in a concave and convex shape.

Embodiment 26

Figure 41:
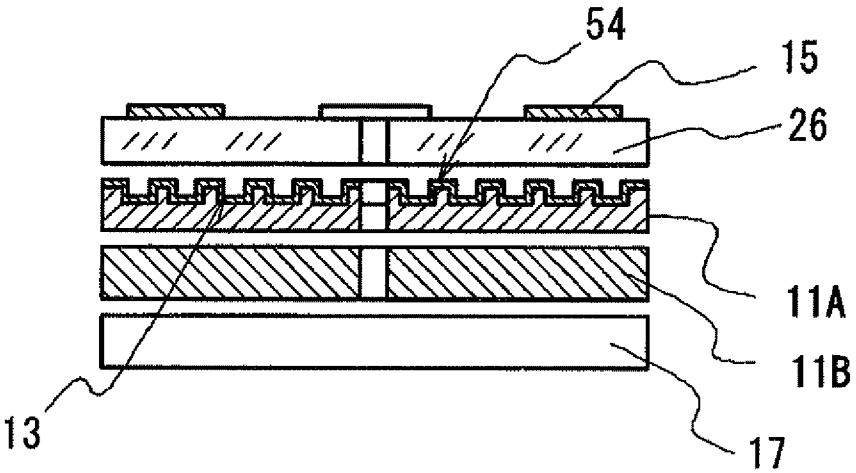
FIG. 41 is a cross-sectional view showing a display panel in accordance with an embodiment 26 of the present invention.

FIG. 41 is a cross-sectional view showing a display panel in accordance with an embodiment 26 of the present invention.

In this embodiment, a pattern in a concave and convex shape and the light transmitting colored layer are formed on the surface of the first reflective polarizing plate. Other constructional elements are equivalent to those of the embodiment 24.

As shown in FIG. 41, the display panel in accordance with this embodiment is provided with a solar cell 17, a light transmitting substrate 26 formed on a visible side of the solar cell 17, and the first and second reflective polarizing plates 11A and 11B disposed between the solar cell 17 and the light transmitting substrate 26.

A stripe pattern 13 in a concave and convex shape is formed on the surface of the first reflective polarizing plate 11A on the side that faces to the light transmitting substrate 26. Moreover, the light transmitting colored layer 54 is formed on the surface of the pattern 13 in a concave and convex shape.

The light transmitting colored layer 54 is formed on the stripe pattern 13 in a concave and convex shape on the surface of the first reflective polarizing plate 11A by a method for printing an ink in which the copper metal powder is mixed to a transparent urethane resin.

Without using a fixing member, the light transmitting substrate 26, the first and second reflective polarizing plates 11A and 11B, and the solar cell 17 are be laminated and held by an inner frame or the like for the watch. Moreover, a value of a crossed axes angle s of the light transmission easy axes on the first and second reflective polarizing plates 11A and 11B is set to approximately 15 degrees.

As described above, the display panel in accordance with this embodiment is finished in such a manner that a gold color tone appears as a whole by a color of a reflected light of the first reflective polarizing plate 11A, a color of a reflected light of the second reflective polarizing plate 11B, and a color of the light transmitting colored layer 54.

Moreover, the stripe pattern 13 in a concave and convex shape and a gold color tone can be seen brightly and vividly by the reflected light. Furthermore, the stripe pattern 13 in a concave and convex shape formed on the surface of the first reflective polarizing plate 11A can be seen through a transparent layer of the light transmitting substrate 26, whereby a deep and stereoscopic pattern can be displayed like a paint application.

As a result, the display board having a noble metal sense and sophistication can be obtained. In addition, since lights that are reflected from the solar cell 17 become less, a cross line and a dark purplish color of the solar cell 17 are completely extinguished and are prevented from being seen.

Embodiment 27

Figure 42:
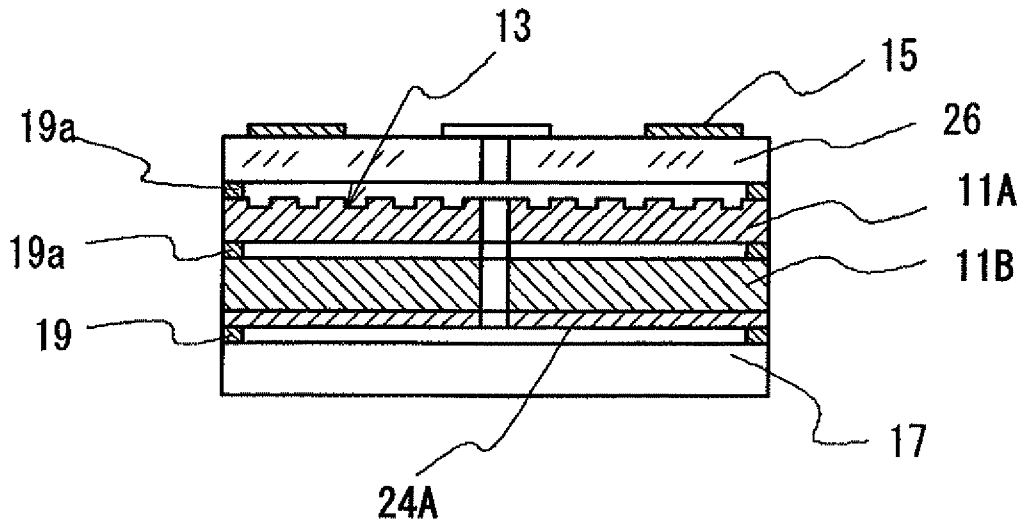
FIG. 42 is a cross-sectional view showing a display panel in accordance with an embodiment 27 of the present invention.

FIG. 42 is a cross-sectional view showing a display panel in accordance with an embodiment 27 of the present invention.

In this embodiment, a diffusing layer is formed on the surface of the second reflective polarizing plate on the side that faces to the solar cell 17. Other constructional elements are equivalent to those of the embodiment 24.

As shown in FIG. 42, the display panel in accordance with this embodiment is provided with a solar cell 17, a light transmitting substrate 26 formed on a visible side of the solar cell 17, and the first and second reflective polarizing plates 11A and 11B disposed between the solar cell 17 and the light transmitting substrate 26.

A diffusing layer 24A is formed on the surface of the second reflective polarizing plate 11B on the side that faces to the solar cell 17. The diffusing layer 24A is made of a substance in which a diffusing agent having a function for diffusing an irradiated light is mixed to a pressure sensitive adhesive, an adhesive agent, or a resin (a transparent ink or a transparent coating compound). As a material of the diffusing agent, there can be used for instance a material such as silica, glass, and a resin having a shape in a granular state, a powdered state, a scale-like state, or an acicular state.

The light transmitting substrate 26 and the first and second reflective polarizing plates 11A and 11B are equivalent to those of the embodiment 24. In addition, a fixing member for fixing the light transmitting substrate 26 and the first and second reflective polarizing plates 11A and 11B are also equivalent to that of the embodiment 24. In this embodiment, a value of a crossed axes angle of the light transmission easy axis 11*a* and the light transmission easy axis 12*a* on the first reflective polarizing plate 11A and the second reflective polarizing plate 11B is set to approximately 15 degrees.

By the above configuration, for the display panel in accordance with this embodiment, a white color tone is more increased as a whole and a white color sense is highlighted by a reflected light of the second reflective polarizing plate 11B and a reflected light of the diffusing layer 24A, and the stripe pattern 13 in a concave and convex shape can be seen vividly.

Moreover, the stripe pattern 13 in a concave and convex shape formed on the surface of the first reflective polarizing plate 11A can be seen through a transparent layer of the light transmitting substrate 26, whereby a deep and stereoscopic pattern can be displayed. As a result, a sophisticated and expensive-looking display panel can be obtained. In addition, since lights that are reflected from the solar cell 17 become less, a cross line and a dark purplish color of the solar cell 17 are completely extinguished and are prevented from being seen.

Embodiment 28

Figure 43:
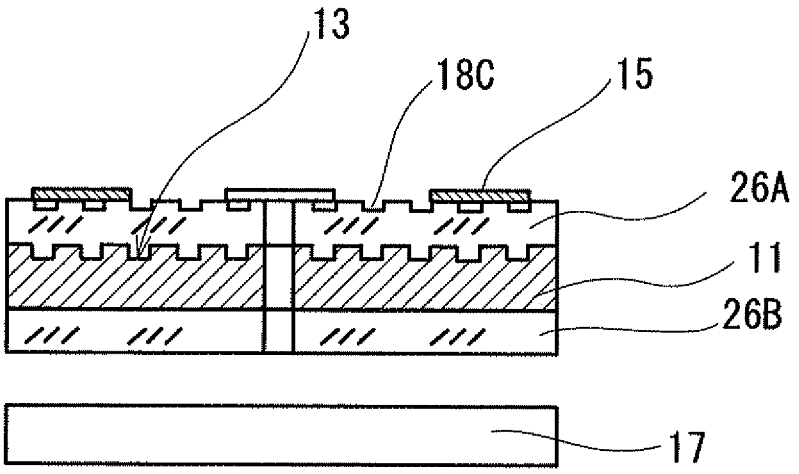
FIG. 43 is a cross-sectional view showing a display panel in accordance with an embodiment 28 of the present invention.

FIG. 43 is a cross-sectional view showing a display panel in accordance with an embodiment 28 of the present invention.

In this embodiment, a light transmitting substrate is disposed on the upper and lower surfaces of the reflective polarizing plate 11. A first light transmitting substrate 26A is disposed on a visible side of the reflective polarizing plate 11, and a second light transmitting substrate 26B is formed on the surface of the reflective polarizing plate 11 on the side that faces to the solar cell 17.

A time character 15 and a mark or the like are arranged on the surface on a visible side of the first light transmitting substrate 26A.

A pattern 13 is formed on the surface of a visible side of the reflective polarizing plate 11. In addition, a pattern 18C in a concave and convex shape is formed on the surface of a visible side of the first light transmitting substrate 26A.

In the embodiment shown in FIG. 43, a pattern is not formed on the surface of the second light transmitting substrate 26B. However, a pattern in a concave and convex shape can be formed on the surface of the second light transmitting substrate 26B or the surface of the reflective polarizing plate 11 on the side that faces to the solar cell 17.

The pattern described in the above embodiments can be applied to the pattern 13 formed on the surface of the reflective polarizing plate 11, the pattern 18C formed on the surface of the first light transmitting substrate 26A, and the pattern formed on the surface of the second light transmitting substrate 26B.

For the display panel in accordance with this embodiment, it is preferable that the first light transmitting substrate 26A, the reflective polarizing plate 11, and the second light transmitting substrate 26B are fixed to each other by a method such as a thermo compression bonding, and the patterns 13 and 18C in a concave and convex shape are then formed. The patterns 13 and 18C can be formed by a machining process such as a cutting process. However, various processes such as a thermal transfer process, a press process, and a sand blasting process can also be used corresponding to a pattern to be selected.

Moreover, a cross sectional shape of the pattern in a concave and convex shape can be selected as needed from a V shape, a U shape, a rectangular shape, and others. As a matter of course, after the pattern 13 is formed on the surface of each substrate, each substrate can be laminated.

Furthermore, after the first light transmitting substrate 26A and the reflective polarizing plate 11 are laminated and the pattern 13 is formed, the second light transmitting substrate 26B can be laminated.

Furthermore, as described in the above embodiments, the light transmitting substrates 26A and 26B and/or the reflective polarizing plate 11 can also be provided with a light transmitting colored layer or a diffusing layer, and can also contain a coloring agent or a diffusing agent. The substrates can be fixed to each other by a fixing member 19.

Moreover, the reflective polarizing plate 11, the first light transmitting substrate 26A, and the second light transmitting substrate 26B can be die-cut and then laminated. Or otherwise, the reflective polarizing plate 11, the first light transmitting substrate 26A, and the second light transmitting substrate 26B can be laminated and then die-cut by a method such as a press process.

By the above configuration, for the display panel in accordance with this embodiment, a white color tone is more increased as a whole and a white color sense is highlighted by a reflected light of the reflective polarizing plate 11, and the pattern 13 in a concave and convex shape can be seen vividly.

Moreover, the pattern 18C formed on the surface of the first light transmitting substrate 26A and the pattern 13 in a concave and convex shape formed on the surface of the reflective polarizing plate 11 can be seen through a transparent layer of the first light transmitting substrate 26A, whereby a deep and stereoscopic pattern can be displayed. As a result, a sophisticated and expensive-looking display panel can be obtained. In addition, since lights that are reflected from the solar cell 17 become less, a cross line and a dark purplish color of the solar cell 17 are completely extinguished and are prevented from being seen.

In the embodiments, a pattern in a concave and convex shape is formed on one surface of the light transmitting substrate. However, a pattern in a concave and convex shape can also be formed on any of the surface and rear surface of the light transmitting substrate, and can also be formed on the both surfaces of the light transmitting substrate.

In the embodiments, a light transmitting colored layer or a diffusing layer is formed on one surface of the reflective polarizing plate or on one surface of the light transmitting substrate. However, a light transmitting colored layer or a diffusing layer can also be formed on any of the surface and rear surface of the reflective polarizing plate or on any of the surface and rear surface of the light transmitting substrate, and can also be formed on the both surfaces of the reflective polarizing plate or on the both surfaces of the light transmitting substrate.

Moreover, at least one of a coloring agent and a diffusing agent can be contained in the light transmitting substrate. Needless to say, this configuration can have the same effect as that of the embodiment in which a light transmitting colored layer or a diffusing layer is formed.

Moreover, one light transmitting substrate is used in the above embodiments. However, the present invention is not restricted to the embodiments, and a plurality of light transmitting substrates can also be used.

Moreover, two reflective polarizing plates of the same kind are used in the above embodiments. However, the present invention is not restricted to the embodiments, and three or more reflective polarizing plates can also be used. Furthermore, a plurality of reflective polarizing plates of different kinds can also be combined to be used.

Figure 44:
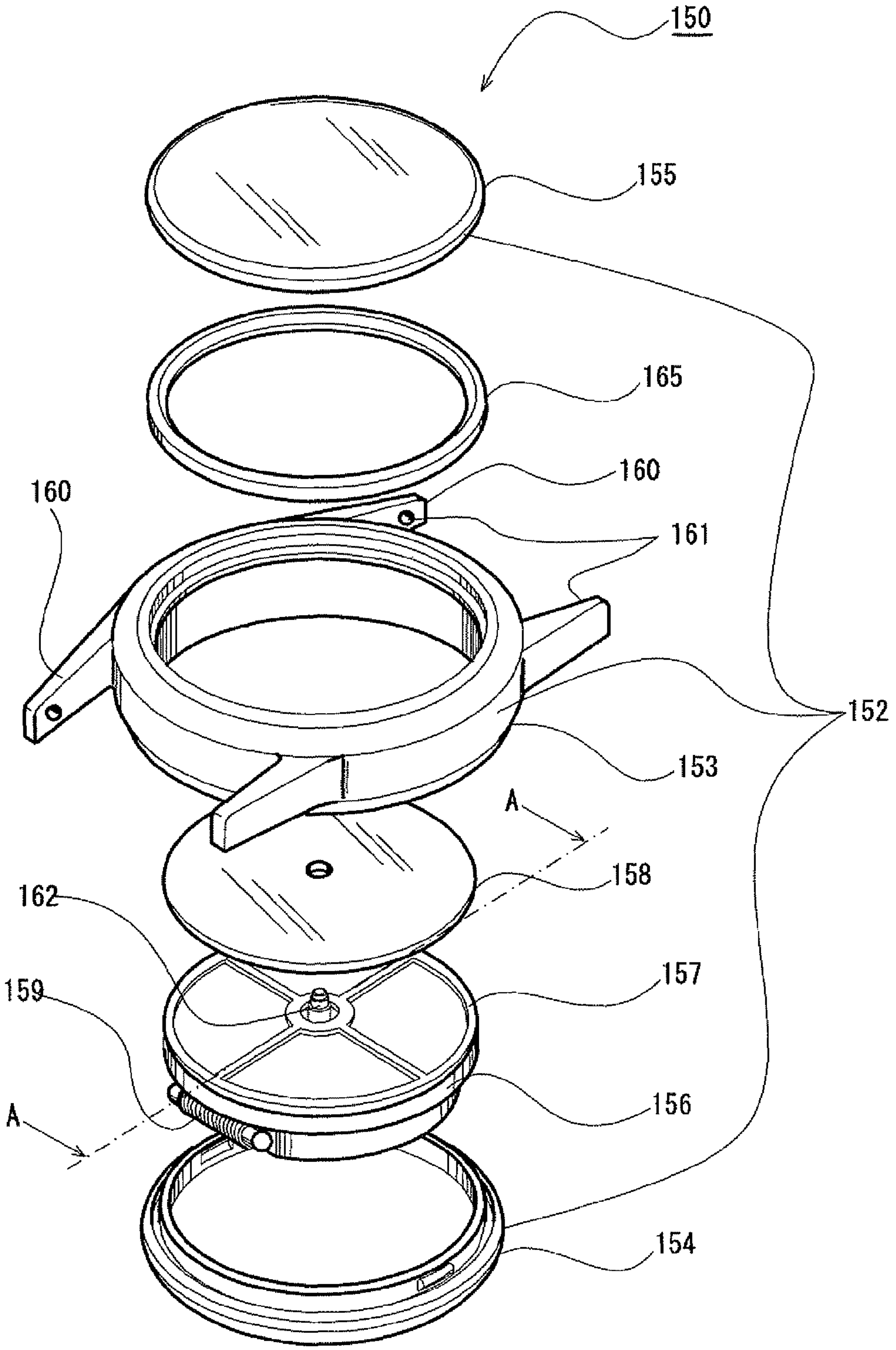
FIG. 44 is an exploded perspective view showing a clock with a wireless function to which the display panel in accordance with the present invention is applied.
Figure 45:
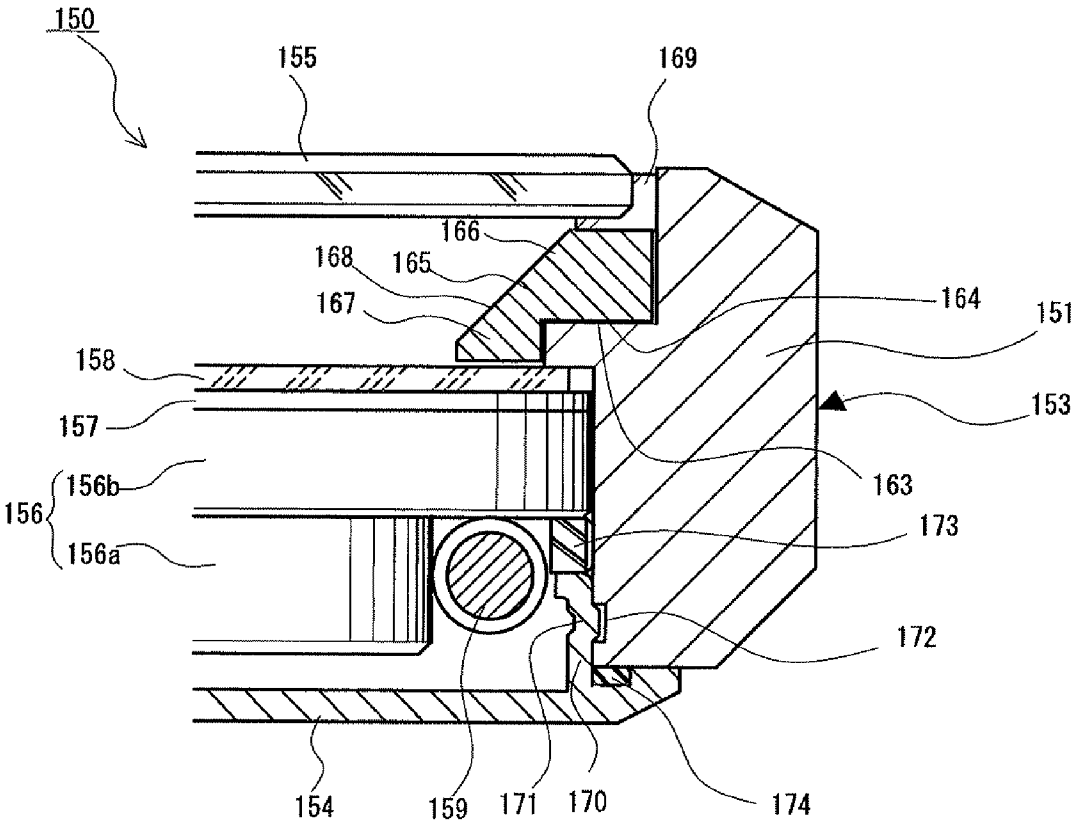
FIG. 45 is a partially cross-sectional view taken along the line A-A in the assembled state of the clock with a wireless function shown in FIG. 44.

The display panel described in the above embodiments can be applied to a clock with a wireless function shown in FIGS. 44 and 45 for instance.

FIG. 44 is an exploded perspective view showing a clock with a wireless function to which the display panel in accordance with the present invention is applied. FIG. 45 is a partially cross-sectional view taken along the line A-A in the assembled state of the clock with a wireless function shown in FIG. 44.

In FIGS. 44 and 45, a numeral 150 represents a clock with a wireless function in accordance with an embodiment of the present invention. A clock 150 with a wireless function in accordance with an embodiment of the present invention is an atomic wristwatch that has a wireless function for receiving a long-wave standard radio wave (carrier wave) including time information and for correcting clock time based on the time information. As shown in FIGS. 44 and 45, the clock 150 with a wireless function is provided with a housing 152.

The housing 152 is provided with a watch case 153 that configures a conductive frame in a generally cylindrical shape, a conductive rear cover 154 mounted to the watch case 153 in such a manner that the rear cover 154 covers a lower opening section of the watch case 153 in a sealing state, and a windshield (glass) 58 mounted to the watch case 153 in such a manner that the windshield 58 covers an upper opening section of the watch case 153 in a sealing state.

The housing 152 contains a movement 156 that configures a clock drive section. A solar cell 157 for driving the movement 156 by an electromotive force of light is disposed on the movement 156.

A display panel 158 is disposed on the solar cell 157. The display panel 158 has a translucent function for transmitting an outside light having a wavelength that contributes to the electric power generation of the solar cell in such a manner that the movement 156 can be driven sufficiently.

An antenna 159 for receiving a standard radio wave is formed beside a small diameter portion 156*a* formed at the lower section of the movement 156. The antenna 159 is a bar antenna composed of a magnetic core member in the shape of a rod and a coil wound around the periphery of the magnetic core member as shown in the figure.

As shown in FIG. 44, the watch case 153 is provided with a pair of band attaching parts 160 that protrude outside. The band attaching parts 160 are provided with leg portions 161 that are uniformly spaced facing to each other and that extend from the watch case 153.

A band (not shown) of the wristwatch is connected to the leg portions 161 while being disposed between the opposite leg portions 161. A minute hand and an hour hand (not shown) are mounted to a hand spindle 162 that protrude from the movement 156 and that penetrate the solar cell 157 and the display panel 158 shown in FIG. 44. The minute hand and the hour hand are located between the display panel 158 and the windshield 155 to indicate time.

As shown in FIG. 45, the watch case 153 is separated into a plurality of parts. In this embodiment, the watch case 153 is separated into the watch case body 151 and a conductive dial ring 165.

A lining receiving portion 163 in a flange shape is protruded in a circular pattern on the inner peripheral side of the watch case body 151. The conductive dial ring 165 is mounted on a shoulder section 164 formed by the lining receiving portion 163.

The dial ring 165 is provided with a dial ring body 166 disposed on the lining receiving portion 163 and an extended portion 167 that is extended from the dial ring body 166 to the display panel 158 and that is disposed on the display panel 158. A tapered face 168 in which a diameter of a lower position thereof gradually becomes smaller is formed on the inner face side of the dial ring 165. An index such as a time character is shown on the tapered face 168.

A fixing (waterproof) packing 169 for fixing the windshield 155 in a sealing state is disposed on the upper end of the dial ring 165 and on the inner peripheral side of the upper end of the watch case body 151. A core cylinder member 170 protruding inside is formed on the rear cover 154. A plurality of engaging protrusions 171 are formed separately from each other on the outer peripheral side of the core cylinder member 170. Moreover, engaging depressions 172 which the engaging protrusions 171 of the core cylinder member 170 on the rear cover 154 are engaged with are formed on the inner peripheral side close to the lower end of the watch case body 151.

A support frame 173 is disposed between a large diameter portion 156*b* formed at the upper section of the movement 156 and the upper end of the core cylinder member 170. The support frame 173 is made of a nonconductive material such as a synthetic resin, and ensures a space in a planar direction between the conductive watch case body 151 and a conductive antenna 159, thereby maintaining a high receiving performance of the antenna 159.

In the case in which the engaging protrusions 171 of the core cylinder member 170 on the rear cover 154 are engaged with the engaging depressions 172 of the watch case body 151, the movement 156, the solar cell 157, and the display panel 158 are fixed and housed in the watch case body 151 via the support frame 173 between the lining receiving portion 163 in a flange shape formed on the inner peripheral side of the watch case body 151 and the upper end of the core cylinder member 170 on the rear cover 154.

In FIG. 45, a numeral 174 represents a waterproof packing that is disposed between the rear cover 154 and the watch case body 151 in a sealing state.

In the case in which the display panel in accordance with the present invention is used as a display panel (a dial plate) for such a solar cell driving watch with a wireless function, a design variation of the display panel can be enlarged in particular.

More specifically, in the case in which the display panel in accordance with the present invention is used for a solar cell driving type watch with a wireless function as described above, lights of an amount sufficient for an electric power generation in a solar cell can be supplied, and a cross line and a dark purplish color of the solar cell can be prevented from being seen.

Moreover, elements such as the reflective polarizing plate and the light transmitting substrate that configures the display panel in accordance with the present invention are made of a nonconductive material such as a transparent polycarbonate resin or an acrylic resin. Consequently, a radio wave is not prevented from being received, whereby a high receiving performance of the antenna 159 can be maintained, and a function as a watch with a wireless function can be ensured.

For the above described watch with a wireless function, a watch with a wireless function of a type having a dial ring 165 is described in the above embodiments. However, the present invention can also be applied to a watch with a wireless function of a type that does not have a dial ring 165.

Moreover, the present invention can also be applied to a normal wristwatch that does not have a solar cell 157 and a wristwatch of a solar cell driving type that is provided with a solar cell and that does not have a wireless function.

Moreover, in the case in which the configuration of a clock with a wireless function which the display panel in accordance with the present invention is applied to is applied to a wristwatch, the configuration thereof can display the above described remarkable effect. However, the configuration of a clock with a wireless function which the display panel in accordance with the present invention is applied to can also be applied to a clock and a wall clock in addition to a wristwatch.

In the above embodiments, an atomic clock with a wireless function for receiving a long-wave standard radio wave (carrier wave) including time information and for correcting clock time based on the time information has been described. However, the configuration of a clock with a wireless function to which the display panel in accordance with the present invention is applied can also be applied to a clock provided with a wireless function such as a personal computer communication function, a cellular phone function, and a noncontact IC card function.

Moreover, the present invention can also be applied to an apparatus in which the above display panel is used as a display panel for a clock, a measuring instrument panel of an electronic desk calculator, an automobile, and an airplane, and a display panel of an apparatus like a mobile apparatus such as a cellular phone.

The display panel in accordance with the present invention can be used as a display panel for a clock, a measuring instrument panel of an electronic desk calculator, an automobile, and an airplane, and a display panel of an apparatus like a mobile apparatus such as a cellular phone for instance.

The invention claimed is:

1. A display panel provided with a display panel substrate arranged on a visible side, the display panel substrate comprising a reflective polarizing plate, of which the number in the display panel substrate is one, a light transmitting substrate which is made of resin and having a thickness in the range of 200 to 700 μm, and a pattern in a concave and convex shape is formed on the surface of the reflective polarizing plate on the visible side, whereby an optical reflection and diffusion are caused by the reflective polarizing plate, an axis hole through which a hand spindle penetrates is formed in the reflective polarizing plate and the light transmitting substrate, a time character is arranged on the visible surface of either the reflective polarizing plate or the light transmitting substrate that is provided on the visible side, the reflective polarizing plate and the light transmitting substrate are laminated and integrated with each other or the reflective polarizing plate and the light transmitting substrate are fixed to each other by a fixing member, and the display panel is a dial plate for a watch having hands.

2. The display panel as defined in claim 1, wherein the light transmitting substrate is disposed on the most visible side in regard to the reflective polarizing plate, and the time character is arranged on the light transmitting substrate.

3. The display panel as defined in claim 2, wherein an ultraviolet light cut layer or an ultraviolet light absorption layer is formed on the light transmitting substrate, or an ultraviolet light cut agent or an ultraviolet light absorption agent is contained in the light transmitting substrate.

4. The display panel as defined in claim 2, wherein a different pattern different from the pattern of the reflective polarizing plate is formed on a surface of the light transmitting substrate.

5. The display panel as defined in claim 2, wherein a solar cell is disposed on the back side of the light transmitting substrate.

6. The display panel as defined in claim 1, wherein the reflective polarizing plate is disposed on the most visible side in regard to the light transmitting substrate, and the time character is arranged on the reflective polarizing plate.

7. The display panel as defined in claim 6, wherein a solar cell is disposed on the back side of the light transmitting substrate.

* * * * *

UNITED STATES PATENT AND TRADEMARK OFFICE

CERTIFICATE OF CORRECTION

PATENT NO. : 8,446,671 B2
APPLICATION NO. : 12/376513
DATED : May 21, 2013
INVENTOR(S) : Omata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this
Eighth Day of September, 2015

Michelle K. Lee
*Director of the United States Patent and Trademark Office*